United States Patent
Hoz

(10) Patent No.: US 10,214,430 B2
(45) Date of Patent: Feb. 26, 2019

(54) WATER TREATMENT SYSTEM AND METHOD

(71) Applicant: Israel Aerospace Industries Ltd.

(72) Inventor: Benaya Hoz, Kiryat Ono (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 658 days.

(21) Appl. No.: 14/638,550

(22) Filed: Mar. 4, 2015

(65) Prior Publication Data
US 2016/0257576 A1    Sep. 8, 2016

(51) Int. Cl.
| | |
|---|---|
| C02F 1/00 | (2006.01) |
| C02F 1/44 | (2006.01) |
| B01D 61/02 | (2006.01) |
| B01D 61/12 | (2006.01) |
| C02F 103/08 | (2006.01) |

(52) U.S. Cl.
CPC ............ *C02F 1/008* (2013.01); *B01D 61/025* (2013.01); *B01D 61/027* (2013.01); *B01D 61/12* (2013.01); *C02F 1/441* (2013.01); *C02F 1/442* (2013.01); *B01D 2311/14* (2013.01); *C02F 2103/08* (2013.01); *C02F 2209/03* (2013.01); *C02F 2209/40* (2013.01); *Y02A 20/131* (2018.01)

(58) Field of Classification Search
CPC .......... C02F 1/008; C02F 1/441; C02F 1/442; C02F 2209/40; C02F 2103/08; C02F 2209/03; B01D 61/12; B01D 61/027; B01D 61/025; B01D 2311/14; Y02A 20/131
See application file for complete search history.

(56) References Cited

U.S. PATENT DOCUMENTS

| | | | |
|---|---|---|---|
| 3,853,756 A | 12/1974 | Stana | |
| 4,169,789 A | 10/1979 | Lerat | |
| 4,629,568 A | 12/1986 | Ellis, III | |
| 4,784,771 A * | 11/1988 | Wathen | ............... A61M 1/1656 |
| | | | 210/126 |
| 4,814,086 A | 3/1989 | Bratt | |
| 4,921,610 A | 5/1990 | Ford et al. | |

(Continued)

FOREIGN PATENT DOCUMENTS

WO    WO 2014037940    3/2014

OTHER PUBLICATIONS

International Search Report from International Application No. PCT/IL2016/050248 dated Jul. 14, 2016.

*Primary Examiner* — David C Mellon
(74) *Attorney, Agent, or Firm* — Dorsey & Whitney LLP

(57) ABSTRACT

A method of treatment of liquid including supplying liquid to be treated to at least one liquid treatment module having a liquid inlet, a permeate outlet and a brine outlet, monitoring liquid pressure within the at least one liquid treatment module and upon exceedance of a liquid pressure threshold in the at least one liquid treatment module, reducing the liquid pressure in the at least one liquid treatment module by performing at least one of the following functions: opening a liquid pressure reducing valve at the brine outlet, increasing a liquid volume output of a circulation pump which removes brine from the at least one liquid treatment module, equilibrating liquid pressures between a liquid pressure inside the at least one liquid treatment module and inside a liquid feed tank and opening a liquid pressure reducing valve at the liquid inlet.

6 Claims, 38 Drawing Sheets

(56) References Cited

U.S. PATENT DOCUMENTS

| | | | |
|---|---|---|---|
| 4,983,301 A | 1/1991 | Szucz et al. | |
| 5,690,829 A | 11/1997 | Lauer | |
| 5,888,401 A | 3/1999 | Nguyen | |
| 7,563,375 B2 | 7/2009 | Liberman | |
| 7,628,921 B2 | 12/2009 | Efraty | |
| 7,695,614 B2 | 4/2010 | Efraty | |
| 8,025,804 B2 | 9/2011 | Efraty | |
| 2005/0056590 A1* | 3/2005 | Baggott | B01D 61/025 210/652 |
| 2007/0158256 A1 | 7/2007 | Kromkamp et al. | |
| 2007/0181497 A1 | 8/2007 | Liberman | |
| 2007/0295650 A1 | 12/2007 | Yoneda et al. | |
| 2008/0217222 A1 | 9/2008 | Efraty | |
| 2009/0120873 A1 | 5/2009 | Becker et al. | |
| 2011/0147285 A1* | 6/2011 | Bonnelye | B01D 61/025 210/134 |
| 2011/0220561 A1* | 9/2011 | Katayama | C02F 1/008 210/102 |
| 2014/0061129 A1 | 3/2014 | Hoz | |
| 2014/0110337 A1 | 4/2014 | Hoz | |

* cited by examiner

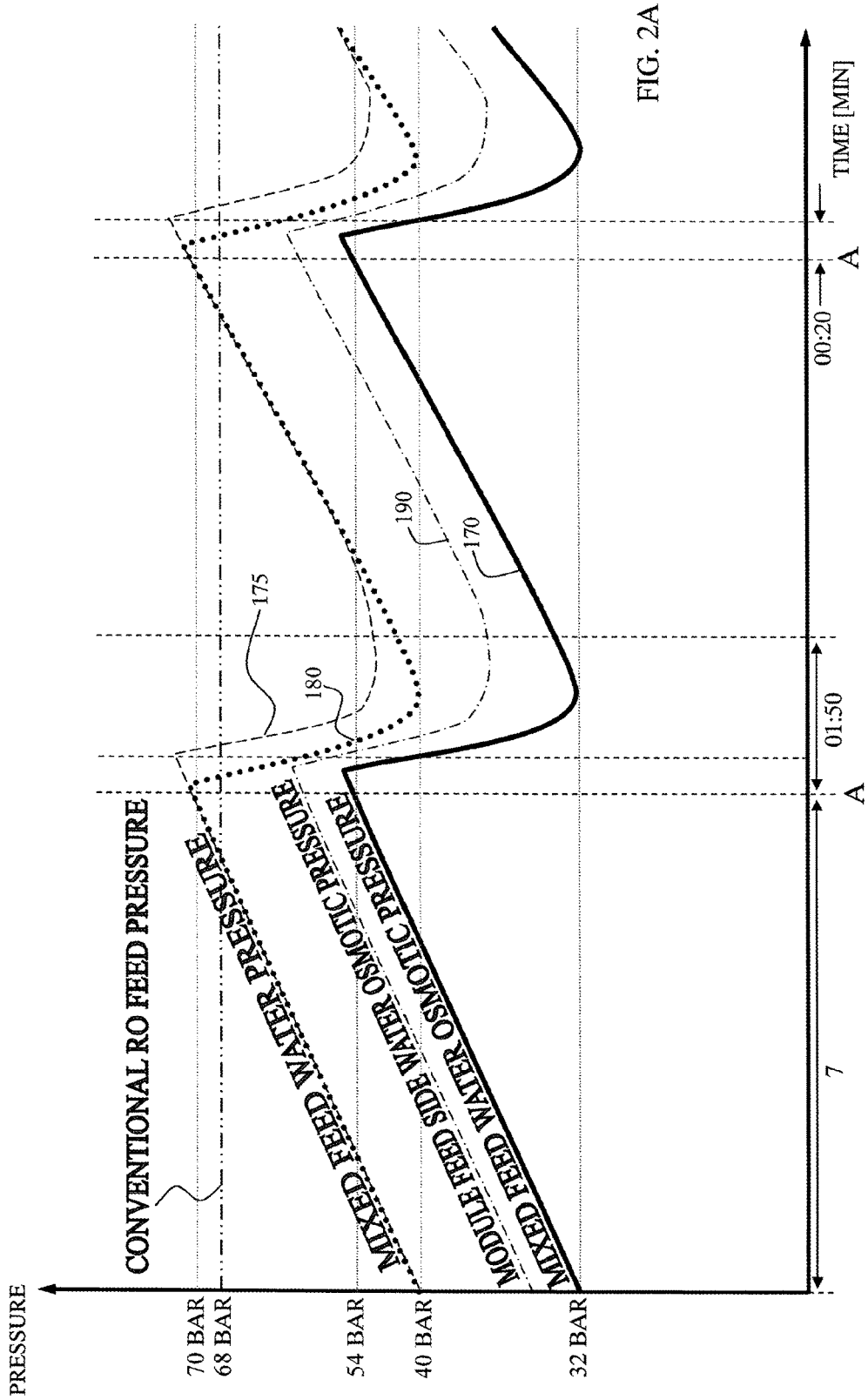

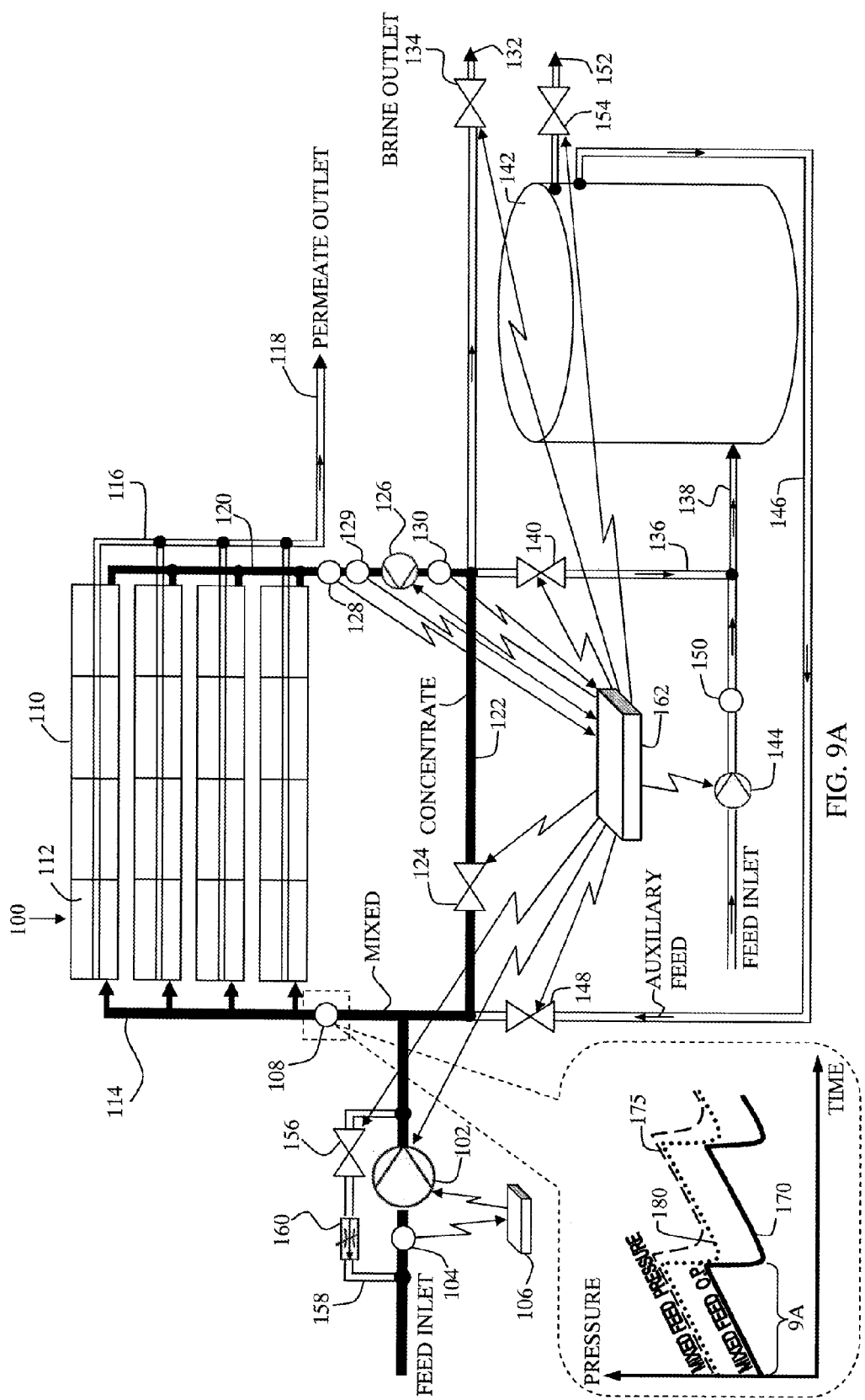

WATER TREATMENT SYSTEM AND METHOD

REFERENCE TO RELATED APPLICATIONS

Reference is hereby made to the following patent applications of the present inventor, the disclosures of which are hereby incorporated by reference:

U.S. patent application Ser. No. 13/603,028, filed Sep. 4, 2012, entitled "SYSTEM AND METHOD FOR DESALINATION OF WATER", published as U.S. Patent Publication No. 2014/0061129;

U.S. patent application Ser. No. 14/145,068, filed Dec. 31, 2013, entitled "SYSTEM AND METHOD FOR DESALINATION OF WATER", published as U.S. Patent Publication No. 2014/0110337; and PCT Patent Application No. PCT/IL2013/050744, filed Sep. 2, 2013, entitled SYSTEM AND METHOD FOR TREATMENT OF WATER, published as International Publication No. WO 2014/037940.

FIELD OF THE INVENTION

The present invention relates to water treatment systems and methods.

BACKGROUND OF THE INVENTION

Various types of water treatment systems and methods are known.

SUMMARY OF THE INVENTION

The present invention seeks to provide improved water treatment systems and methods. There is thus provided in accordance with a preferred embodiment of the present invention a method of treatment of liquid including supplying liquid to be treated to at least one liquid treatment module employing at least one of reverse osmosis and nanofiltration membranes, the at least one module having a liquid inlet, a permeate outlet and a brine outlet, monitoring liquid pressure within the at least one liquid treatment module and upon exceedance of a liquid pressure threshold in the at least one liquid treatment module, representing exceedence of a salinity threshold in the liquid therein, reducing the liquid pressure in the at least one liquid treatment module by performing at least one of the following functions: opening a liquid pressure reducing valve at the brine outlet, thereby reducing the liquid pressure at the brine outlet to a level above atmospheric pressure which exceeds osmotic pressure of the liquid in the at least one liquid treatment module, increasing a liquid volume output of a circulation pump which removes brine from the at least one liquid treatment module and supplies liquid to the water inlet from a liquid volume output at times other than upon and immediately following the exceedance, equilibrating liquid pressures between a liquid pressure inside the at least one liquid treatment module and inside a liquid feed tank and opening a liquid pressure reducing valve at the liquid inlet, thereby providing a pressure reducing backflow liquid path from the liquid inlet of the at least one liquid treatment module which bypasses a liquid pressure increasing pump upstream of the liquid inlet.

In accordance with a preferred embodiment of the present invention upon exceedance of a liquid pressure threshold in the at least one liquid treatment module, representing exceedence of a salinity threshold in the liquid therein, the liquid pressure in the at least one liquid treatment module is reduced by performing at least two of the following functions: opening a liquid pressure reducing valve at the brine outlet, thereby reducing the liquid pressure at the brine outlet to a level above atmospheric pressure which exceeds osmotic pressure of the liquid in the at least one liquid treatment module, increasing a liquid volume output of a circulation pump which removes brine from the at least one liquid treatment module and supplies liquid to the water inlet from a liquid volume output at times other than upon and immediately following the exceedance, equilibrating liquid pressures between a liquid pressure inside the at least one liquid treatment module and inside a liquid feed tank and opening a liquid pressure reducing valve at the liquid inlet, thereby providing a pressure reducing backflow liquid path from the liquid inlet of the at least one liquid treatment module which bypasses a liquid pressure increasing pump upstream of the liquid inlet.

In accordance with a preferred embodiment of the present invention upon exceedance of a liquid pressure threshold in the at least one liquid treatment module, representing exceedence of a salinity threshold in the liquid therein, the liquid pressure in the at least one liquid treatment module is reduced by performing at least three of the following functions: opening a liquid pressure reducing valve at the brine outlet, thereby reducing the liquid pressure at the brine outlet to a level above atmospheric pressure which exceeds osmotic pressure of the liquid in the at least one liquid treatment module, increasing a liquid volume output of a circulation pump which removes brine from the at least one liquid treatment module and supplies liquid to the water inlet from a liquid volume output at times other than upon and immediately following the exceedance, equilibrating liquid pressures between a liquid pressure inside the at least one liquid treatment module and inside a liquid feed tank and opening a liquid pressure reducing valve at the liquid inlet, thereby providing a pressure reducing backflow liquid path from the liquid inlet of the at least one liquid treatment module which bypasses a liquid pressure increasing pump upstream of the liquid inlet.

In accordance with a preferred embodiment of the present invention upon exceedance of a liquid pressure threshold in the at least one liquid treatment module, representing exceedence of a salinity threshold in the liquid therein, the liquid pressure in the at least one liquid treatment module is reduced by performing all of the following functions: opening a liquid pressure reducing valve at the brine outlet, thereby reducing the liquid pressure at the brine outlet to a level above atmospheric pressure which exceeds osmotic pressure of the liquid in the at least one liquid treatment module, increasing a liquid volume output of a circulation pump which removes brine from the at least one liquid treatment module and supplies liquid to the water inlet from a liquid volume output at times other than upon and immediately following the exceedance, equilibrating liquid pressures between a liquid pressure inside the at least one liquid treatment module and inside a liquid feed tank and opening a liquid pressure reducing valve at the liquid inlet, thereby providing a pressure reducing backflow liquid path from the liquid inlet of the at least one liquid treatment module which bypasses a liquid pressure increasing pump upstream of the liquid inlet.

There is also provided in accordance with another preferred embodiment of the present invention a method of treatment of liquid including: supplying at least one water treatment module including at least one membrane and having a feed water inlet at a feed side of the at least one membrane, a permeate outlet at a permeate side of the at least one membrane and a brine outlet at a brine side of at least one membrane, pressurizing feed water supplied to the feed water inlet by employing a pump which normally maintains a fixed output feed water volume notwithstanding variations in water pressure at an outlet thereof, the energy consumption of the pump being a function of the variations in water pressure at the outlet, monitoring the water pressure at the outlet of the pump and when a predetermined high pressure threshold is reached at the outlet of the pump, immediately making changes in the water supply to the module, thereby to cause immediate lowering of the water pressure at the outlet of the pump, to a pressure below the osmotic pressure at the feed side of part but not all of the module, thereby immediately reducing the energy consumption of the pump, thereby providing an overall energy cost savings per unit of water treated.

There is further provided in accordance with yet another preferred embodiment of the present invention a method for treatment of liquid in at least one liquid treatment module including at least a high pressure pump and a circulation pump, the method including upon occurrence of an operational threshold representing exceedence of a salinity threshold in the at least one liquid treatment module, effecting the following: removing brine from the at least one liquid treatment module and reducing, at an enhanced speed, pressure of the liquid in the at least one liquid treatment module by at least one of the following: opening a pressure reducing valve downstream of the high pressure pump, increasing the volume output of the circulation pump from its volume output when functioning as a concentrate circulation pump to a higher volume output when functioning as a feed water pump and passing liquid from downstream of the high pressure feed pump to upstream of the high pressure feed pump.

Preferably, the passing liquid from downstream of the high pressure feed pump to upstream of the high pressure feed pump includes passing the liquid via a flow restrictor arranged in parallel to the high pressure feed pump.

In accordance with a preferred embodiment of the present invention the pressure of the liquid in the at least one liquid treatment module is reduced at an enhanced speed by at least two of the following: opening a pressure reducing valve downstream of the high pressure pump, increasing the volume output of the circulation pump from its volume output when functioning as a concentrate circulation pump to a higher volume output when functioning as a feed water pump and passing liquid from downstream of the high pressure feed pump to upstream of the high pressure feed pump. Alternatively, the pressure of the liquid in the at least one liquid treatment module is reduced at an enhanced speed by all of the following: opening a pressure reducing valve downstream of the high pressure pump, increasing the volume output of the circulation pump from its volume output when functioning as a concentrate circulation pump to a higher volume output when functioning as a feed water pump and passing liquid from downstream of the high pressure feed pump to upstream of the high pressure feed pump.

Preferably, the liquid treatment module is a water treatment module including at least one of at least one reverse osmosis membrane and at least one nanofiltration membrane and is operative for treatment of at least one of sea water, brackish water and waste water.

There is even further provided in accordance with another preferred embodiment of the present invention a water treatment system including: at least one liquid treatment module operative to receive feed water at a water inlet thereof and to separate the feed water into permeate and concentrate, the permeate constituting treated water, the at least one liquid treatment module having a brine outlet for release of concentrate whose salinity is such that an operational threshold of the system is exceeded, a liquid pressure reducing valve at the brine outlet, a high pressure pump, operative to pressurize liquid to be treated received at a liquid feed inlet and to provide a pressurized feed water output to the at least one liquid treatment module, a feed water flow rate sensor located upstream of the high pressure pump and providing a feed water flow rate output, a pump controller receiving the feed water flow rate output and controlling the operation of the high pressure pump, a liquid pressure sensor for providing an output indication of liquid pressure at at least one of an inlet to the at least one liquid treatment module, an outlet from the at least one liquid treatment module and within the at least one liquid treatment module, a circulation pump which removes brine from the at least one liquid treatment module and supplies liquid to the water inlet, a liquid feed tank, a system controller receiving at least the output indication of liquid pressure within the at least one liquid treatment module, the system controller being operative, upon exceedance of a liquid pressure threshold in the at least one liquid treatment module, representing exceedence of a salinity threshold in the liquid therein, reducing the liquid pressure in the at least one liquid treatment module by performing at least one of the following functions: opening the liquid pressure reducing valve at the brine outlet, thereby reducing the liquid pressure at the brine outlet to a level above atmospheric pressure which exceeds osmotic pressure of the liquid in the at least one liquid treatment module, increasing a liquid volume output of the circulation pump, which removes brine from the at least one liquid treatment module and supplies liquid to the water inlet from a liquid volume output at times other than upon and immediately following the exceedance, equilibrating liquid pressures between a liquid pressure inside the at least one liquid treatment module and inside the liquid feed tank and opening a liquid pressure reducing valve at the liquid inlet, thereby providing a pressure reducing backflow liquid path from the liquid inlet of the at least one liquid treatment module which bypasses the high pressure pump upstream of the liquid inlet.

In accordance with a preferred embodiment of the present invention the system controller is operative, upon exceedance of a liquid pressure threshold in the at least one liquid treatment module, representing exceedence of a salinity threshold in the liquid therein, reducing the liquid pressure in the at least one liquid treatment module by performing at least two of the following functions: opening the liquid pressure reducing valve at the brine outlet, thereby reducing the liquid pressure at the brine outlet to a level above atmospheric pressure which exceeds osmotic pressure of the liquid in the at least one liquid treatment module, increasing a liquid volume output of the circulation pump, which removes brine from the at least one liquid treatment module and supplies liquid to the water inlet from a liquid volume output at times other than upon and immediately following the exceedance, equilibrating liquid pressures between a liquid pressure inside the at least one liquid treatment module and inside the liquid feed tank and opening a liquid pressure reducing valve at the liquid inlet, thereby providing a pressure reducing backflow liquid path from the liquid inlet of the at least one liquid treatment module which bypasses the high pressure pump upstream of the liquid inlet.

Alternatively, the system controller is operative, upon exceedance of a liquid pressure threshold in the at least one liquid treatment module, representing exceedance of a salinity threshold in the liquid therein, reducing the liquid pressure in the at least one liquid treatment module by performing at least three of the following functions: opening the liquid pressure reducing valve at the brine outlet, thereby reducing the liquid pressure at the brine outlet to a level above atmospheric pressure which exceeds osmotic pressure of the liquid in the at least one liquid treatment module, increasing a liquid volume output of the circulation pump, which removes brine from the at least one liquid treatment module and supplies liquid to the water inlet from a liquid volume output at times other than upon and immediately following the exceedance, equilibrating liquid pressures between a liquid pressure inside the at least one liquid treatment module and inside the liquid feed tank and opening a liquid pressure reducing valve at the liquid inlet, thereby providing a pressure reducing backflow liquid path from the liquid inlet of the at least one liquid treatment module which bypasses the high pressure pump upstream of the liquid inlet.

In another alternative embodiment, the system controller is operative, upon exceedance of a liquid pressure threshold in the at least one liquid treatment module, representing exceedence of a salinity threshold in the liquid therein, to reduce the liquid pressure in the at least one liquid treatment module by performing all of the following functions: opening the liquid pressure reducing valve at the brine outlet, thereby reducing the liquid pressure at the brine outlet to a level above atmospheric pressure which exceeds osmotic pressure of the liquid in the at least one liquid treatment module, increasing a liquid volume output of the circulation pump, which removes brine from the at least one liquid treatment module and supplies liquid to the water inlet from a liquid volume output at times other than upon and immediately following the exceedance, equilibrating liquid pressures between a liquid pressure inside the at least one liquid treatment module and inside the liquid feed tank and opening a liquid pressure reducing valve at the liquid inlet, thereby providing a pressure reducing backflow liquid path from the liquid inlet of the at least one liquid treatment module which bypasses the high pressure pump upstream of the liquid inlet.

There is yet further provided in accordance with still another preferred embodiment of the present invention a water treatment system including at least one water treatment module including at least one membrane and having a feed water inlet at a feed side of the at least one membrane, a permeate outlet at a permeate side of the at least one membrane and a brine outlet at a brine side of at least one membrane, a high pressure pump, which normally maintains a fixed output feed water volume notwithstanding variations in water pressure at an outlet thereof, a system controller receiving at least the output indication of liquid pressure within the at least one liquid treatment module, the system controller being operative, upon exceedance of a liquid pressure threshold in the at least one liquid treatment module, representing exceedence of a salinity threshold in the liquid therein, to reduce the liquid pressure in the at least one liquid treatment module by performing at least one of the following functions: pressurizing feed water supplied to the feed water inlet by employing the high pressure pump, the energy consumption of the high pressure pump being a function of the variations in water pressure at the outlet, monitoring the water pressure at the outlet of the high pressure pump and when a predetermined high pressure threshold is reached at the outlet of the high pressure pump, immediately making changes in the water supply to the at least one liquid treatment module, thereby to cause immediate lowering of the water pressure at the outlet of the high pressure pump, to a pressure below the osmotic pressure at the feed side of part but not all of the at least one liquid treatment module, thereby immediately reducing the energy consumption of the high pressure pump, thereby provide an overall energy cost savings per unit of water treated.

There is still further provided in accordance with yet another preferred embodiment of the present invention a water treatment system including at least one water treatment module including at least one membrane and having a feed water inlet at a feed side of the at least one membrane, a permeate outlet at a permeate side of the at least one membrane and a brine outlet at a brine side of at least one membrane, a high pressure pump, which normally maintains a fixed output feed water volume notwithstanding variations in water pressure at an outlet thereof, a pressure reducing valve downstream of the high pressure feed pump, a circulation pump, a system controller receiving at least the output indication of liquid pressure within the at least one liquid treatment module, the system controller being operative, upon exceedance of a liquid pressure threshold in the at least one liquid treatment module, representing exceedence of a salinity threshold in the liquid therein, to reduce the liquid pressure in the at least one liquid treatment module by performing at least one of the following functions: upon occurrence of an operational threshold representing exceedence of a salinity threshold in the at least one liquid treatment module, effecting the following: removing brine from the at least one liquid treatment module and reducing, at an enhanced speed, pressure of the liquid in the at least one liquid treatment module by at least one of the following: opening the pressure reducing valve downstream of the high pressure feed pump, increasing the volume output of the circulation pump from its volume output when functioning as a concentrate circulation pump to a higher volume output when functioning as a feed water pump and passing liquid from downstream of the high pressure feed pump to upstream of the high pressure feed pump.

Preferably, the water treatment system also includes a flow restrictor arranged in parallel to the high pressure feed pump and the passing liquid from downstream of the high pressure feed pump to upstream of the high pressure feed pump includes passing the liquid via the flow restrictor.

In accordance with a preferred embodiment of the present invention the pressure of the liquid in the at least one liquid treatment module is reduced at an enhanced speed by at least two of the following: opening the pressure reducing valve downstream of the high pressure feed pump, increasing the volume output of the circulation pump from its volume output when functioning as a concentrate circulation pump to a higher volume output when functioning as a feed water pump and passing liquid from downstream of the high pressure feed pump to upstream of the high pressure feed pump. Alternatively, the pressure of the liquid in the at least one liquid treatment module is reduced at an enhanced speed by at least three of the following: opening the pressure reducing valve downstream of the high pressure feed pump, increasing the volume output of the circulation pump from its volume output when functioning as a concentrate circulation pump to a higher volume output when functioning as a feed water pump and passing liquid from downstream of the high pressure feed pump to upstream of the high pressure feed pump.

BRIEF DESCRIPTION OF THE DRAWINGS

The present invention will be understood and appreciated more fully from the following detailed description, taken in conjunction with the drawings in which:

FIGS. 2A and 2B are simplified illustrations of examples of periodic variations in feed water pressure and osmotic pressure in embodiments of the system of FIG. 1, each showing a distinction from the prior art;

FIGS. 9A, 9B, 9C and 9D are simplified illustrations of liquid flows in the system of FIG. 1 at various stages in the periodic variation in feed water pressure and osmotic pressure shown in FIG. 2A in accordance with yet a further embodiment of the present invention;

DETAILED DESCRIPTION OF PREFERRED EMBODIMENTS

Figure 1:
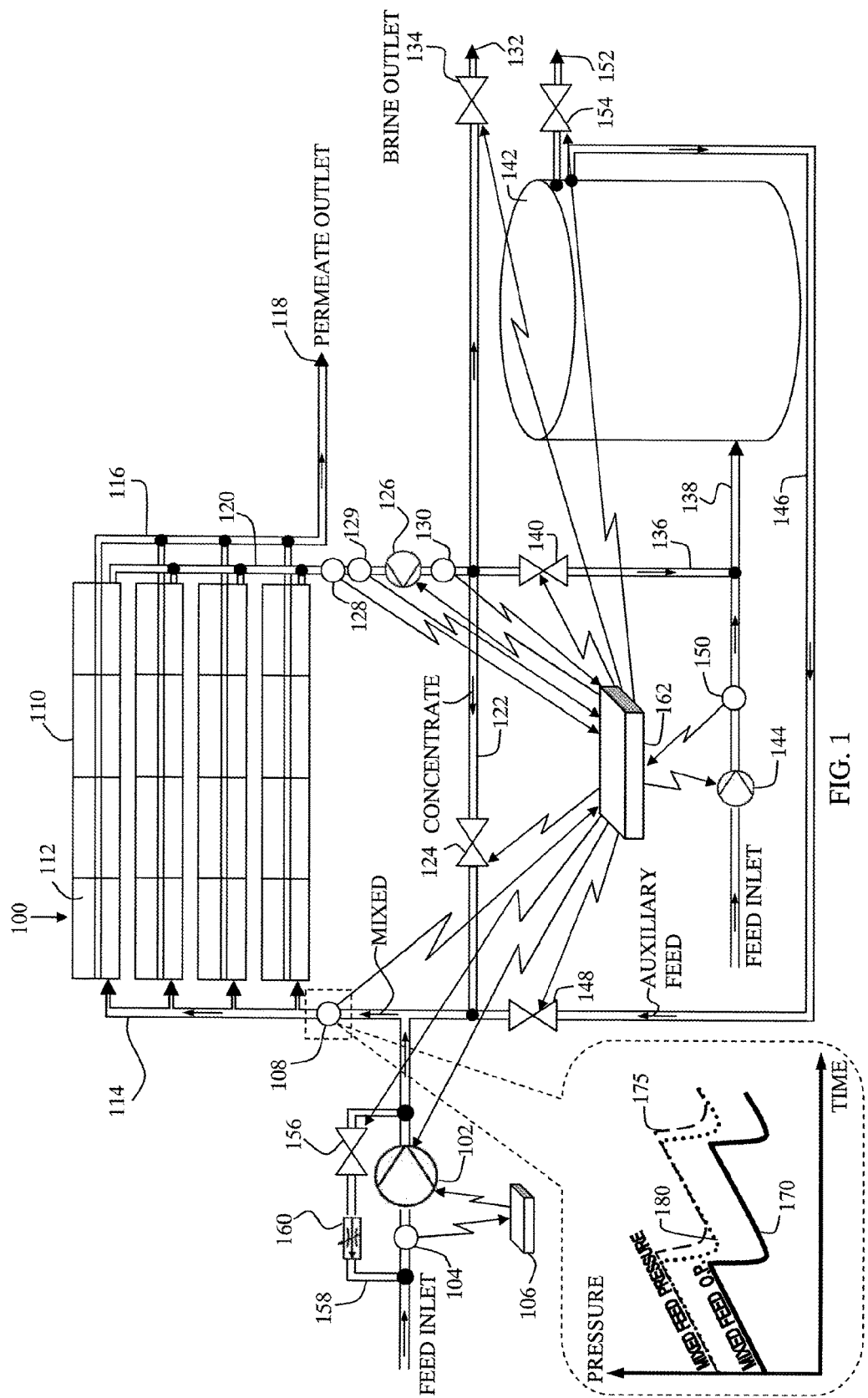
FIG. 1 is a simplified illustration of a system for water treatment constructed and operative in accordance with a preferred embodiment of the present invention.
Figure 2B:
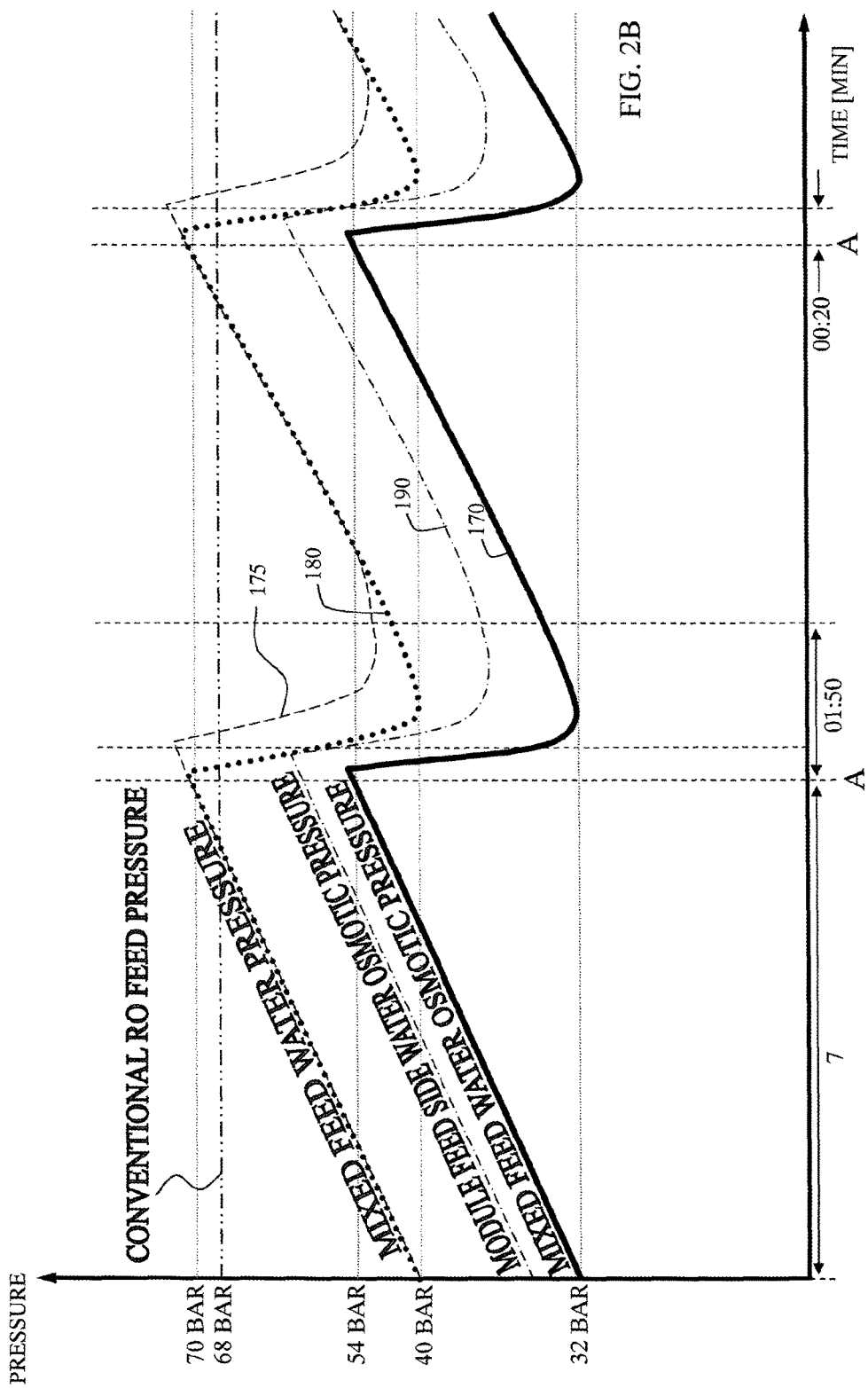

Reference is now made to FIG. 1, which is a simplified illustration of a liquid treatment system constructed and operative in accordance with a preferred embodiment of the present invention, and to FIGS. 2A and 2B, which are simplified time-line illustrations of examples of the operation of the system of FIG. 1, wherein seawater is being desalinated.

The liquid treatment system of FIG. 1 comprises at least one liquid treatment module, preferably water treatment module 100, comprising reverse osmosis membranes and/or nanofiltration membranes. The system of FIG. 1 is operative for treatment of liquid to be treated, such as feed water, which may be, for example, sea water, brackish water or waste water.

Water treatment module 100 is described in applicant's U.S. patent application Ser. No. 13/603,028, filed Sep. 4, 2012 and entitled SYSTEM AND METHOD FOR DESALINATION OF WATER, and published as U.S. Published Patent Application No. 2014/0061129 on Mar. 6, 2014, the disclosure of which is hereby incorporated by reference. FIG. 2A in U.S. patent application Ser. No. 13/603,028 illustrates a water treatment module, here designated by reference numeral 100.

For the purposes of the description which follows, the following definitions will be employed:

feed water—water to be treated by the system, such as saline solution, sea water, brackish water or waste water;

mixed feed water—water supplied to water treatment module 100, which may include feed water and water that was previously treated in the water treatment module 100 and is being resupplied to the water treatment module for further treatment;

module feed side water—water at a feed side, as distinguished from a permeate side, of module 100. The salinity of the module feed side water increases as the module feed side water passes through the module from an initial salinity, which represents the salinity of the mixed feed water, to a concentrate salinity, which represents the salinity of the concentrate output at an output of the feed side, as distinguished from the permeate side, of module 100.

It is an inherent feature of water treatment modules 100 that the osmotic pressure at the feed side thereof increases over time as the salinity at the feed side increases until such time as the salinity at the feed side is reduced, thereby reducing the osmotic pressure. As described hereinbelow, the salinity of the mixed feed water at the feed side is preferably reduced by supplying only feed water instead of a mixture of feed water and recirculated concentrate.

An increase in osmotic pressure requires a corresponding increase in water pressure at the feed side of the module 100 in order to maintain permeate production. This increase is provided automatically by a high pressure pump 102, preferably operative to pressurize the liquid to be treated to typical pressures of approximately 15 bar for brackish water and up to approximately 70 bar for sea water.

High pressure pump 102 may be any suitable type of pump, such as a positive displacement pump. An example of a preferred positive displacement pump is a Danfoss APP 21-43 high pressure pump, commercially available from Danfoss A/S Nordborgvej 81, 6430 Nordborg, Denmark. High pressure pump 102 is preferably controlled by the output of a feed water flow rate sensor 104 upstream of pump 102, which is received by a pump controller 106, preferably an ABB ACS800-U1 controller, commercially available from ABB Inc. MS 3L7 29801 Euclid Ave, Wickliffe, Ohio 44092-2530, USA.

Preferably, a mixed feed water pressure sensor 108 is provided at the feed side of module 100. A typical graph of mixed feed water pressure as measured by pressure sensor 108 over time and verses the osmotic pressure at the feed side of the module 100 appears in an enlargement forming part of FIG. 1 and in FIGS. 2A and 2B. Alternatively or additionally, a water pressure sensor may be provided at a suitable location within module 100 or at a module outlet for measuring the pressure of liquid flowing therethrough.

The variation of feed water pressure over time typically has a periodicity of a few minutes, typically between 3-30 minutes in seawater desalination and possibly longer in brackish water desalination.

As seen in FIG. 1, water treatment module includes a plurality of pressure vessels 110 arranged in parallel. Each pressure vessel 110 preferably includes a plurality of membrane elements 112, typically eight in number, only four being shown in the drawing for the sake of conciseness. Pressure vessels 110 are commercially available from various vendors, for example BEL Composite Industries Ltd, Industrial Zone, Kiryat Yehudit, P.O.B. 4, 84100 Beer Sheva, Israel, and membrane elements 112 are commercially available from various vendors, for example LG NanoH2O, 750 Lairport Street, El Segundo, Calif. 90245.

Liquid to be treated is supplied at a liquid feed inlet and is pressurized by high pressure pump 102, preferably operative to pressurize the liquid to be treated to typical pressures of approximately 15 bar for brackish water and up to approximately 70 bar for sea water.

The liquid to be treated, hereinafter referred to as feed water, wherein the definition of "feed water" encompasses, inter alia, saline solution, brackish water, sea water and waste water, is supplied via a feed manifold 114 to the parallel pressure vessels 110. Treated water, hereinafter referred to as permeate, wherein the definition of "permeate" encompasses, inter alia, "product water", from each of pressure vessels 110, is preferably supplied via a permeate manifold 116 to a permeate outlet 118.

Concentrate from each of pressure vessels 110 is preferably supplied via a concentrate manifold 120 to a recirculation conduit 122, which directs the concentrate back to feed manifold 114, downstream of pump 102, via a recirculation control valve 124 by employing a circulation pump 126. A concentrate pressure sensor 128, a concentrate conductivity sensor 129 and a concentrate flow rate sensor 130 are preferably provided downstream of concentrate manifold 120.

Concentrate from module 100 may also be provided from pressure vessels 110 via concentrate manifold 120 to a brine outlet 132 via a brine outlet control valve 134 for flushing. Concentrate that exits module 100 and is not recirculated is referred to herein as brine. Preferably, the salinity of the brine that is flushed is greater than the salinity of the concentrate that is recirculated via conduit 122.

In some embodiments of the present invention, brine from each of pressure vessels 110 may be supplied from concentrate manifold 120 via an auxiliary brine replacement conduit 136, an auxiliary tank feed conduit 138 and an auxiliary brine replacement control valve 140 to an auxiliary feed water tank 142. Preferably, the salinity of the brine supplied to auxiliary feed water tank 142 exceeds the salinity of the concentrate that is recirculated via conduit 122.

It is appreciated that, as described further hereinbelow, the decision to recirculate the liquid as concentrate or to flush the liquid as brine may be a function of the salinity of the liquid, a function of the pressure of the liquid, a function of a rate of accumulation of foulants on membrane elements, a system energy efficiency rating, or may be based on a predetermined time schedule or any other suitable method. Additionally or alternatively, the selection of the threshold may be predetermined to be a suitable threshold which will avoid or minimize precipitation of foulants on the membrane elements 112 in module 100.

During the flushing of brine, the recirculation control valve 124 is closed. The auxiliary feed water tank 142 is preferably filled, prior to the opening of auxiliary brine replacement control valve 140, with feed water by an auxiliary feed water pump 144. Brine driven by circulation pump 126 drives the feed water from auxiliary feed water tank 142 to feed manifold 114 via an auxiliary feed water conduit 146 and an auxiliary feed water control valve 148. An auxiliary water flow sensor 150 is provided upstream of auxiliary feed water tank 142. After full replacement of brine by feed water in module 100, the recirculation control valve 124 is opened and auxiliary brine replacement control valve 140 and auxiliary feed water control valve 148 are closed. Then auxiliary feed water pump 144 fills auxiliary feed water tank 142 with feed water, which drives the brine to an auxiliary brine outlet 152 via an auxiliary brine outlet tank control valve 154.

It is appreciated that, alternatively, elements 136-154 may be obviated.

In some embodiments of the present invention, water pressure at the feed side of the module 100 may be quickly reduced at desired points in time by operation of a recycle conduit control valve 156 to redirect feed water from downstream of high pressure feed pump 102 to upstream of pump 102 through a conduit 158 and preferably through a flow restrictor 160, which limits the pressure reduction to a pressure above atmospheric pressure, which pressure exceeds the osmotic pressure of the feed water at the feed side of module 100.

In accordance with a preferred embodiment of the present invention there is provided a Feed Pressure Management (FPM) Controller 162, which controls the operation of the high pressure feed pump 102, circulation pump 126, auxiliary feed water pump 144, recirculation control valve 124, brine outlet control valve 134, auxiliary brine replacement control valve 140, auxiliary feed water control valve 148, auxiliary brine outlet tank control valve 154, and recycle conduit control valve 156 for adjusting the pressure at which desalination takes place at the at least one water treatment module.

As seen in FIGS. 2A and 2B, which will be described in detail hereinbelow, and refer to examples wherein seawater is being desalinated, periodic variations in the feed water pressure during water treatment correspond to periodic variations in the osmotic pressure, which corresponds to the salinity of the feed water supplied to module 100, as measurable by a conductivity sensor (not shown) typically downstream of pressure sensor 108.

Control over the variation of the feed water pressure may be achieved in various ways, such as according to the flow rate measured by flow sensor 104 and, alternatively or additionally, according to the salinity of the water being supplied to the feed side of the module 100, which may include feed water received from pump 102, recirculated water received from recirculation conduit 122, auxiliary feed water received via auxiliary conduit 146 and combinations thereof.

Alternatively, the feed pressure may be varied in accordance with a predetermined time schedule. As a further alternative, the desired feed pressure may be reached by employing recycle conduit 158 with or without flow restrictor 160. Other alternative methodologies for control over the variation of the feed pressure may be employed.

FPM controller 162 is operative to periodically open and close recirculation control valve 124, brine outlet control valve 134, auxiliary brine replacement control valve 140, auxiliary feed water control valve 148, auxiliary brine outlet tank control valve 154 and recycle conduit control valve 156 in accordance with a predetermined time schedule or alternatively, for example, in response to either sensed salinity of the concentrate, for example as per an output of sensor 129, or exceedance of a predetermined maximum feed pressure threshold, for example as per an output of sensor 108 or sensor 128.

FPM controller 162 is also preferably operative to periodically activate auxiliary feed water pump 144 and may also be operative to change the flow rate of circulation pump 126. Other alternative algorithms for control of opening and closing recirculation control valve 124, brine outlet control valve 134, auxiliary brine replacement control valve 140, auxiliary feed water control valve 148, auxiliary brine outlet tank control valve 154 and recycle conduit control valve 156, and for control of the operation of the high pressure feed pump 102, circulation pump 126 and auxiliary feed water pump 144 may be employed.

In some embodiments of the invention, once the concentration of the concentrate increases to a predetermined level at which continued water treatment is deemed not to be practicable, the FPM controller 162 opens auxiliary brine replacement control valve 140 and allows brine to flow from concentrate manifold 120, via auxiliary brine replacement conduit 136 and auxiliary tank feed water conduit 138, to auxiliary feed water tank 142. In some embodiments of the invention, FPM controller 162 also closes recirculation control valve 124 at about the same time. The volume of the brine flowing out of the system may be measured by concentrate flow rate sensor 130. Feed water that was in auxiliary feed water tank 142 is driven by circulation pump 126 to flow via auxiliary feed water conduit 146 and auxiliary feed water control valve 148 to feed manifold 114. Feed water, having salinity which is significantly lower than that of the brine, thus enters module 100.

Various methodologies for ensuring that the feed water pressure is above atmospheric pressure and above the osmotic pressure of the feed water at the feed side of module 100 at all times are described hereinbelow with reference to FIGS. 2A & 2B and to FIGS. 3A-11D. Ensuring that the feed water pressure remains above atmospheric pressure and above the osmotic pressure of the feed water at the feed side of module 100 prevents overshooting of the feed pressure when feed water from high pressure feed pump 102 enters the module 100, which overshooting commonly occurs in prior art systems.

It is appreciated that the term 'overshooting' as used herein refers to operating the high pressure feed pump 102 at an excessively high pressure relative to the osmotic pressure of the feed water, which is typically caused when the controller causes the system to supply feed water, as from auxiliary feed water tank 142, instead of recirculated concentrate to modules 100, without modifying the pressure of feed water supplied via high pressure feed pump 102. The operation of the high pressure feed pump 102 at an excessively high pressure relative to the osmotic pressure of the feed water, increases the energy required to operate the system.

In the description which follows, it is to be appreciated that the pressure values given for the various embodiments described hereinbelow and shown in FIGS. 2A & 2B are values associated with membrane sea water desalination. Different pressure values will apply to desalination of brackish water and other types of feed water.

In steady state normal operation of the system, prior to initiation of a periodic process of replacing the concentrate in the water treatment module 100 with feed water, brine outlet control valve 134, auxiliary brine replacement control valve 140, auxiliary feed water control valve 148, auxiliary brine outlet tank control valve 154 and recycle conduit control valve 156 are all closed and recirculation control valve 124 is open.

In this steady state normal operation, concentrate from concentrate manifold 120 is directed back to the input of feed manifold 114 via recirculation conduit 122 and recirculation control valve 124, as shown in FIG. 1 by an arrow labeled CONCENTRATE representing the recirculation flow in recirculation conduit 122. In feed manifold 114, the concentrate is mixed with feed water, as shown in FIG. 1 by an arrow labeled MIXED, representing the mixed flow in the feed manifold 114, and the mixed flow enters pressure vessels 110 of module 100 for treatment. The above-described flow in steady state normal operation is represented in solid black lines in FIGS. 3A, 4A, 5A, 6A, 7A, 8A, 9A, 10A and 11A.

The feed pressure gradually increases as the salinity of the mixed water being supplied to the membrane elements 112 increases. Once the concentration of the concentrate increases to a predetermined level at which continued water treatment is deemed not to be practicable, the periodic process of replacing the concentrate in the water treatment module 100 with feed water is initiated. FIGS. 3A-11D illustrate various techniques for replacing the concentrate in the water treatment module 100 with feed water at a pressure above atmospheric pressure, which exceeds the osmotic pressure of the feed water at the feed side of module 100 without causing overshooting.

Typically, the predetermined level of concentrate concentration deemed not to be practicable to continue treating, is based on one of a number of operational considerations, such as rate of accumulation of foulants and energy efficiency.

Reference in now made to FIG. 2A, which illustrates the periodic variations in mixed feed water pressure as measured by pressure sensor 108, and in the mixed feed water osmotic pressure estimated to exist at pressure sensor 108 when circulation pump 126 is operating at a normal pumping rate. The estimated mixed feed water osmotic pressure at pressure sensor 108 is generally a function of the salinity of the water at the feed side of the membranes 112 in module 100.

Periodic variations in the mixed feed water pressure during water treatment correspond to periodic variations in the salinity of the feed water entering module 100, as measurable by the conductivity sensor, typically located downstream of pressure sensor 108. The y-axis represents pressure in seawater desalination, and the x-axis represent time. Dashed vertical lines 'A' represent points in time where a threshold, such as a maximum feed water pressure threshold, is reached.

When the threshold is reached, pressure vessels 110 are still filled with concentrate, whose salt concentration continues to increase as it moves through the pressure vessel. Therefore, both mixed feed water osmotic pressure and mixed feed water pressure continue to increase, until feed water enters the pressure vessels 110 replacing the concentrate therein. Typically, reaching the threshold causes the system to begin the brine flushing process.

In FIGS. 2A and 2B, the mixed feed water osmotic pressure line 170 represents the estimated osmotic pressure of the mixed feed water. Thus, when feed water from pump 102 is mixed with concentrate from recirculation conduit 122, the mixed osmotic pressure gradually increases as seen in the gradual slope of line 170. Once a threshold, such as a salinity threshold or a pressure threshold, is reached the controller 162 preferably begins the flushing process. During the flushing process, concentrate is not recirculated back to feed manifold 114, thus only feed water enters feed manifold 114 and the mixed osmotic pressure decreases sharply, as shown in the sharp decline in line 170.

Line 175 in FIG. 2A illustrates the behavior of the mixed feed water pressure in the prior art, represented by the teaching of U.S. Pat. No. 8,025,804. Line 180 illustrates the mixed feed water pressure being controlled by the controller such that the mixed feed water pressure needed for reverse osmosis desalination process is maintained not only during the gradual increase of mixed feed water pressure, when concentrate is being recirculated back to feed manifold 114, but also at times of flushing the brine in pressure vessels 110 by feeding only feed water without recirculated concentrate. The difference between line 175 and line 180 illustrates the energy benefit of operation at lower pressures for desalination of sea water, thus saving energy.

In both FIGS. 2A and 2B, line 190 illustrates the osmotic pressure of the module feed side water.

As described further hereinbelow, FIG. 2B is similar to FIG. 2A, except that the values are provided for the embodiment where circulation pump 126 is operating at a higher than normal pumping rate, generating a higher flow.

Reference is now made to FIGS. 3A-3D, which are simplified illustrations of water flows in a first embodiment of a water treatment system of the type shown in FIG. 1.

Figure 3A:
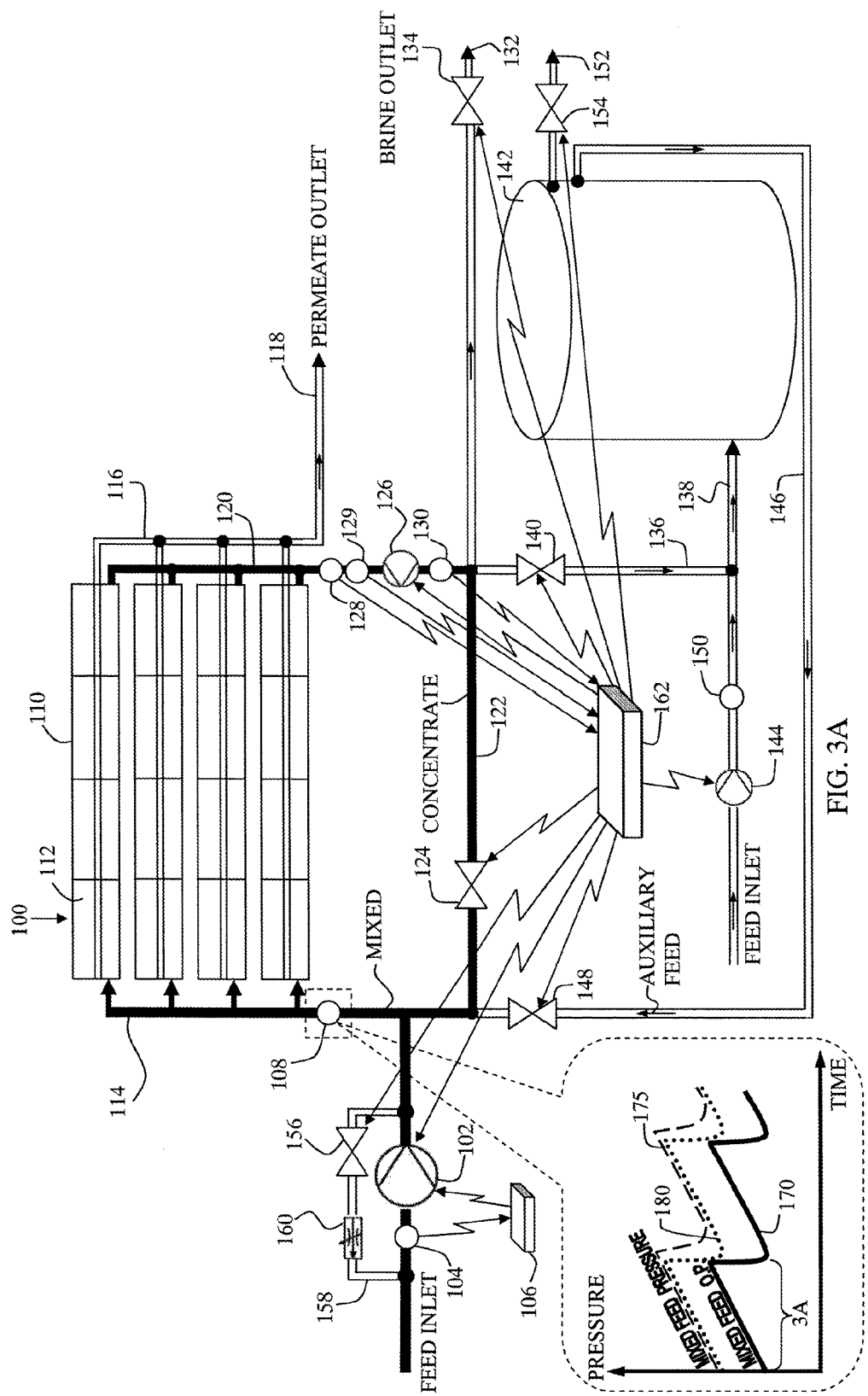
FIGS. 3A, 3B, 3C and 3D are simplified illustrations of liquid flows in the system of FIG. 1 at various stages in the periodic variation in feed water pressure and osmotic pressure shown in FIG. 2A in accordance with one embodiment of the present invention.

FIG. 3A shows the flow during normal steady state operation of the system in solid black.

Figure 3B:
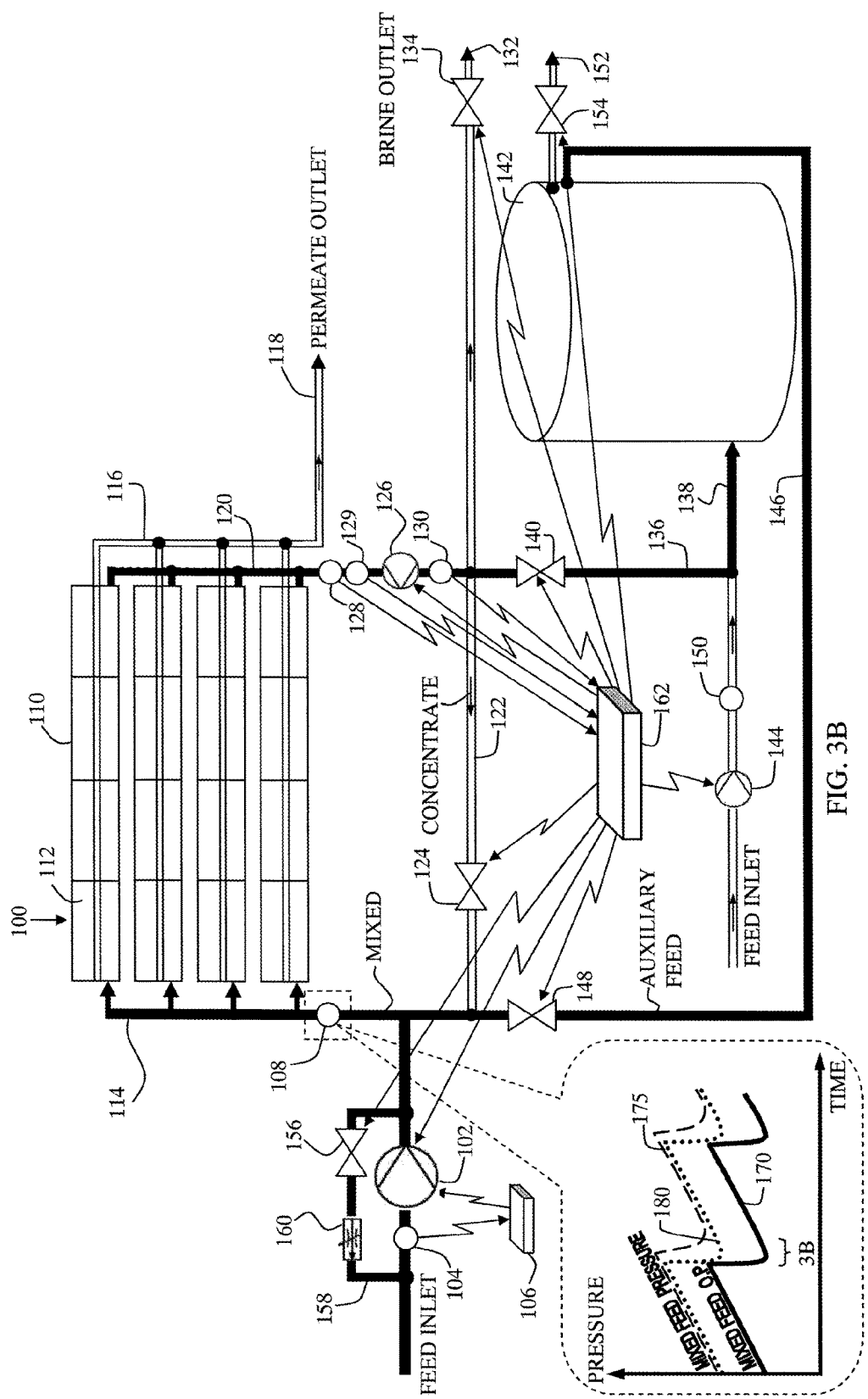

FIG. 3B shows, in solid black lines, the flow that takes place, once the concentration of the concentrate increases to a predetermined level. At this stage, the FPM controller 162 opens auxiliary brine replacement control valve 140, closes recirculation control valve 124 and opens auxiliary feed water control valve 148. Brine from concentrate manifold 120 flows through auxiliary brine replacement conduit 136 and auxiliary brine replacement control valve 140 via auxiliary tank feed conduit 138 to auxiliary feed water tank 142. The auxiliary feed water tank 142 is filled with feed water prior to the opening of auxiliary brine replacement control valve 140, as described hereinbelow. The brine enters the auxiliary feed water tank 142 and drives feed water from tank 142 to feed manifold 114 via auxiliary feed water conduit 146 and auxiliary feed water control valve 148.

It is noted that water in auxiliary feed water tank 142 may be maintained at the same pressure as that of the brine, such as by maintaining auxiliary brine replacement control valve 140 in an open state as the water pressure in the system gradually increases. Alternatively, the water in the auxiliary feed water tank 142 may be maintained at a pressure which is much lower than the pressure of the brine but above atmospheric pressure by operation of auxiliary feed water pump 144, as described hereinbelow.

During flushing, FPM controller 162 preferably opens recycle conduit control valve 156, resulting in a water flow from a location downstream of pump 102 to a location upstream of pump 102, optionally thorough a restrictor 160, thus lowering the feed water pressure at manifold 114 to a pressure above atmospheric pressure, which pressure exceeds the osmotic pressure of the feed water at the feed side of module 100.

Concentrate flow rate sensor 130 measures the cumulative volume of brine flowing from concentrate manifold 120 and thus measures the cumulative volume of feed water entering feed manifold 114 via auxiliary feed water conduit 146 and auxiliary feed water control valve 148, which replaces the brine in module 100.

Figure 3C:
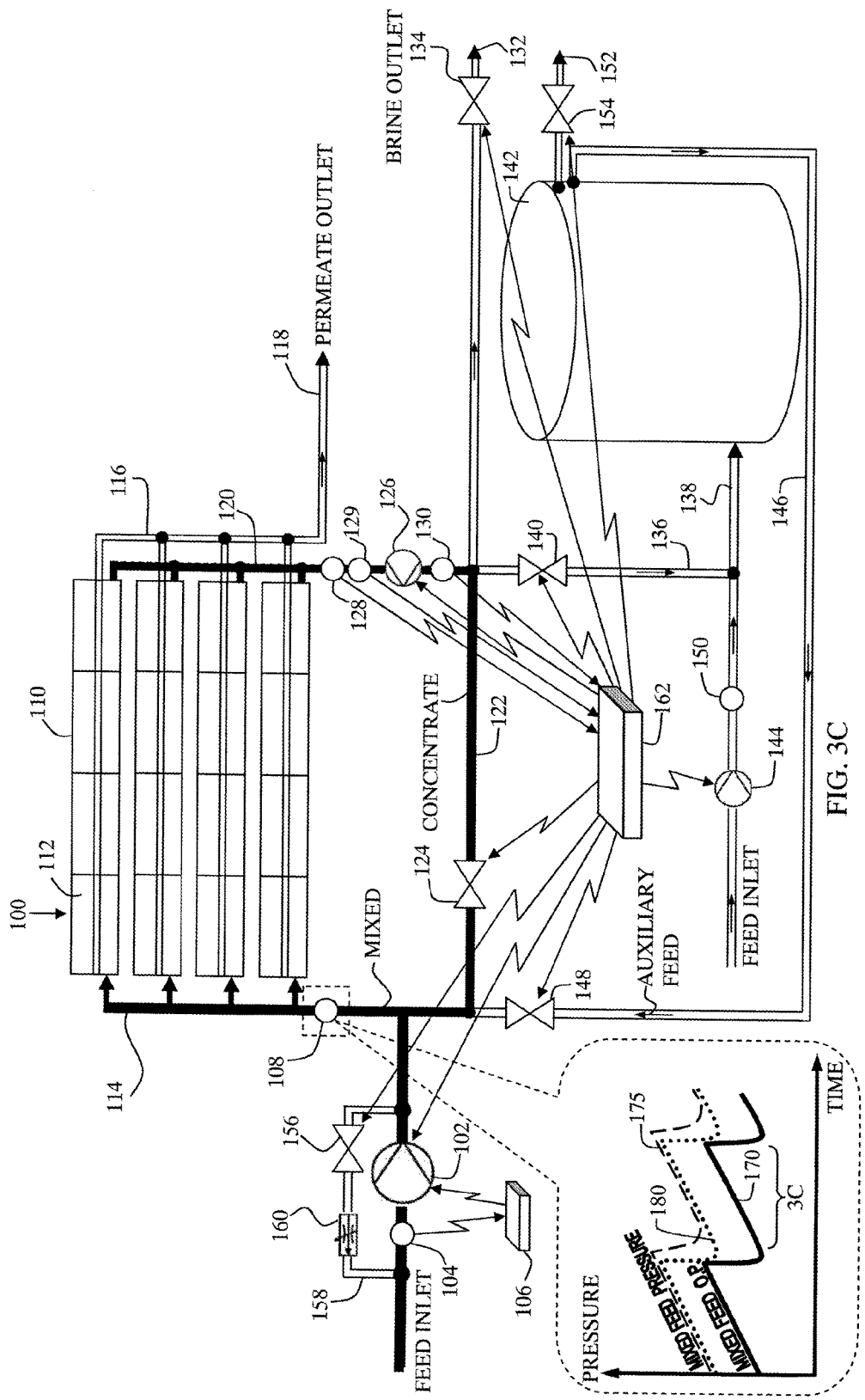
Figure 3D:
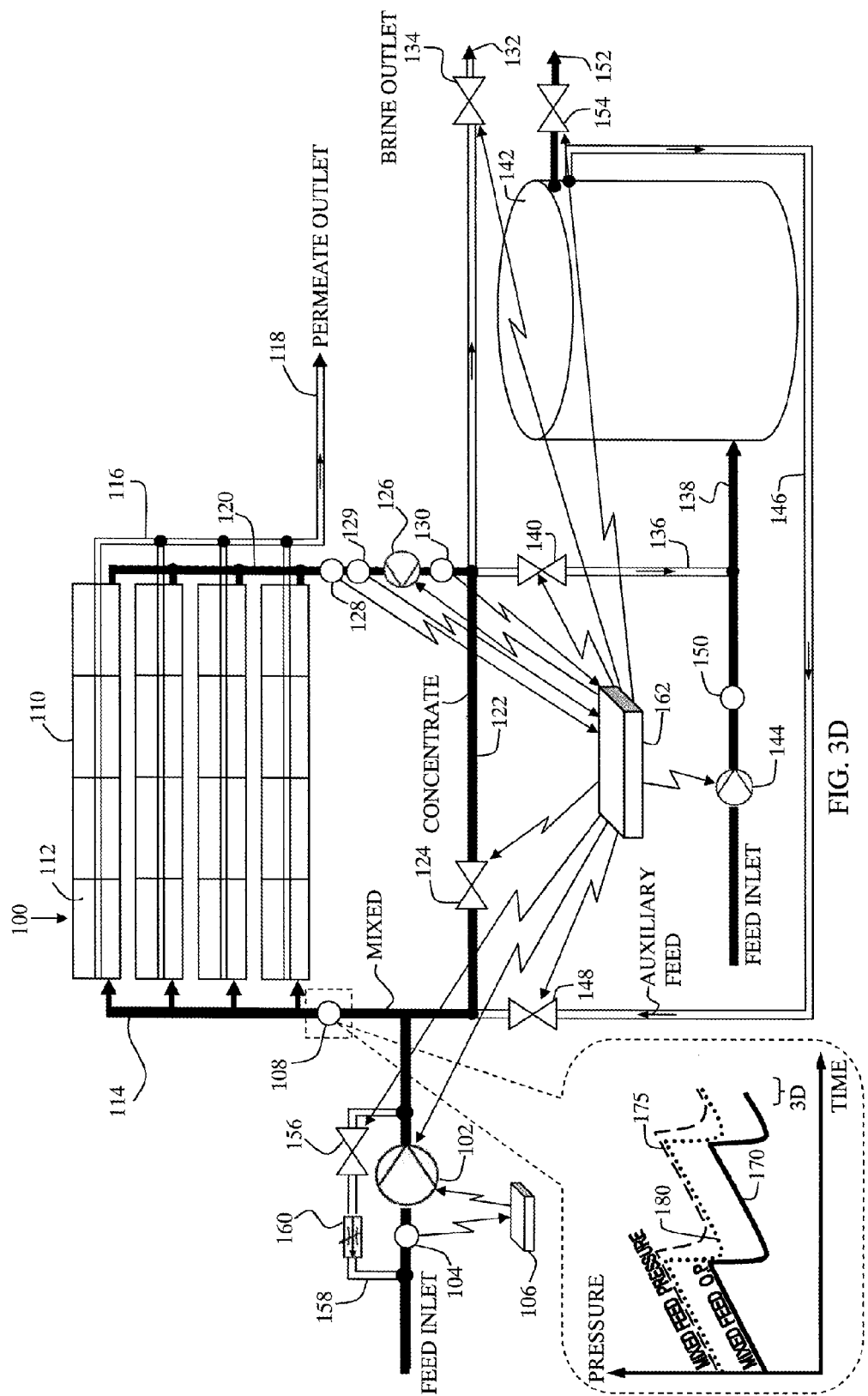

After complete replacement of brine with feed water in module 100, FPM controller 162 reopens recirculation control valve 124 and closes auxiliary brine replacement control valve 140, auxiliary feed water control valve 148 and recycle conduit control valve 156, providing a liquid flow as shown in FIG. 3C, which may be identical to the liquid flow illustrated in FIG. 3A, in which the operation of circulation pump 126 and of high pressure pump 102 supplies mixed feed water to module 100.

Thereafter, FPM controller 162 periodically activates auxiliary feed water pump 144 and opens auxiliary brine outlet tank control valve 154 to flush all brine from auxiliary feed water tank 142 through an auxiliary brine outlet 152 to a location outside of the at least one water treatment system, and to fill the auxiliary feed tank 142 with feed water for future replacement of the brine in module 100. This flow is shown in solid black lines in FIG. 3D.

Following full replacement of brine with feed water in auxiliary feed water tank 142, as measured by auxiliary flow sensor 150, FPM controller 162 closes auxiliary brine outlet tank control valve 154 and terminates operation of auxiliary feed water pump 144.

Reference is now made to FIGS. 4A-4D, which are simplified illustrations of water flows in a second embodiment of a water treatment system of the type shown in FIG. 1.

Prior to initiation of removal of the concentrate from the module 100, brine outlet control valve 134, auxiliary brine replacement control valve 140, auxiliary feed water control valve 148 and recycle conduit control valve 156 are closed and recirculation control valve 124 is open. The concentrate from concentrate manifold 120 is directed back to input of feed manifold 114 via recirculation conduit 122 and recirculation control valve 124, as shown by an arrow labeled CONCENTRATE (FIG. 1), representing the recirculation flow in the recirculation conduit 122. In feed manifold 114, the concentrate is mixed with feed water, as shown by an arrow labeled MIXED (FIG. 1), representing the mixed flow in the feed manifold 114. Thus, a mixed flow enters pressure vessels 110 for further treatment. The water flow for this stage is shown in a solid black line in FIG. 4A.

The feed pressure thereafter gradually increases, as the salinity of the mixed water being supplied to membrane elements 112 increases, and the above-described recirculation process continues.

Once the concentration of the concentrate reaches a threshold, such as a predetermined salinity level at which continued water treatment is deemed not to be practicable, FPM controller 162 opens auxiliary brine replacement control valve 140, which is approximately at atmospheric pressure, thus reducing the water pressure within module 100 to a pressure between the pressure of the concentrate at module 100 and the pressure of the feed water in the auxiliary feed tank 142.

Immediately thereafter, FPM controller 162 closes recirculation control valve 124 and opens auxiliary feed water control valve 148. Feed water from auxiliary feed tank 142 flows via auxiliary feed water conduit 146 and feed water control valve 148 to feed manifold 114, as shown in FIG. 4B, thus supplying feed water to module 100 at a pressure above the osmotic pressure of the feed water and slightly higher than the pressure required for reverse osmosis to occur.

Concentrate flow rate sensor 130 measures the cumulative volume of brine flowing from concentrate manifold 120, and thus measures the cumulative volume of feed water entering feed manifold 114 via the auxiliary feed water conduit 146 and the auxiliary feed water control valve 148, which replaces the brine in module 100.

Figure 4A:
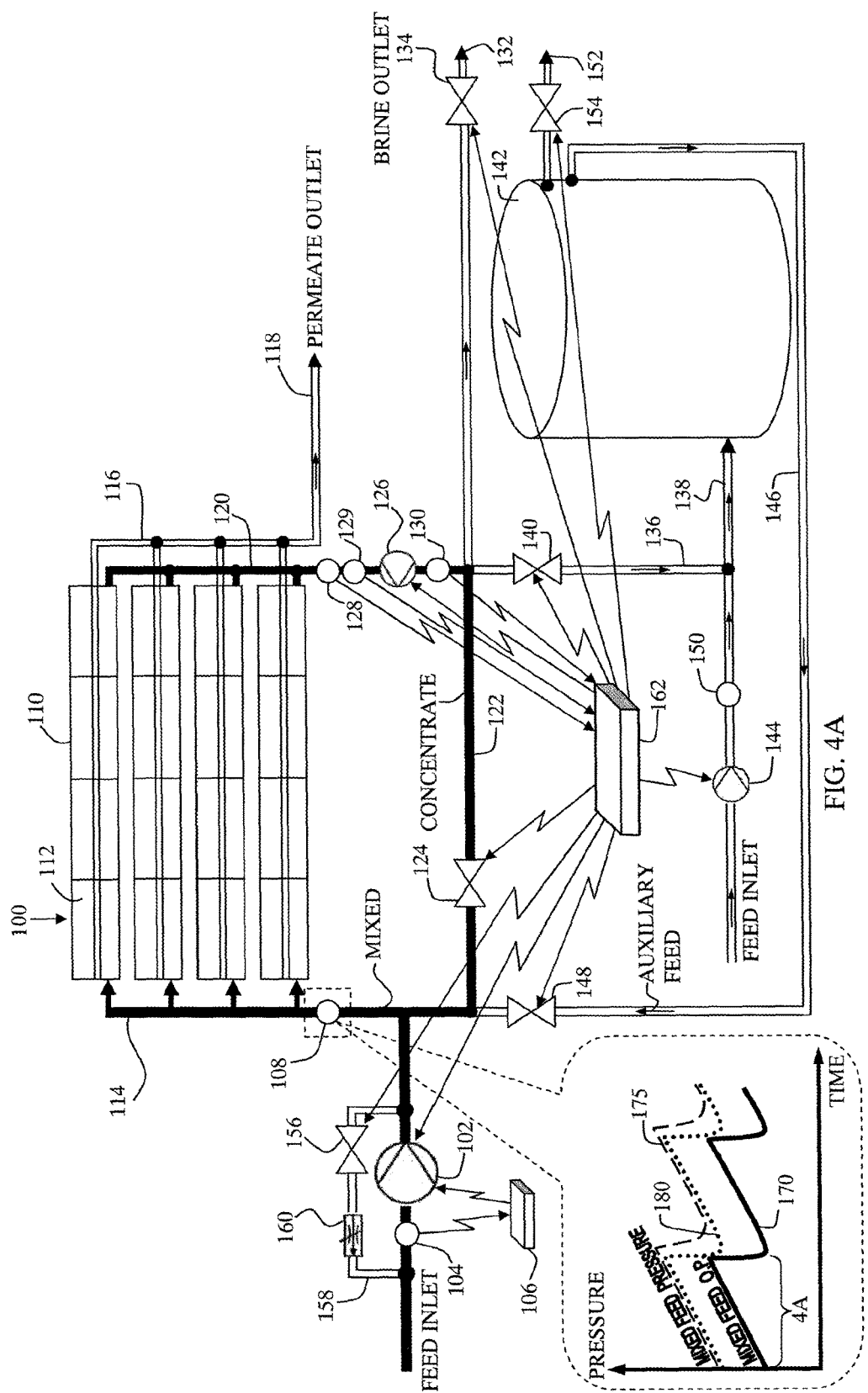
FIGS. 4A, 4B, 4C and 4D are simplified illustrations of liquid flows in the system of FIG. 1 at various stages in the periodic variation in feed water pressure and osmotic pressure shown in FIG. 2A in accordance with another embodiment of the present invention.
Figure 4B:
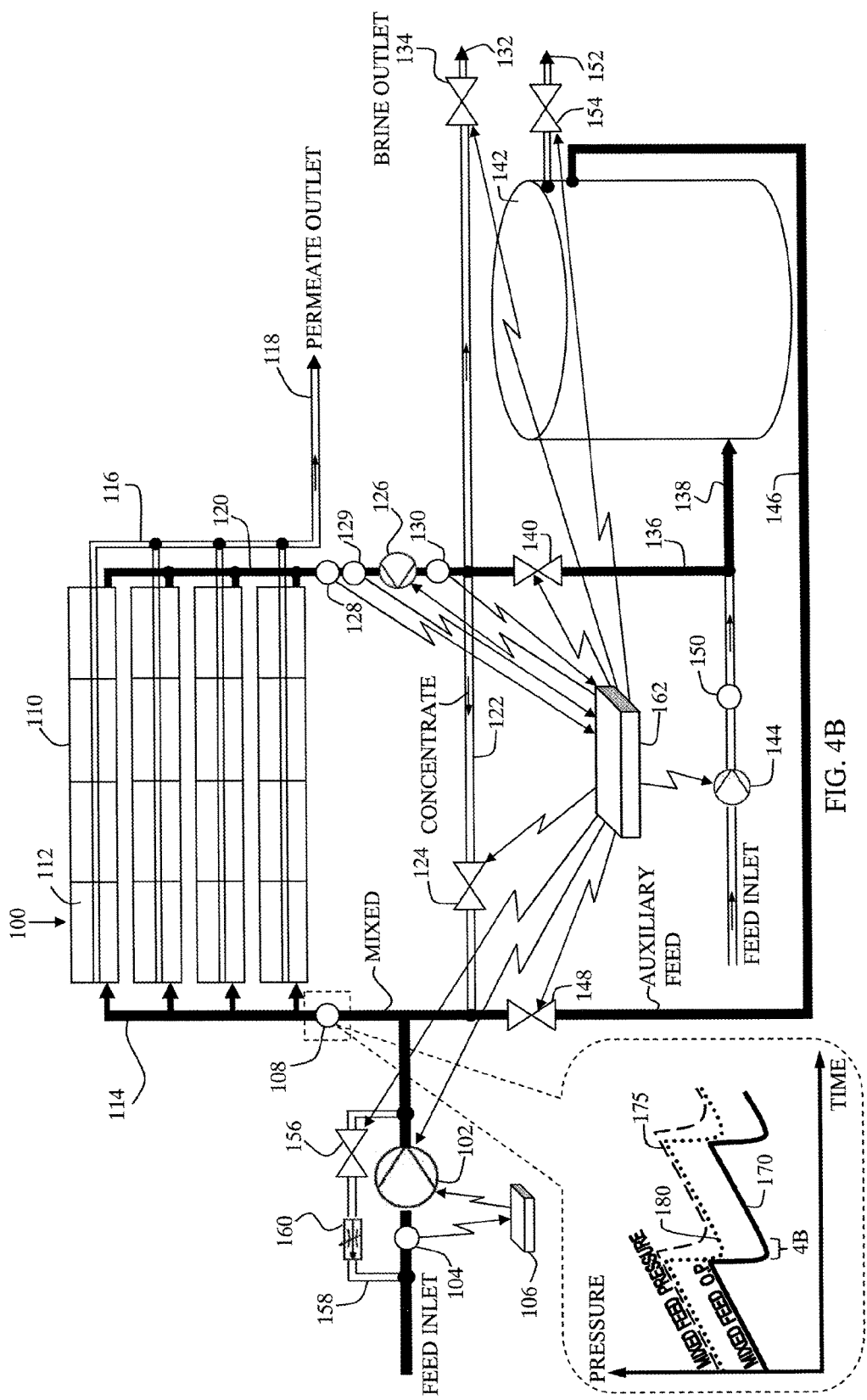
Figure 4C:
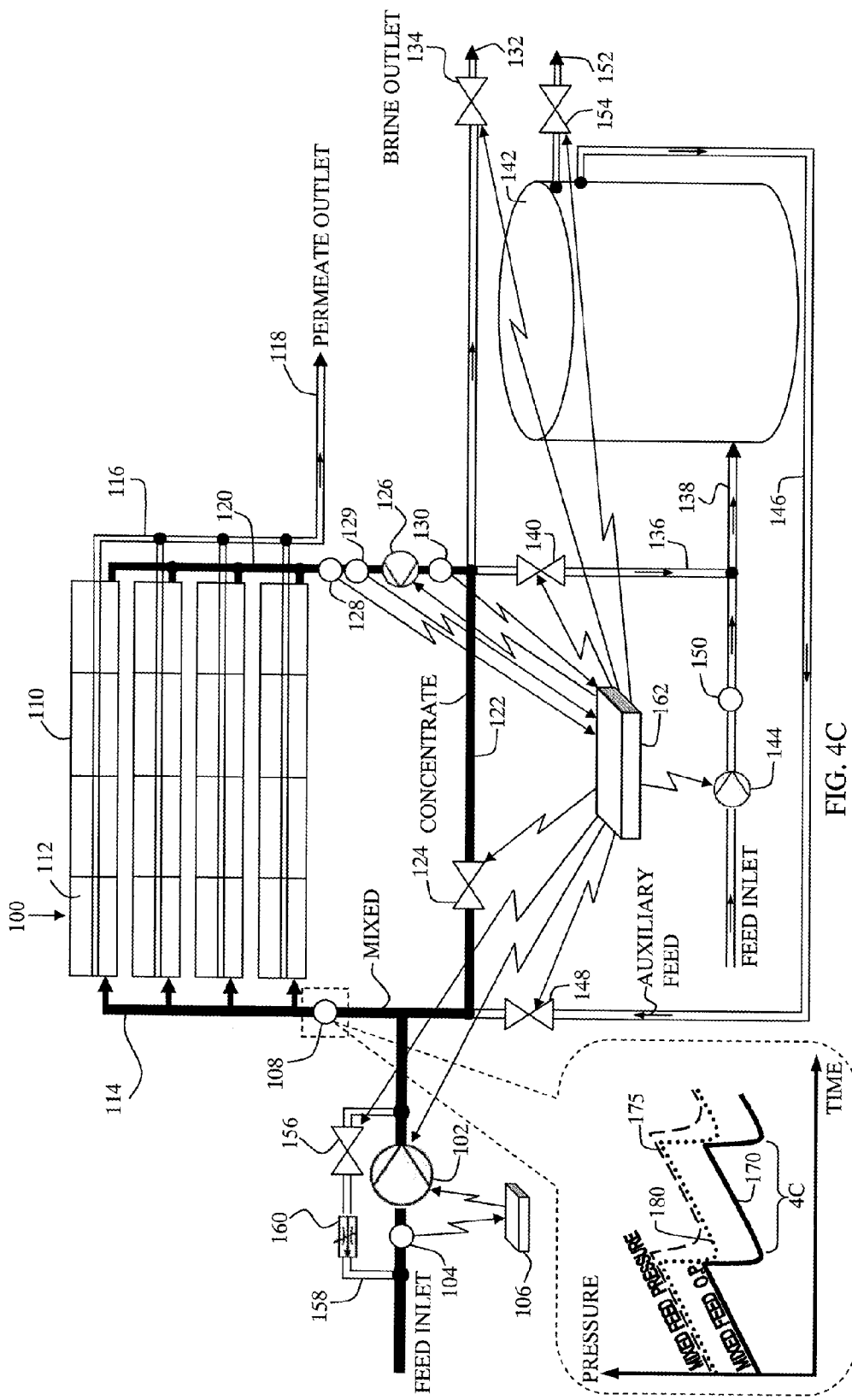

After full replacement of the brine with feed water in module 100, FPM controller 162 reopens recirculation control valve 124, and closes auxiliary brine replacement control valve 140 and auxiliary feed water control valve 148, providing a liquid flow as shown in FIG. 4C, which may be identical to the liquid flow illustrated in FIG. 4A, in which the operation of high pressure pump 102 and the circulation pump 126 supplies mixed feed water to module 100.

Figure 4D:
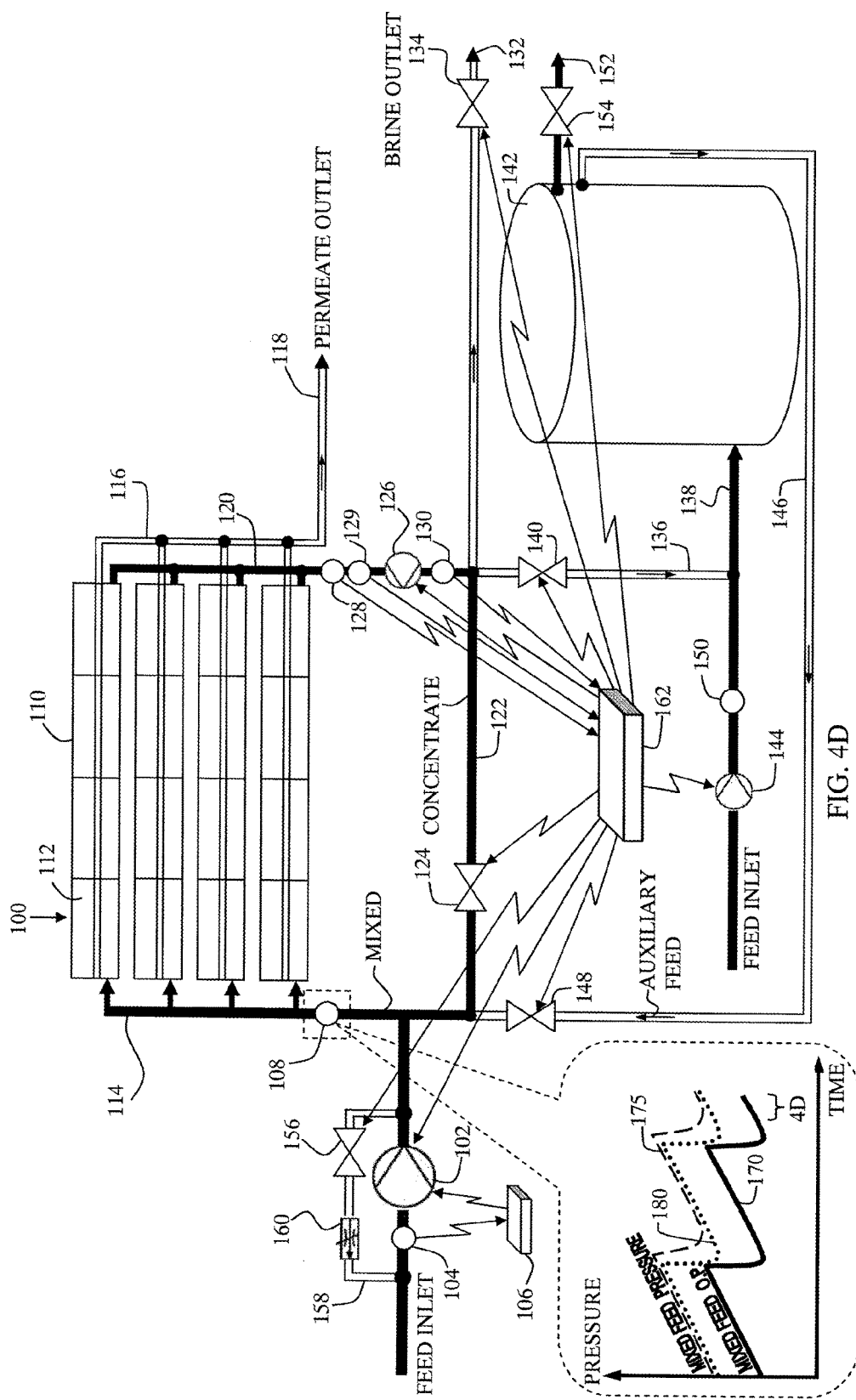

Thereafter, the FPM controller 162 periodically activates the auxiliary feed water pump 144 and opens auxiliary brine outlet tank control valve 154 to flush all brine from auxiliary feed water tank 142 through an auxiliary brine outlet 152 to a location outside of the at least one water treatment system and fill the auxiliary feed tank 142 with feed water for further replacement of the brine in module 100 with feed water as described hereinabove, as seen in FIG. 4D. Following full replacement of brine with feed water in auxiliary feed water tank 142, as measured by auxiliary flow sensor 150, FPM controller 162 closes auxiliary brine outlet tank control valve 154 and terminates operation of auxiliary feed water pump 144.

Figure 5A:
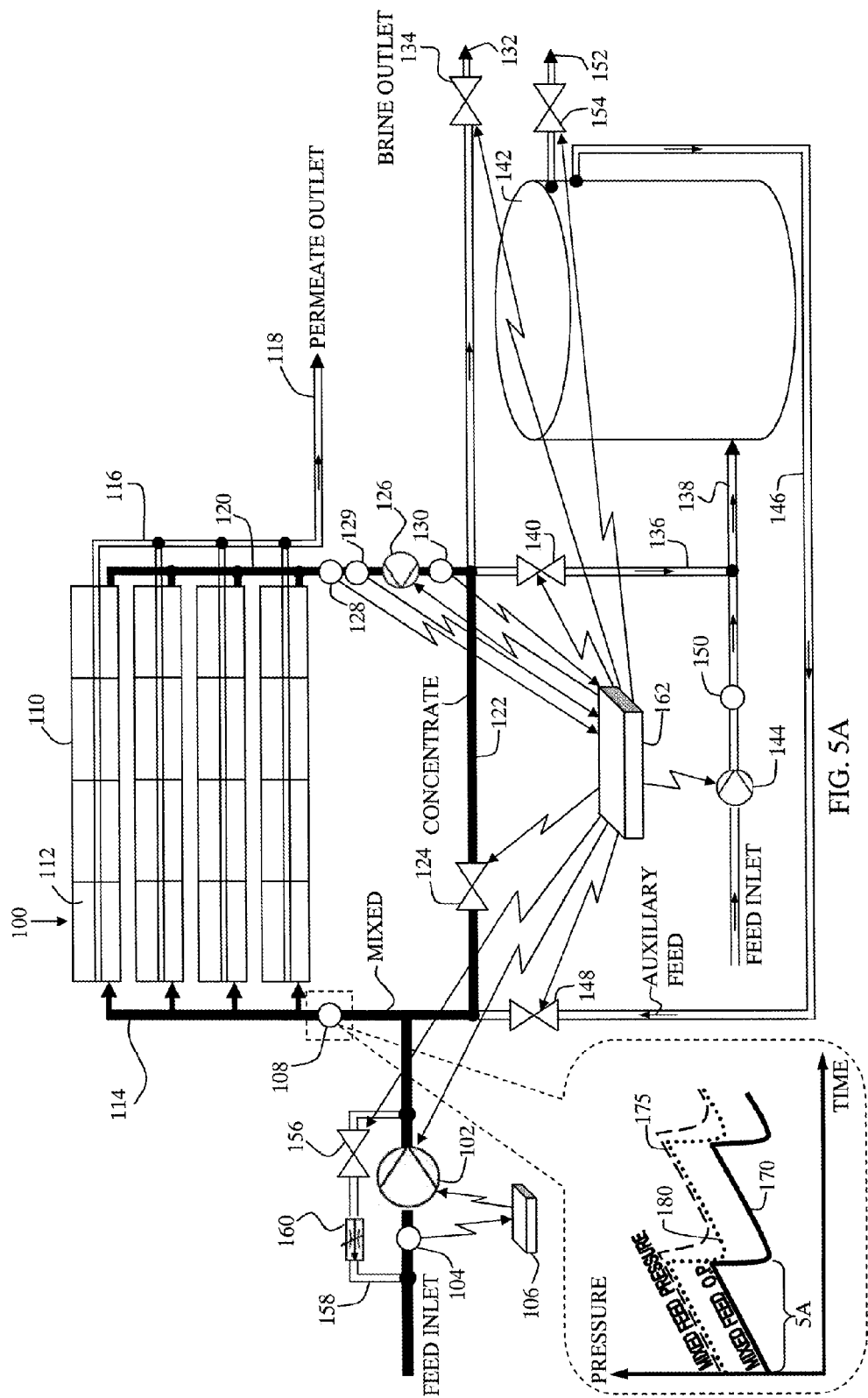
FIGS. 5A, 5B and 5C are simplified illustrations of liquid flows in the system of FIG. 1 at various stages in the periodic variation in feed water pressure and osmotic pressure shown in FIG. 2A in accordance with still another embodiment of the present invention.
Figure 5B:
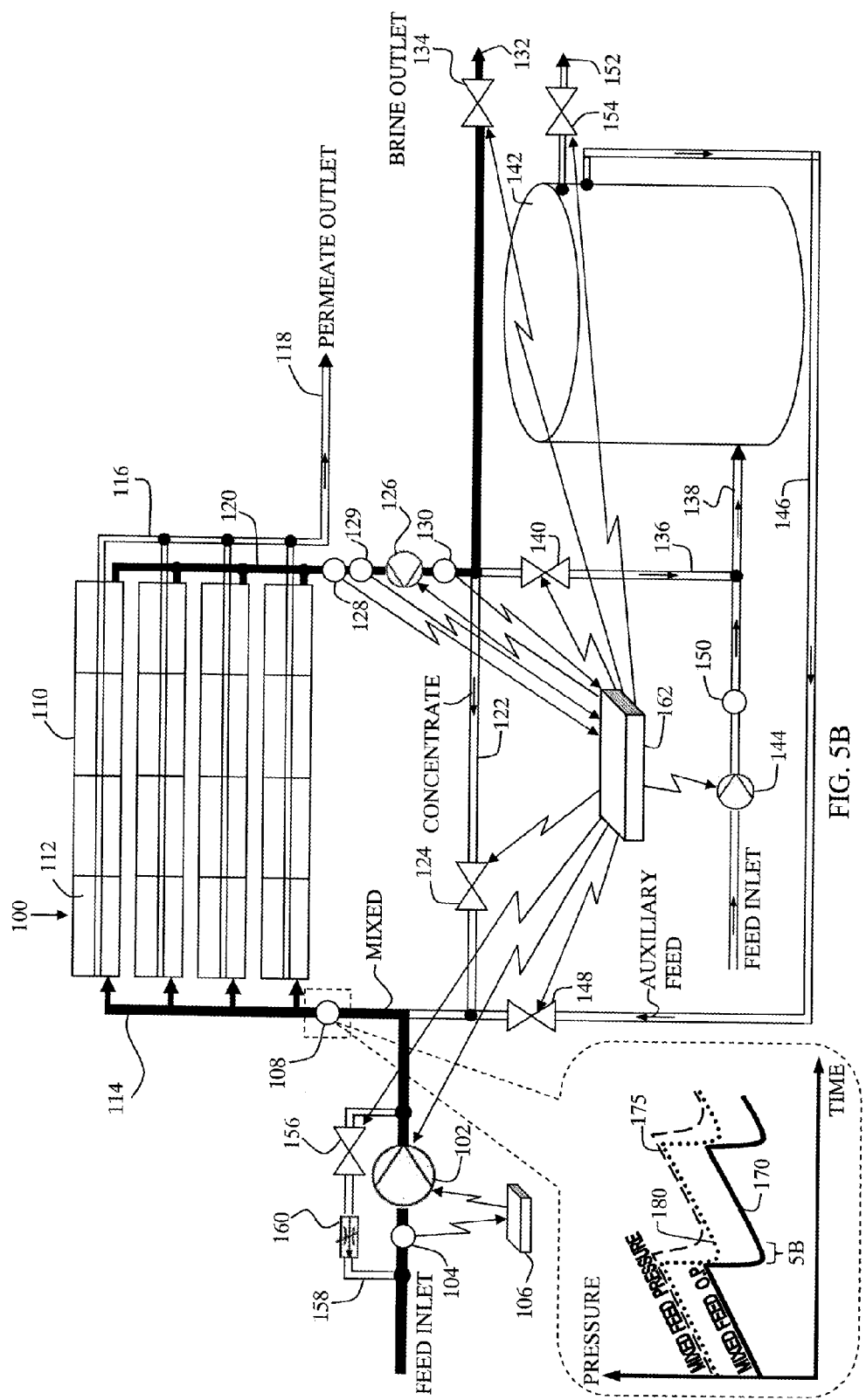
Figure 5C:
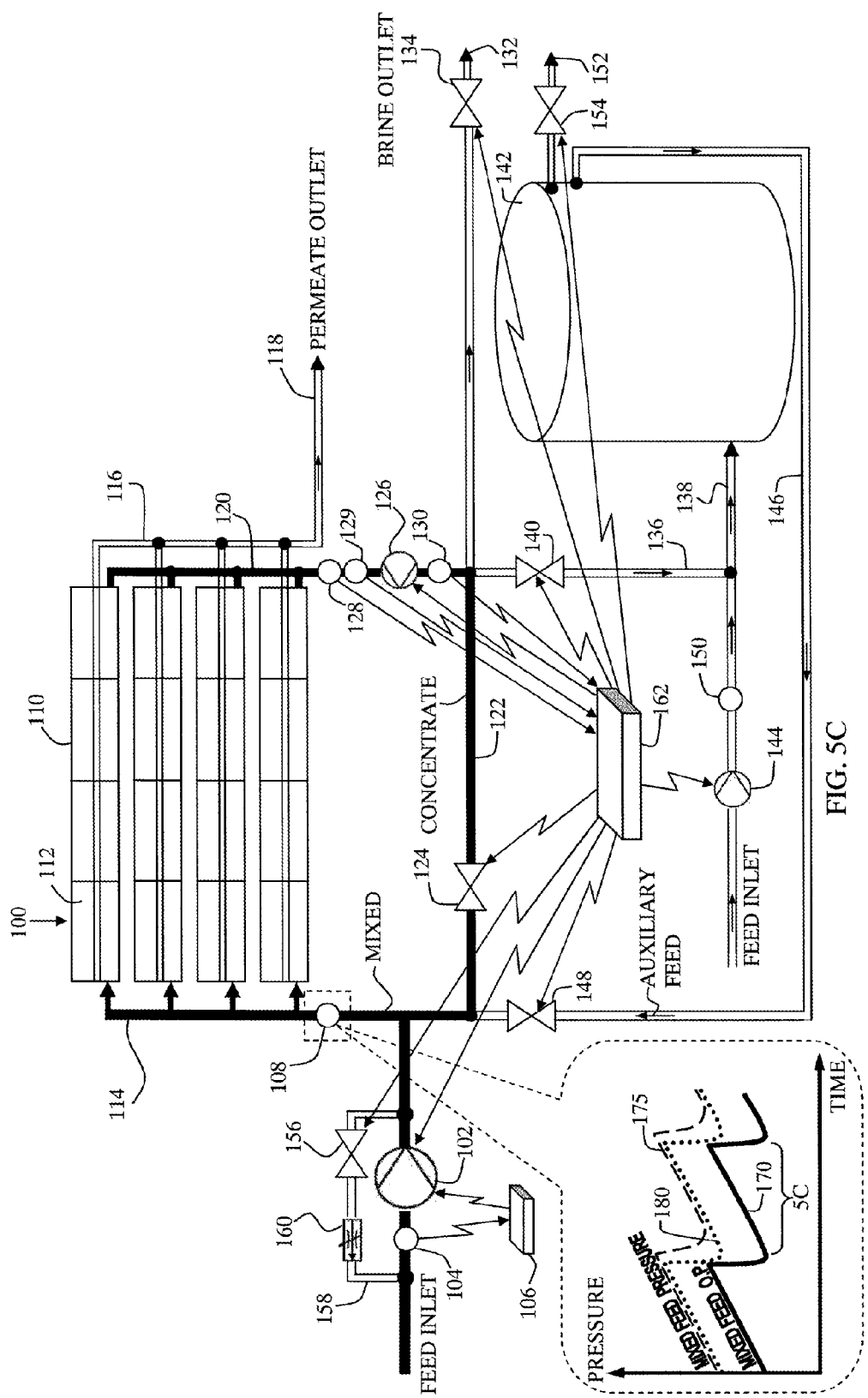

Reference is now made to FIGS. 5A-5C, which are simplified illustrations of water flows in another embodiment of a water treatment system of the type shown in FIG. 1.

Prior to initiation of removal of the concentrate from module 100, brine outlet control valve 134, auxiliary brine replacement control valve 140, auxiliary feed water control valve 148 and recycle conduit control valve 156 are closed and recirculation control valve 124 is opened. The concentrate from concentrate manifold 120 is directed back to the input of feed manifold 114 via recirculation conduit 122 and recirculation control valve 124, as shown by an arrow labeled CONCENTRATE (FIG. 1), representing the recirculation flow in the recirculation conduit 122. In feed manifold 114, the concentrate is mixed with feed water, as shown by an arrow labeled MIXED (FIG. 1) representing the mixed flow in the feed manifold 114. Thus, a mixed flow enters pressure vessels 110 for further treatment. The water flow for this stage is shown in a solid black line in FIG. 5A.

The feed pressure thereafter gradually increases as the salinity of the mixed water being supplied to the membrane elements 112 increases, and the above-described recirculation process continues.

Once the concentration of the concentrate reaches a threshold, such as a predetermined salinity level at which continued water treatment is deemed not to be practicable, FPM controller 162 preferably closes concentrate recirculation control valve 124 and at least partially opens brine outlet control valve 134, thus allowing brine to flow via brine outlet 132 to a location outside of the at least one water treatment system, thus reducing the system pressure to a pressure above the atmospheric pressure, which pressure exceeds the osmotic pressure of the feed water at the feed side of module 100. The brine is all flushed through brine outlet 132 from the at least one water treatment system, while high pressure feed pump 102 continues to pump feed water to feed side of module 100, as shown in FIG. 5B. It is possible to increase the flow rate of pump 102 at this stage in order to speed the flushing of the brine.

Concentrate flow rate sensor 130 measures the cumulative volume of brine flowing from concentrate manifold 120, and thus measures when the full flushing of the brine out of module 100 has been completed.

After fully flushing the brine from module 100, FPM controller 162 reopens recirculation control valve 124 and closes brine outlet control valve 134, providing a liquid flow as shown in FIG. 5C, which may be identical to the liquid flow illustrated in FIG. 5A, in which the operation of high pressure pump 102 and the circulation pump 126 supplies mixed feed water to module 100.

Reference is now made to FIGS. 6A-6D, which are simplified illustrations of water flows in yet another embodiment of a water treatment system of the type shown in FIG. 1.

Prior to initiation of removal of the concentrate from module 100, brine outlet control valve 134, auxiliary brine replacement control valve 140, auxiliary feed water control valve 148 and recycle conduit control valve 156 are closed and recirculation control valve 124 is open. The concentrate from concentrate manifold 120 is directed back to the input of feed manifold 114 via recirculation conduit 122 and recirculation control valve 124, as shown by an arrow labeled CONCENTRATE (FIG. 1), representing the recirculation flow in the recirculation conduit 122. In feed manifold 114, the concentrate is mixed with feed water, as shown by an arrow labeled MIXED (FIG. 1), representing the mixed flow in the feed manifold 114. Thus, a mixed flow enters pressure vessels 110 for further treatment. The water flow for this stage is shown in a solid black line in FIG. 6A.

The feed pressure thereafter gradually increases, as the salinity of the mixed liquid being supplied to the membrane elements 112 increases, and the above-described recirculation process continues.

Once the concentration of the concentrate reaches a threshold, such as a predetermined pressure level, FPM controller 162 opens auxiliary brine replacement control valve 140, closes recirculation control valve 124 and opens auxiliary feed water control valve 148. Brine from concentrate manifold 120 flows through auxiliary brine replacement conduit 136, auxiliary brine replacement control valve 140 and auxiliary tank feed conduit 138 to auxiliary feed water tank 142.

The auxiliary feed water tank 142 is filled with feed water prior to the opening of brine replacement control valve 140, as described hereinbelow. Brine entering the auxiliary feed water tank 142 drives feed water in it to feed manifold 114 via an auxiliary feed water conduit 146 and an auxiliary feed water control valve 148.

Figure 6A:
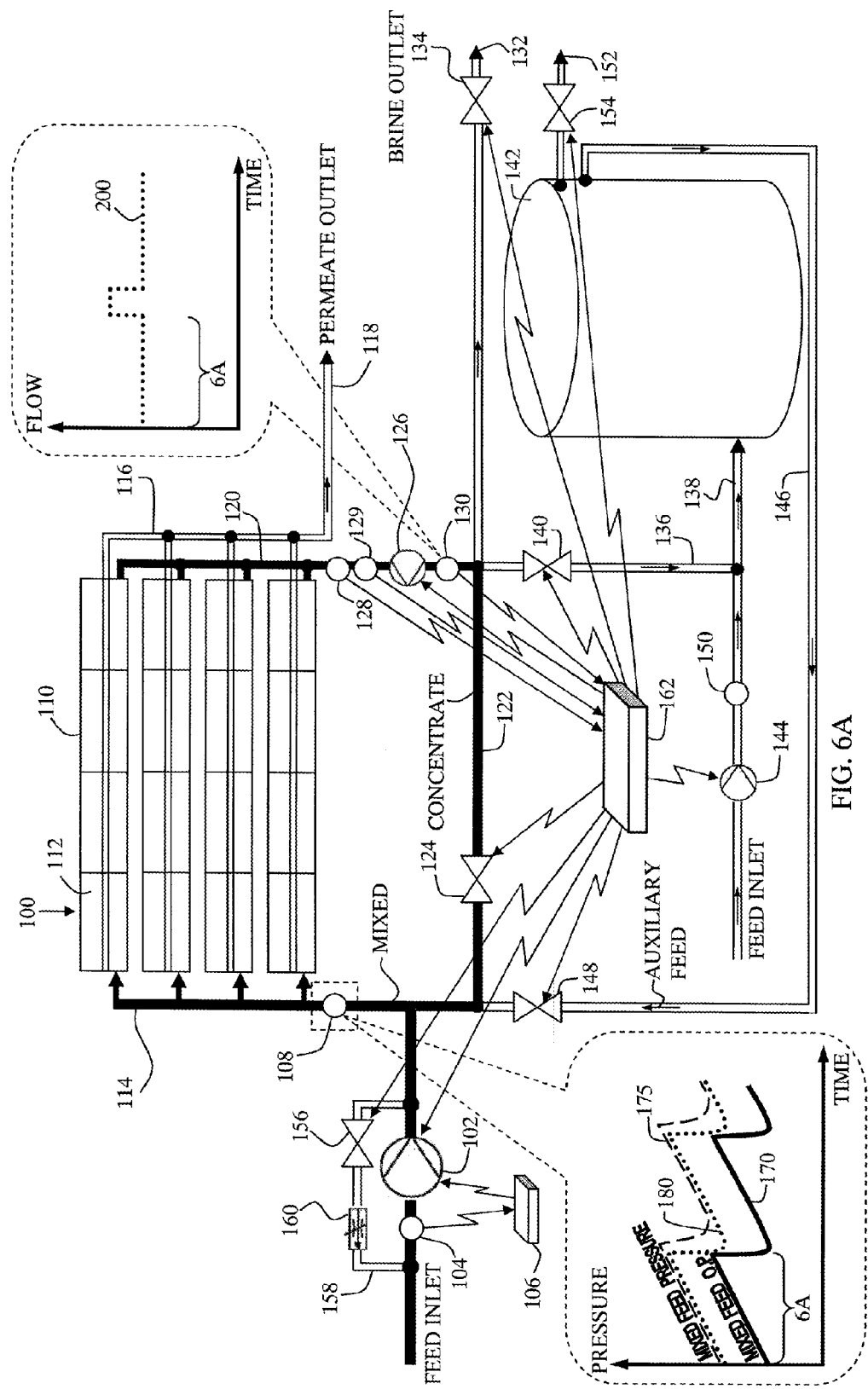
FIGS. 6A, 6B, 6C and 6D are simplified illustrations of liquid flows in the system of FIG. 1 at various stages in the periodic variation in feed water pressure and osmotic pressure shown in FIG. 2B in accordance with yet another embodiment of the present invention.
Figure 6B:
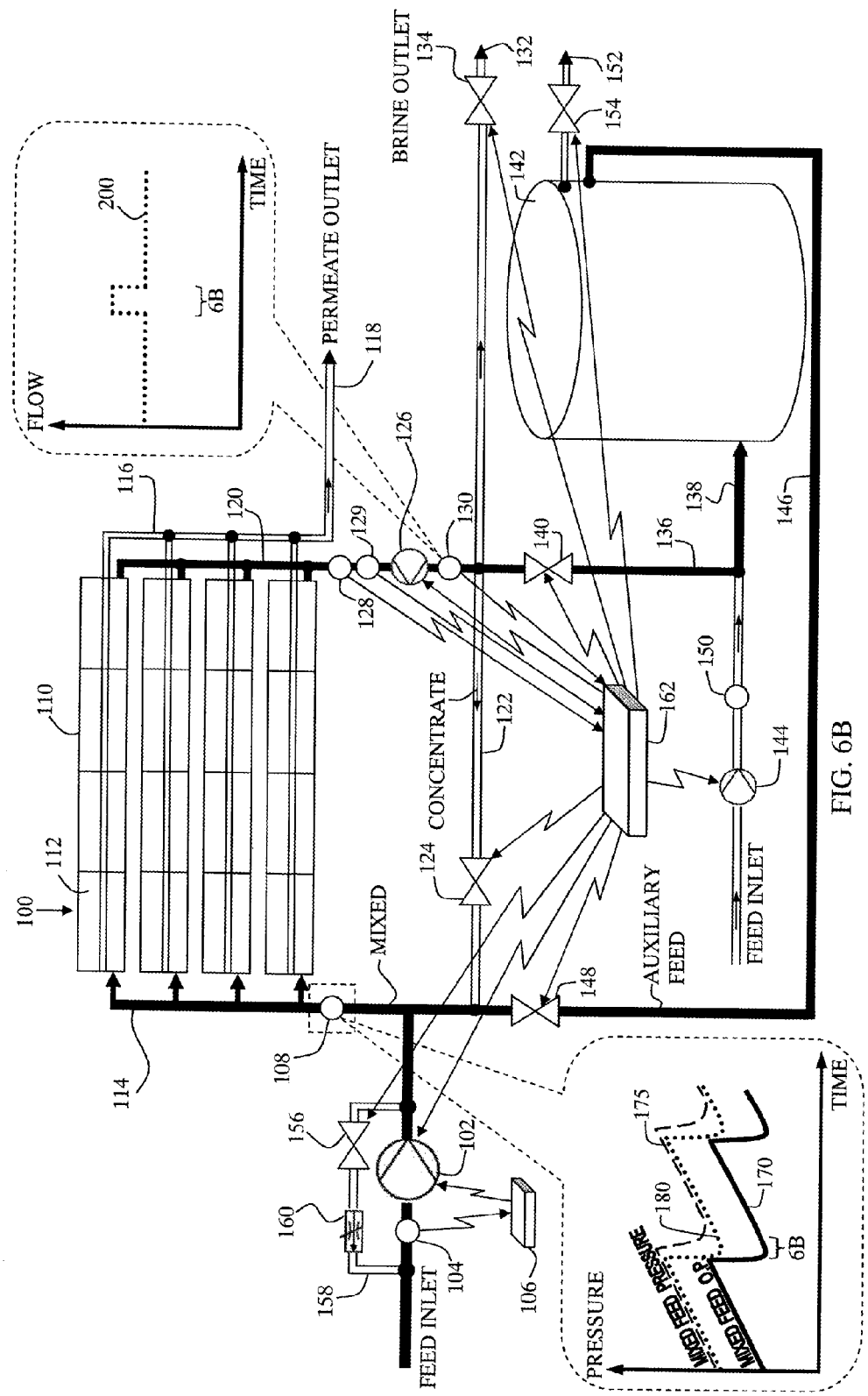

The water flow for this stage is shown in a solid black line in FIG. 6B.

It is appreciated that the water in auxiliary feed water tank 142 may be maintained at a pressure generally the same as the pressure of the brine, such as by maintaining auxiliary opening brine replacement control valve 140 in an open state as the pressure in the system gradually increases. Alternatively, the water in the auxiliary feed water tank 142 may be maintained at a pressure which is much lower than the pressure of the brine but above the atmospheric pressure by operation of the auxiliary feed water pump 144 as described hereinbelow.

In the embodiment of FIGS. 6A-6D, FPM controller 162 preferably increases the flow rate of circulation pump 126 during flushing to achieve faster replacement of the brine from module 100 with feed water from auxiliary feed tank 142, hence, reducing the time required for the brine to be flushed from module 100 and replaced by feed water. A typical graph of flow rate over time, as measured by concentrate flow rate sensor 130, located downstream of circulation pump 126, appears in an enlargement forming part of FIG. 6B, in which line 200 represents the flow rate over time.

Concentrate flow rate sensor 130 measures the cumulative volume of brine flowing from concentrate manifold 120 and thus measures the cumulative volume of feed water entering feed manifold 114 via the auxiliary feed water conduit 146 and the auxiliary feed water control valve 148, which replaces the brine in module 100.

Figure 6C:
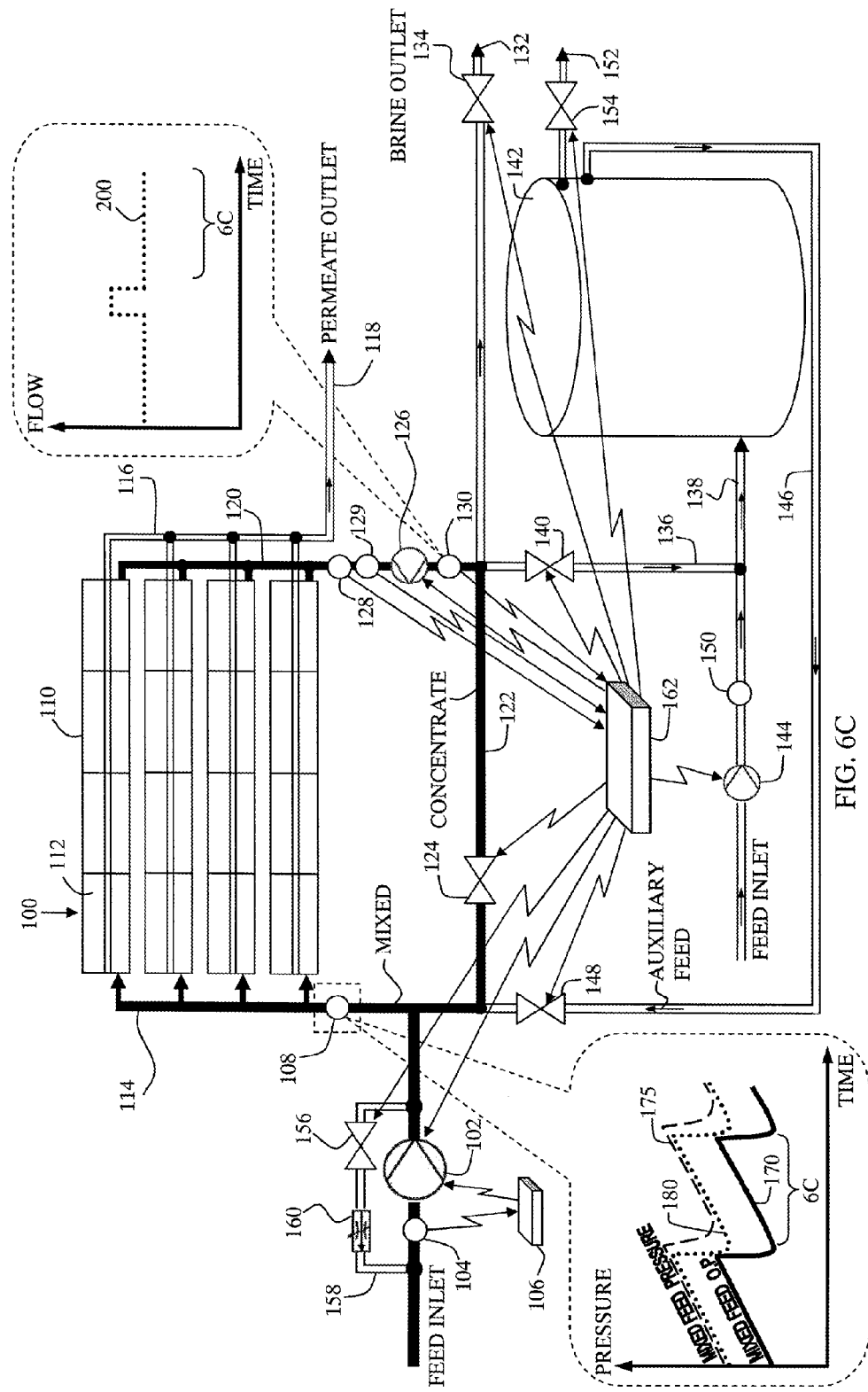

After complete replacement of the brine with feed water in module 100, FPM controller 162 reopens recirculation control valve 124, closes auxiliary brine replacement control valve 140 and auxiliary feed water control valve 148, and reduces the flow rate of circulation pump 126 to the flow rate prior to opening concentrate recirculation control valve 124, providing a liquid flow as shown in FIG. 6C, which may be identical to the liquid flow illustrated in FIG. 6A, in which the operation of high pressure pump 102 and the circulation pump 126 supplies mixed feed water to module 100.

Figure 6D:
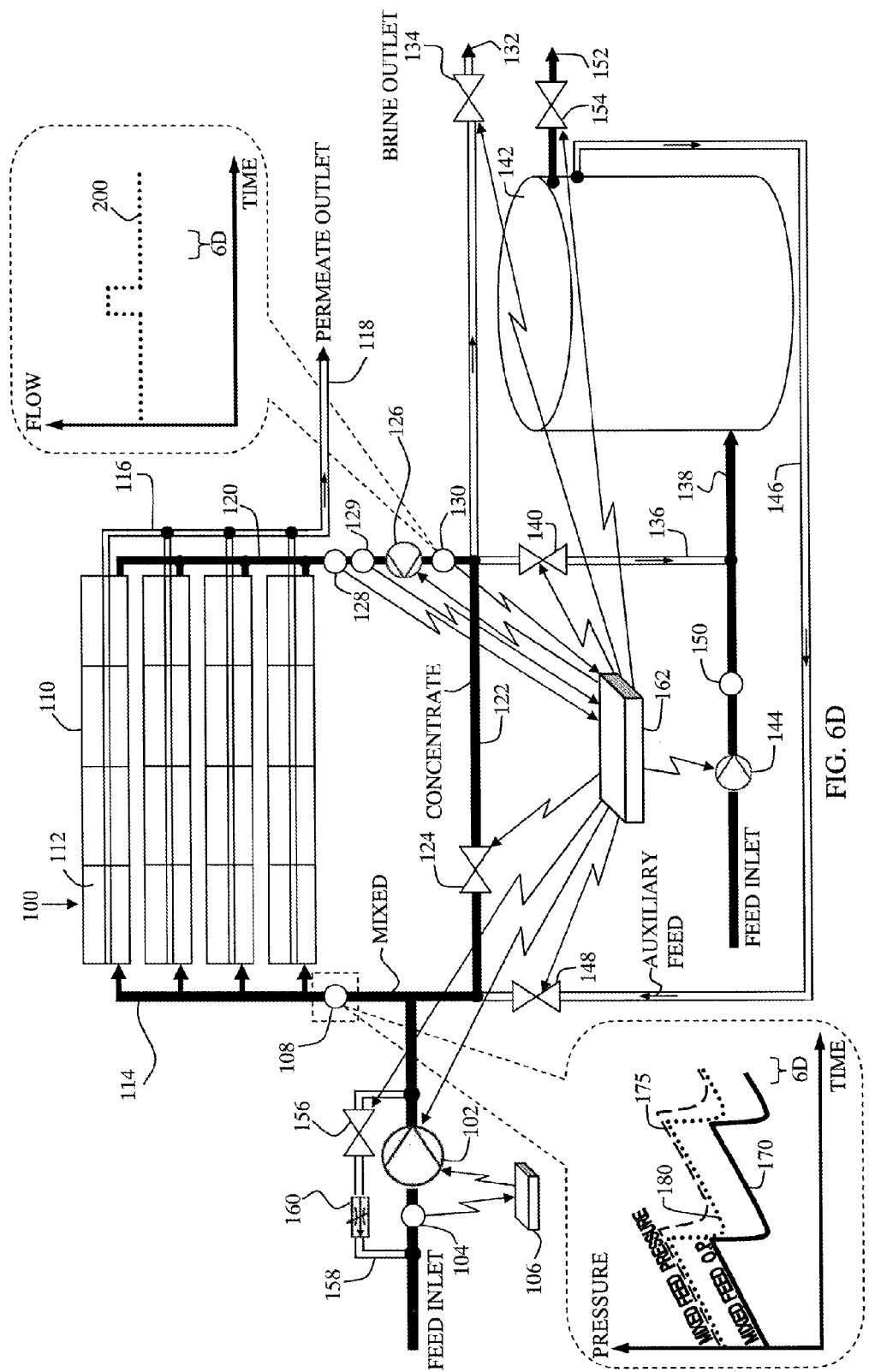

Thereafter, FPM controller 162 periodically activates auxiliary feed water pump 144 and opens auxiliary brine outlet tank control valve 154 to flush all brine from auxiliary feed water tank 142 through an auxiliary brine outlet 152 to a location outside of the at least one water treatment system, and fill the auxiliary feed tank 142 with feed water for further replacement of the brine in module 100 with feed water as described hereinabove, as seen in FIG. 6D.

Following full replacement of brine with feed water in auxiliary feed water tank 142, as measured by auxiliary flow rate sensor 150, FPM controller 162 closes auxiliary brine outlet tank control valve 154 and terminates operation of auxiliary feed water pump 144.

Reference in now additionally made to FIG. 2B, wherein periodic variations in the feed water pressure during water treatment correspond to periodic variations in the salinity of the feed water entering module 100, as measurable by a conductivity sensor (not shown), typically located downstream of pressure sensor 108. As in FIG. 2A described hereinabove, the y-axis represents the pressure variations in seawater desalination, and the x-axis represent the time. Dashed vertical line 'A' represents the time where a threshold, such as a maximum feed water pressure threshold, is reached When the threshold is reached, pressure vessels 110 are still filled with concentrate and both mixed osmotic pressure and mixed feed water pressure continue to increase, until feed water enters the pressure vessels 110 replacing the concentrate therein. Typically, reaching the threshold causes the system to begin the brine flushing process.

As described hereinabove, the mixed feed water osmotic pressure line 170 represents the estimated osmotic pressure of mixed feed water at module 100 inlet. Thus, when feed water from pump 102 is mixed with concentrate from recirculation conduit 122, the mixed osmotic pressure gradually increases as seen in the gradual slope of line 170. Once a threshold, such as a salinity threshold or a pressure threshold, is reached the controller 162 preferably begins the flushing process. During the flushing process, concentrate is not recirculated back to feed manifold 114, thus only feed water enters feed manifold 114 and the mixed osmotic pressure decreases sharply, as shown in the sharp decline in line 170.

Line 175 in FIG. 2B illustrates the behavior of the mixed feed water pressure in the prior art, represented by the teaching of U.S. Pat. No. 8,025,804. Line 180 illustrates the pressure being controlled by the controller such that the delta pressure needed for reverse osmosis desalination process is maintained not only during the gradual increase of mixed feed water pressure, when concentrate is being recirculated back to feed manifold 114, but also at times of flushing the brine in pressure vessels 110 by feeding only feed water without recirculated concentrate. As seen in FIG. 2B, increasing of flow rate of circulation pump 126, vis-à-vis the flow rate of circulation pump 126 used in the example of FIG. 2A, causes the mixed osmotic pressure line 170, as well as the mixed feed water pressure line 180, to decrease even more rapidly than in the example shown in FIG. 2A. In FIG. 2B, the increased difference between line 175 and line 180, vis-à-vis the difference between the two lines in FIG. 2A, illustrates the increased benefit of operation at lower pressures when the flow rate is increased, thus saving additional energy beyond the additional energy required to operate the circulation pump 126 at a higher flow rate.

Reference is now made to FIGS. 7A-7D, which are simplified illustrations of water flows in a further embodiment of a water treatment system of the type shown in FIG. 1.

Prior to initiation of removal of the concentrate from module 100, brine outlet control valve 134, auxiliary brine replacement control valve 140, auxiliary feed water control valve 148 and recycle conduit control valve 156 are closed and recirculation control valve 124 is open. The concentrate from concentrate manifold 120 is directed back to the input of feed manifold 114 via recirculation conduit 122 and recirculation control valve 124, as shown by an arrow labeled CONCENTRATE (FIG. 1), representing the recirculation flow in the recirculation conduit 122. In feed manifold 114, the concentrate is mixed with feed water, as shown by an arrow labeled MIXED (FIG. 1), representing the mixed flow in the feed conduit 114. Thus, a mixed flow enters pressure vessels 110 for further treatment. The water flow for this stage is shown in a solid black line in FIG. 7A.

The feed pressure thereafter gradually increases as the salinity of the mixed water being supplied to the membrane elements 112 increases, and the above-described recirculation process continues.

Once the concentration of the concentrate reaches a threshold, such as a predetermined salinity level at which continued water treatment is deemed not to be practicable, FPM controller 162 opens auxiliary brine replacement control valve 140, closes recirculation control valve 124 and opens auxiliary feed water control valve 148. The FPM controller also increases flow rate produced by circulation pump 126. Brine from concentrate manifold 120 flows through auxiliary brine replacement conduit 136, auxiliary tank feed conduit 138 and auxiliary brine replacement control valve 140 to auxiliary feed water tank 142. The auxiliary feed water tank 142 is filled with feed water prior to the opening of auxiliary brine replacement control valve 140, as described hereinbelow. The brine enters the auxiliary feed water tank 142 and drives feed water from tank 142 to feed manifold 114 via auxiliary feed water conduit 146 and auxiliary feed water control valve 148. It is appreciated that water in auxiliary feed water tank 142 may be at the same pressure as the pressure of the brine, such as by maintaining auxiliary brine replacement control valve 140 in an open state as the water pressure in the system gradually increases. Alternatively, the water in the auxiliary feed water tank 142 may be maintained at a pressure which is much lower than the pressure of the brine but above the atmospheric pressure by operation of the auxiliary feed water pump 144 as described hereinbelow.

In this embodiment, during flushing the FPM controller 162 preferably opens recycle conduit control valve 156, resulting in a water flow from a location downstream of pump 102 to a location upstream of pump 102, preferably thorough a restrictor 160, thus lowering the feed water pressure at manifold 114 to a pressure above atmospheric pressure, which pressure exceeds the osmotic pressure of the feed water at the feed side of module 100. The water flow for this stage is shown in a solid black line in FIG. 7B.

Figure 7A:
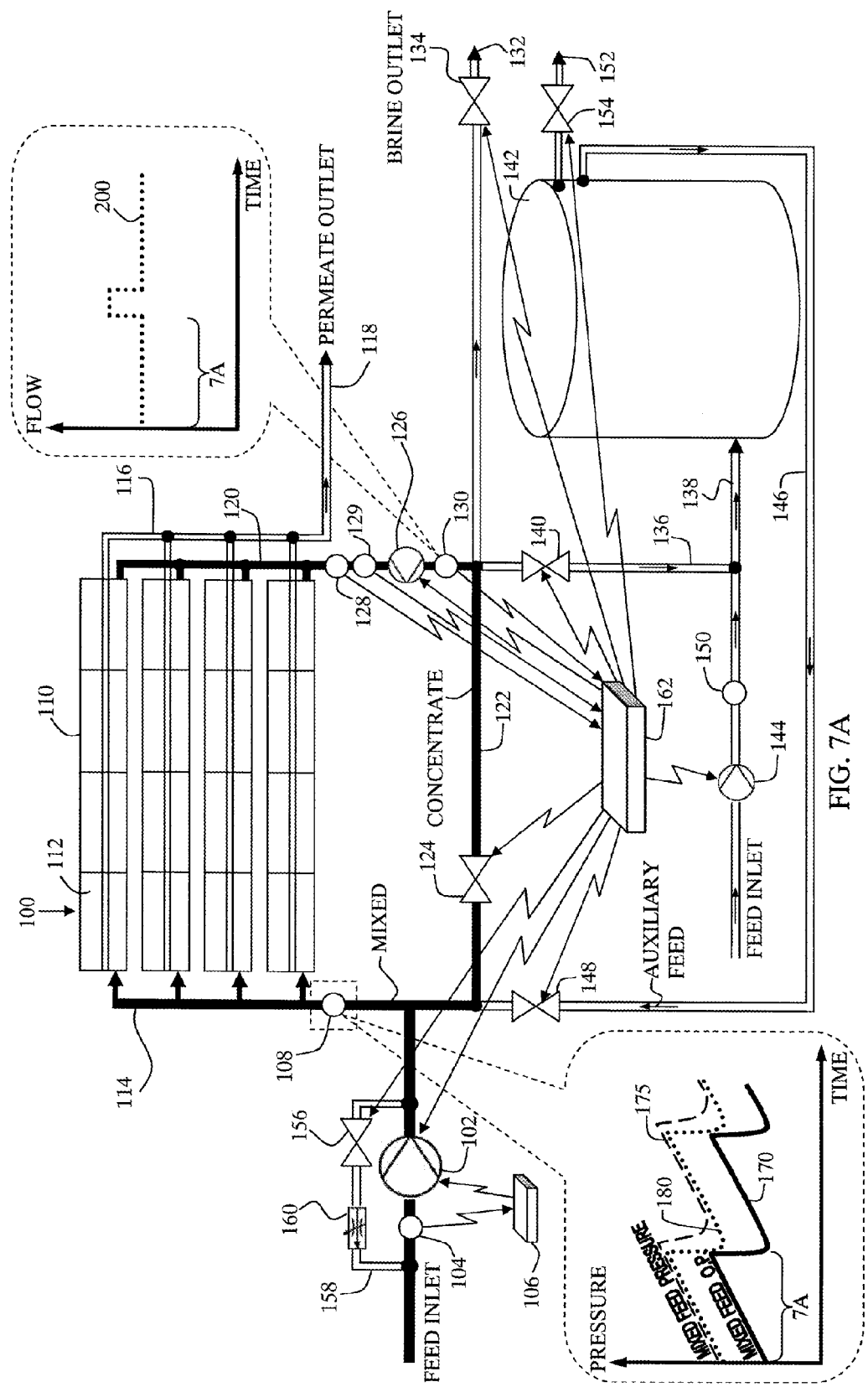
FIGS. 7A, 7B, 7C and 7D are simplified illustrations of liquid flows in the system of FIG. 1 at various stages in the periodic variation in feed water pressure and osmotic pressure shown in FIG. 2B in accordance with a further embodiment of the present invention.
Figure 7B:
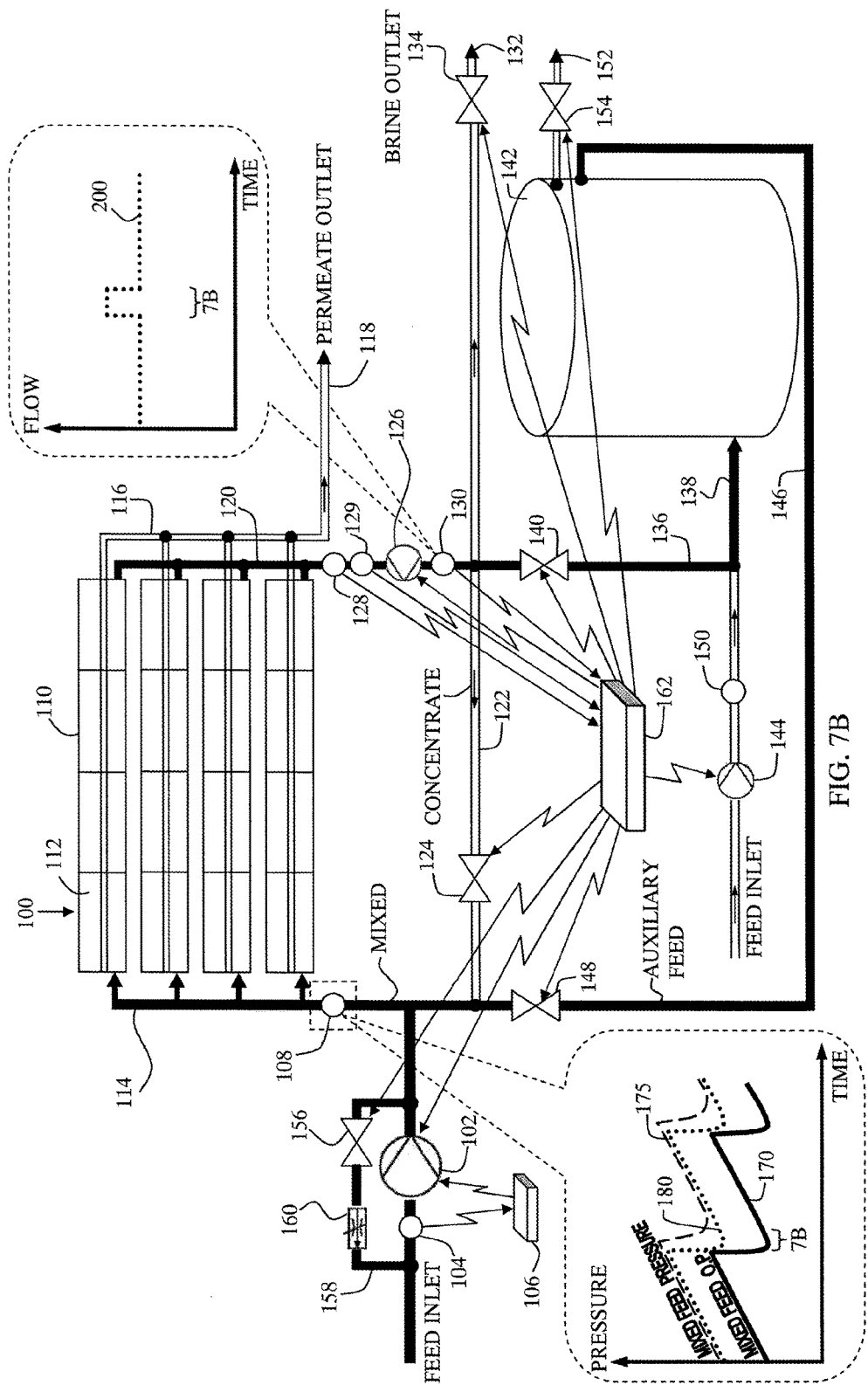

A typical graph of flow rate over time, as measured by concentrate flow rate sensor 130, located downstream of circulation pump 126, appears in an enlargement forming part of FIG. 7B, in which line 200 represents the flow rate over time.

Concentrate flow rate sensor 130 measures the cumulative volume of brine flowing from concentrate manifold 120, and thus measures the cumulative volume of feed water entering feed manifold 114 via the auxiliary feed water conduit 146 and the auxiliary feed water control valve 148, which replaces the brine in module 100.

Figure 7C:
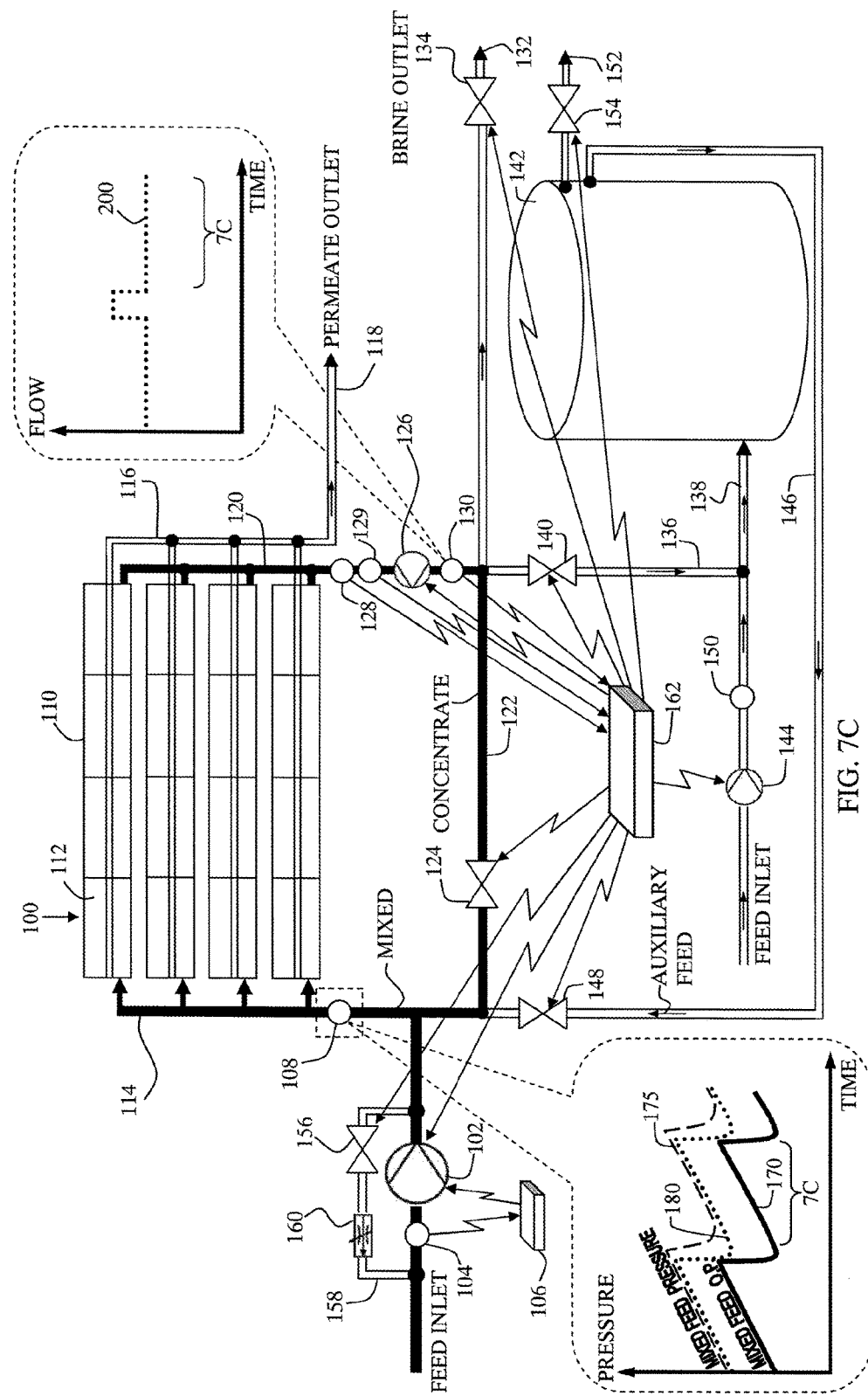
Figure 7D:
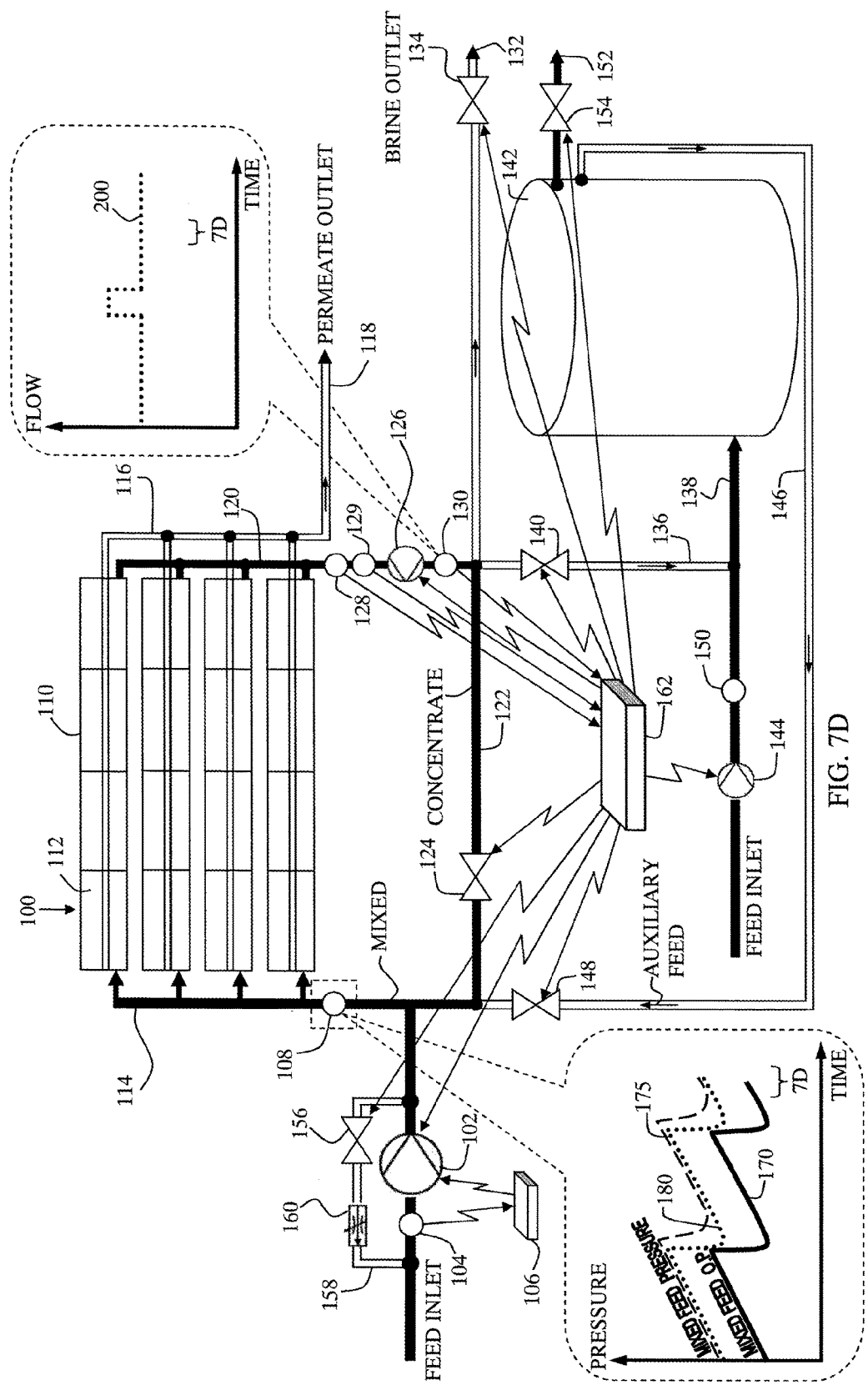

After complete replacement of brine with feed water in module 100, FPM controller 162 reopens recirculation control valve 124, and closes auxiliary brine replacement control valve 140, auxiliary feed water control valve 148 and recycle conduit control valve 156, providing a liquid flow as shown in FIG. 7C, which may be identical to the liquid flow illustrated in FIG. 7A, in which the operation of high pressure pump 102 and the circulation pump 126 supplies mixed feed water to module 100.

Thereafter, the FPM controller 162 periodically activates the auxiliary feed water pump 144 and opens auxiliary brine outlet tank control valve 154 to flush all brine from auxiliary feed water tank 142 through an auxiliary brine outlet 152 to a location outside of the at least one water treatment system, and fill the auxiliary feed tank 142 with feed water for further replacement of brine in module 100. This flow is shown in solid black lines in FIG. 7D.

Following full replacement of brine with feed water in auxiliary feed water tank 142, as measured by auxiliary flow sensor 150, the FPM controller 162 closes auxiliary brine outlet tank control valve 154 and terminates operation of the auxiliary feed water pump 144.

Reference is now made to FIGS. 8A-8D, which are simplified illustrations of water flows in yet another embodiment of a water treatment system of the type shown in FIG. 1.

Prior to initiation of removal of the concentrate from module 100, brine outlet control valve 134, auxiliary brine replacement control valve 140, auxiliary feed water control valve 148 and recycle conduit control valve 156 are closed and recirculation control valve 124 is open. The concentrate from concentrate manifold 120 is directed back to the input of feed manifold 114 via recirculation conduit 122 and recirculation control valve 124, as shown by an arrow labeled CONCENTRATE (FIG. 1), representing the recirculation flow in the recirculation conduit 122. In feed manifold 114, the concentrate is mixed with feed water, as shown by an arrow labeled MIXED (FIG. 1), representing the mixed flow in the feed manifold 114. Thus, a mixed flow enters pressure vessels 110 for further treatment. The water flow for this stage is shown in a solid black line in FIG. 8A.

The feed pressure thereafter gradually increases as the salinity of the mixed water being supplied to the membrane elements 112 increases, and the above-described recirculation process continues.

Once the concentration of the concentrate reaches a threshold, such as a predetermined salinity level at which continued water treatment is deemed not to be practicable, FPM controller 162 opens auxiliary brine replacement control valve 140, which is approximately at atmospheric pressure, thus reducing the water pressure within module 100 to a pressure between the pressure of the concentrate at module 100 and the pressure of the feed water in the auxiliary feed tank 142.

Immediately thereafter, FPM controller 162 closes recirculation control valve 124 and opens auxiliary feed water control valve 148. Feed water from auxiliary feed tank 142 flows via auxiliary feed water conduit 146 and feed water control valve 144 to feed manifold 114, as shown in FIG. 8B, thus supplying feed water to module 100 at a pressure above the osmotic pressure of the feed water and slightly higher than the pressure required for reverse osmosis to occur.

In the embodiment illustrated in FIGS. 8A-8D, FPM controller 162 also increases the flow rate of circulation pump 126 during flushing to achieve faster replacement of the brine from module 100 with feed water from auxiliary feed tank 142, hence, reducing the time required for the brine to be flushed from module 100 and replaced by feed water. A typical graph of flow rate over time, as measured by concentrate flow rate sensor 130, located downstream of circulation pump 126, appears in an enlargement forming part of FIG. 8B, in which line 200 represents the flow rate over time.

Figure 8A:
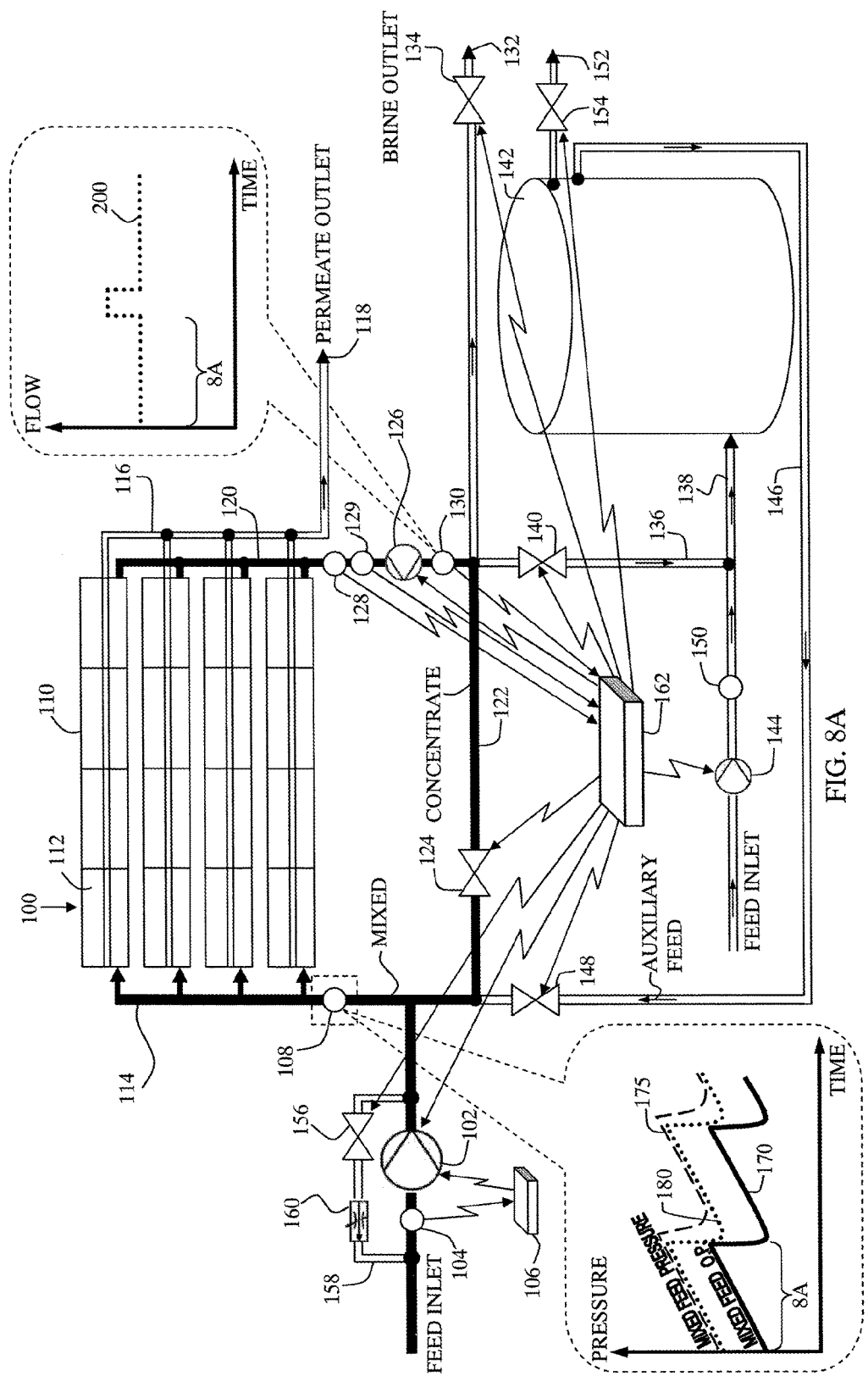
FIGS. 8A, 8B, 8C and 8D are simplified illustrations of liquid flows in the system of FIG. 1 at various stages in the periodic variation in feed water pressure and osmotic pressure shown in FIG. 2B in accordance with still a further embodiment of the present invention.
Figure 8B:
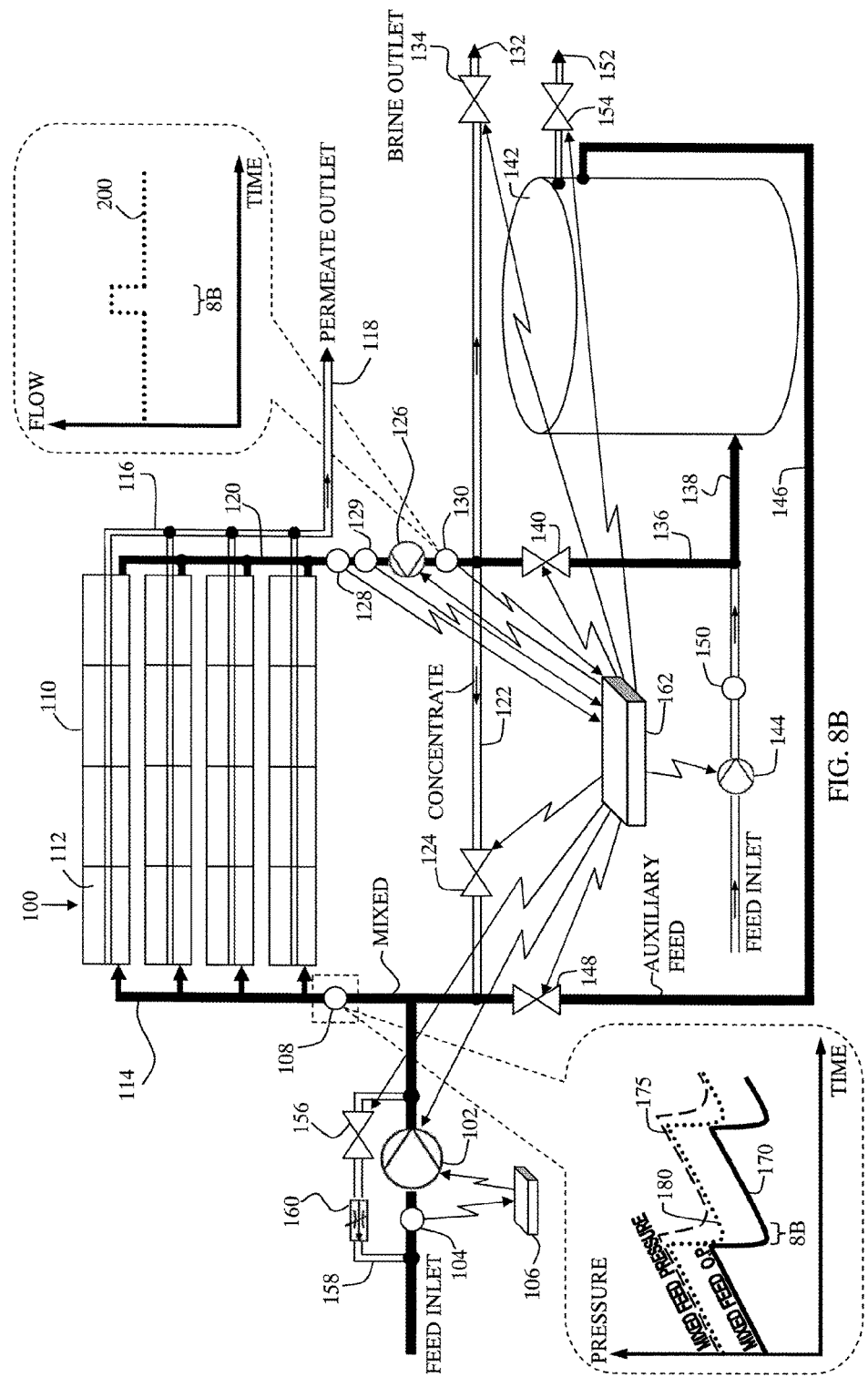

The water flow for this stage is shown in a solid black line in FIG. 8B.

Concentrate flow rate sensor 130 measures the cumulative volume of brine flowing from concentrate manifold 120 and thus measures the cumulative volume of feed water entering feed manifold 114 via the auxiliary feed water conduit 146 and the auxiliary feed water control valve 148, which replaces the brine in module 100.

Figure 8C:
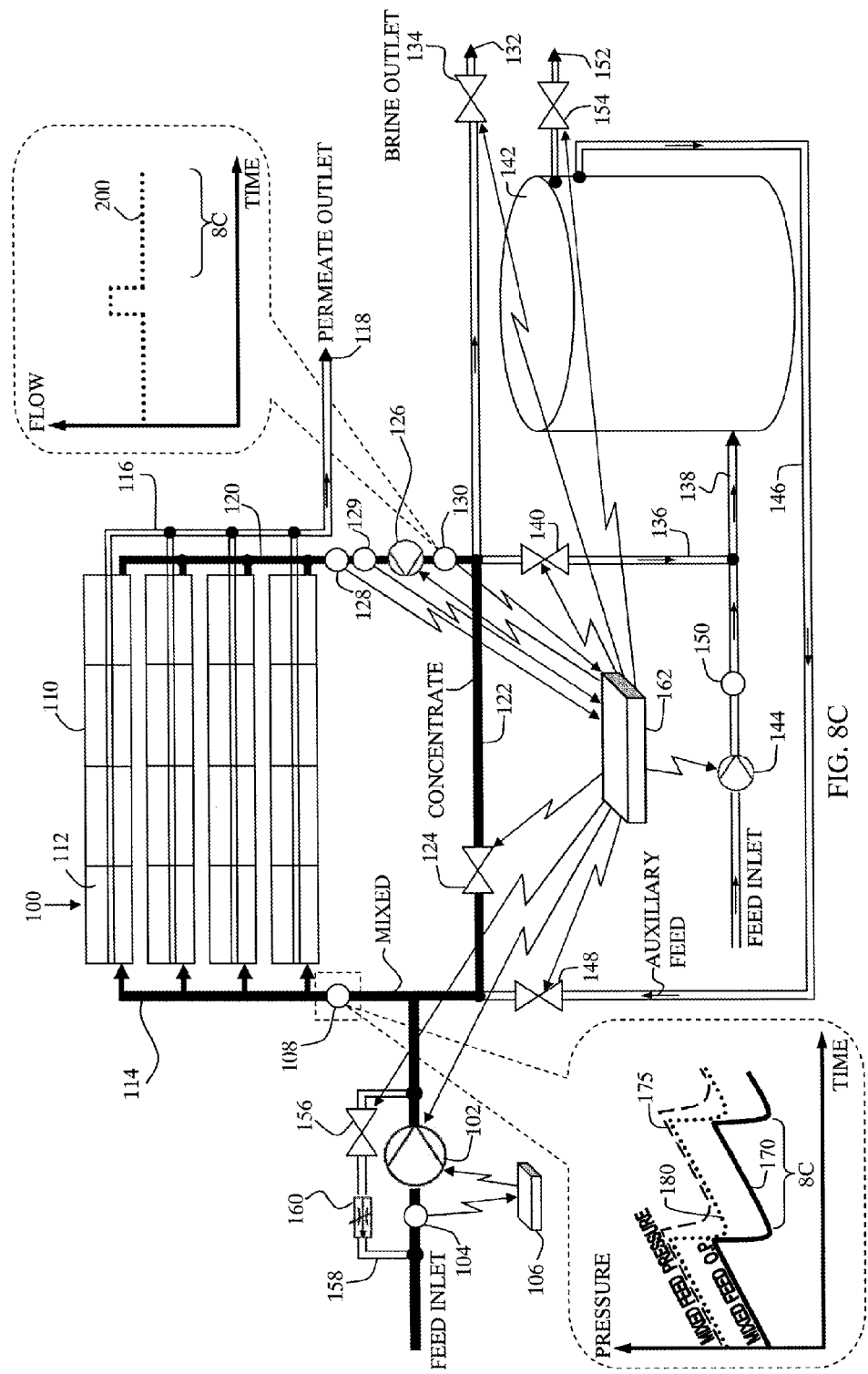
Figure 8D:
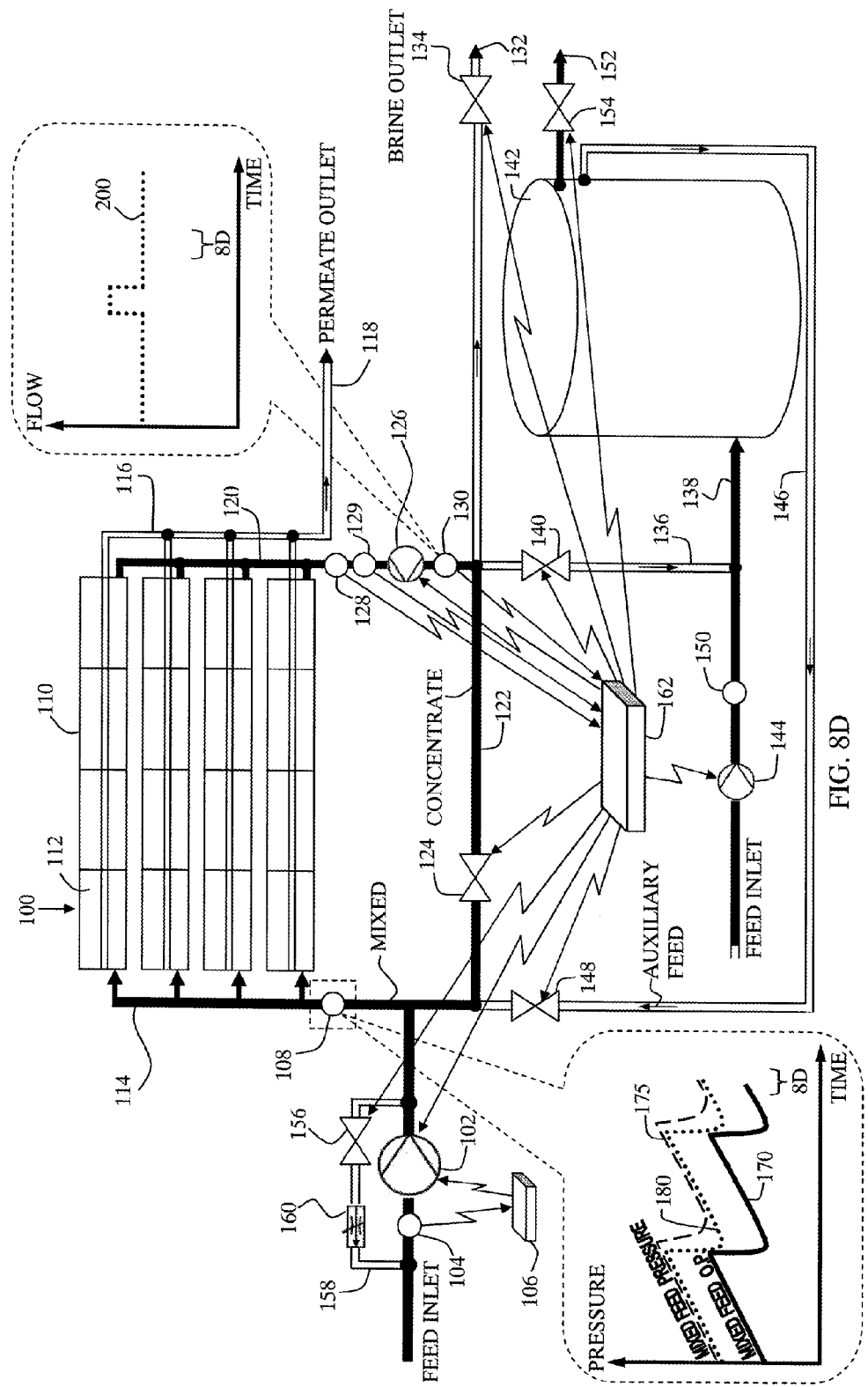

After complete replacement of the brine with feed water in module 100, FPM controller 162 reopens recirculation control valve 124, closes auxiliary brine replacement control valve 140 and auxiliary feed water control valve 148 and reduces the flow rate of circulation pump 126 to the flow rate prior to opening concentrate recirculation control valve 124, providing a liquid flow as shown in solid black lines in FIG. 8C, which may be identical to the liquid flow illustrated in FIG. 8A, in which the operation of high pressure pump 102 and circulation pump 126 supplies mixed feed water to module 100.

Thereafter, the FPM controller 162 periodically activates the auxiliary feed water pump 144 and opens auxiliary brine outlet tank control valve 154 to flush all brine from auxiliary feed water tank 142 through an auxiliary brine outlet 152 to a location outside of the at least one water treatment system, and fill the auxiliary feed tank 142 with feed water for further replacement of the brine in module 100. This flow is shown in solid black lines in FIG. 8D.

Following full replacement of brine with feed water in auxiliary feed water tank 142, as measured by auxiliary flow rate sensor 150, the FPM controller 162 closes auxiliary brine outlet tank control valve 154 and terminates operation of the auxiliary feed water pump 144.

Reference is now made to FIGS. 9A-9D, which are simplified illustrations of water flows in yet another embodiment of a water treatment system of the type shown in FIG. 1.

Prior to initiation of removal of the concentrate from module 100, brine outlet control valve 134, auxiliary brine replacement control valve 140, auxiliary feed water control valve 148 and recycle conduit control valve 156 are closed and recirculation control valve 124 is open. The concentrate from concentrate manifold 120 is directed back to the input of feed manifold 114 via recirculation conduit 122 and recirculation control valve 124, as shown by an arrow labeled CONCENTRATE (FIG. 1), representing the recirculation flow in the recirculation conduit 122. In feed manifold 114, the concentrate is mixed with feed water, as shown by an arrow labeled MIXED (FIG. 1), representing the mixed flow in the feed conduit 114. Thus, a mixed flow enters pressure vessels 110 for further treatment. The water flow for this stage is shown in a solid black line in FIG. 9A.

The feed pressure thereafter gradually increases as the salinity of the mixed water being supplied to the membrane elements 112 increases, and the above-described recirculation process continues.

Once the concentration of the concentrate reaches a threshold, such as a predetermined salinity level at which continued water treatment is deemed not to be practicable, FPM controller 162 at least partially opens brine outlet control valve 134, thus allowing brine to flow to via brine outlet 132 to a location outside of the at least one water treatment system, thus reducing the system pressure in module 100.

Figure 9B:
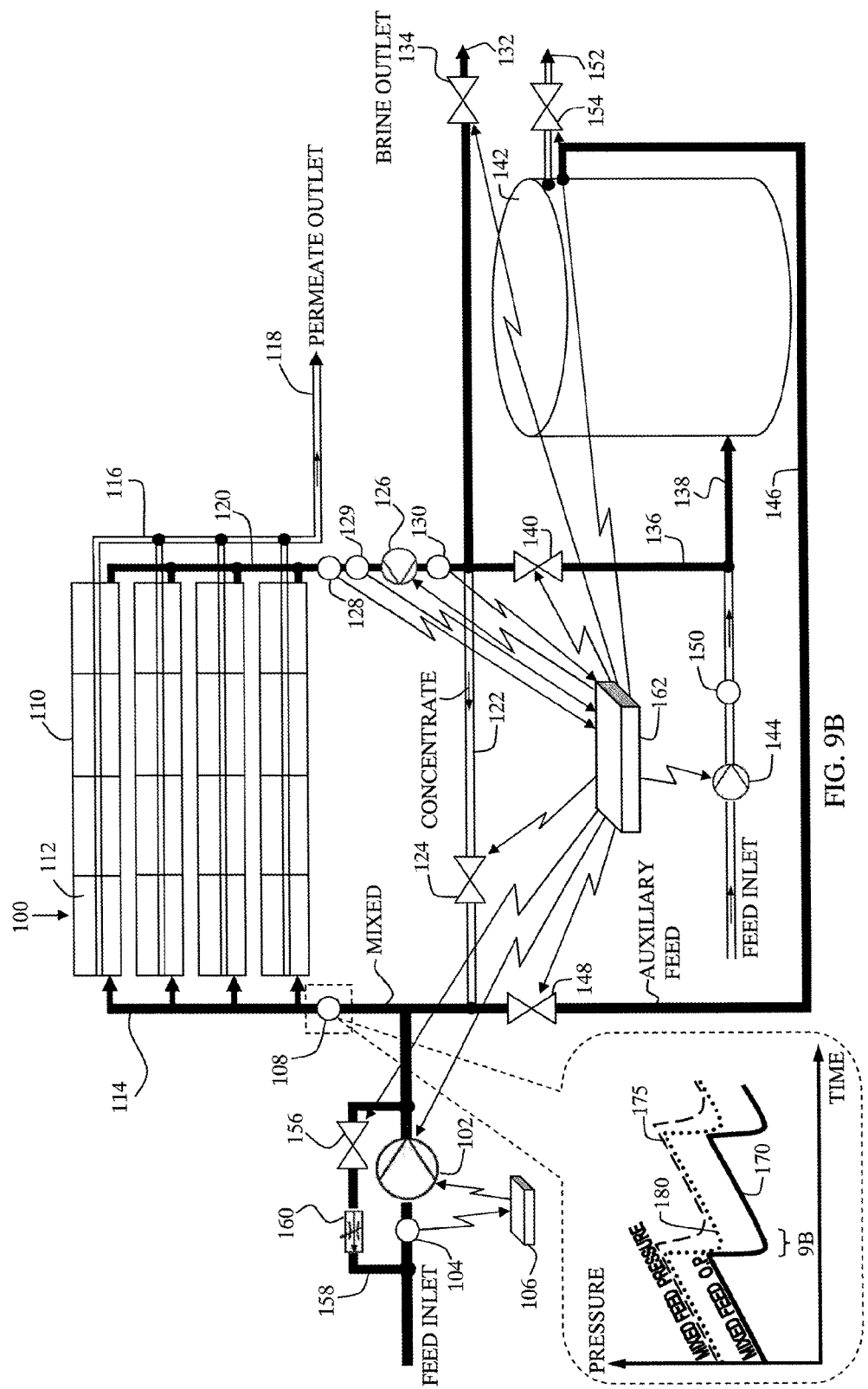

Additionally, in the embodiment shown in FIGS. 9A-9D, during flushing the FPM controller 162 preferably opens recycle conduit control valve 156, resulting in a water flow from a location downstream of pump 102 to a location upstream of pump 102, preferably thorough a restrictor 160, thus maintaining the feed water pressure at manifold 114 at a pressure above atmospheric pressure, which pressure exceeds the osmotic pressure of the feed water at the feed side of module 100, as seen in FIG. 9B.

Immediately thereafter, FPM controller also opens auxiliary brine replacement control valve 140, closes recirculation control valve 124 and opens auxiliary feed water control valve 148. Brine from concentrate manifold 120 flows through auxiliary brine replacement conduit 136, auxiliary tank feed conduit 138 and auxiliary brine replacement control valve 140 to auxiliary feed water tank 142. The auxiliary feed water tank 142 is filled with feed water prior to the opening of auxiliary brine replacement control valve 140, as described hereinbelow. The brine enters the auxiliary feed water tank 142 and drives feed water from tank 142 to feed manifold 114 via auxiliary feed water conduit 146 and auxiliary feed water control valve 148. It is appreciated that water in auxiliary feed water tank 142 may be at the same pressure as the pressure of the brine, such as by maintaining auxiliary brine replacement control valve 140 in an open state as the water pressure in the system gradually increases. Alternatively, the water in the auxiliary feed water tank 142 may be maintained at a pressure which is much lower than the pressure of the brine but above the atmospheric pressure by operation of the auxiliary feed water pump 144 work as described hereinbelow. The water flow for this stage is shown in a solid black line in FIG. 9B.

Figure 9C:
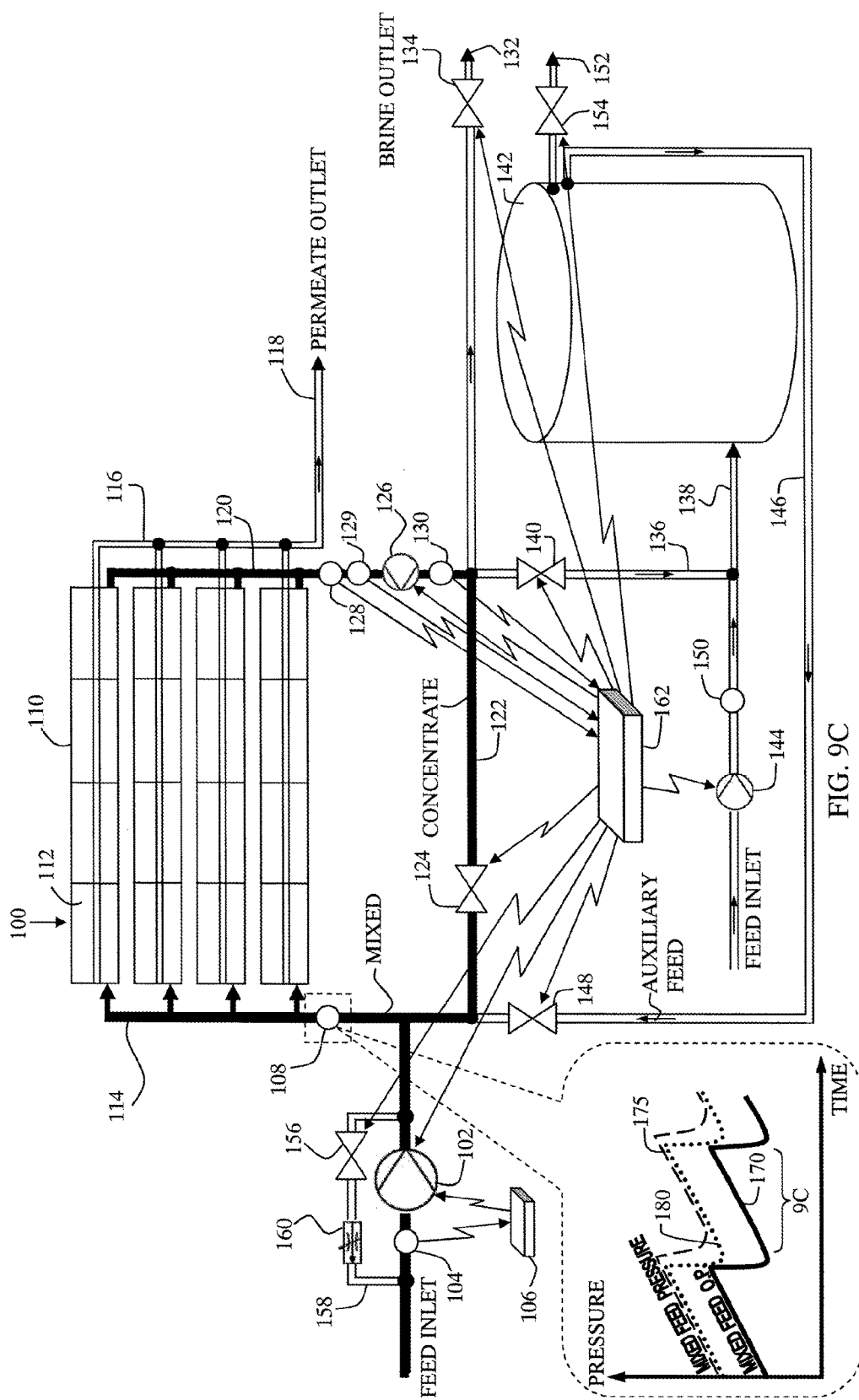
Figure 9D:
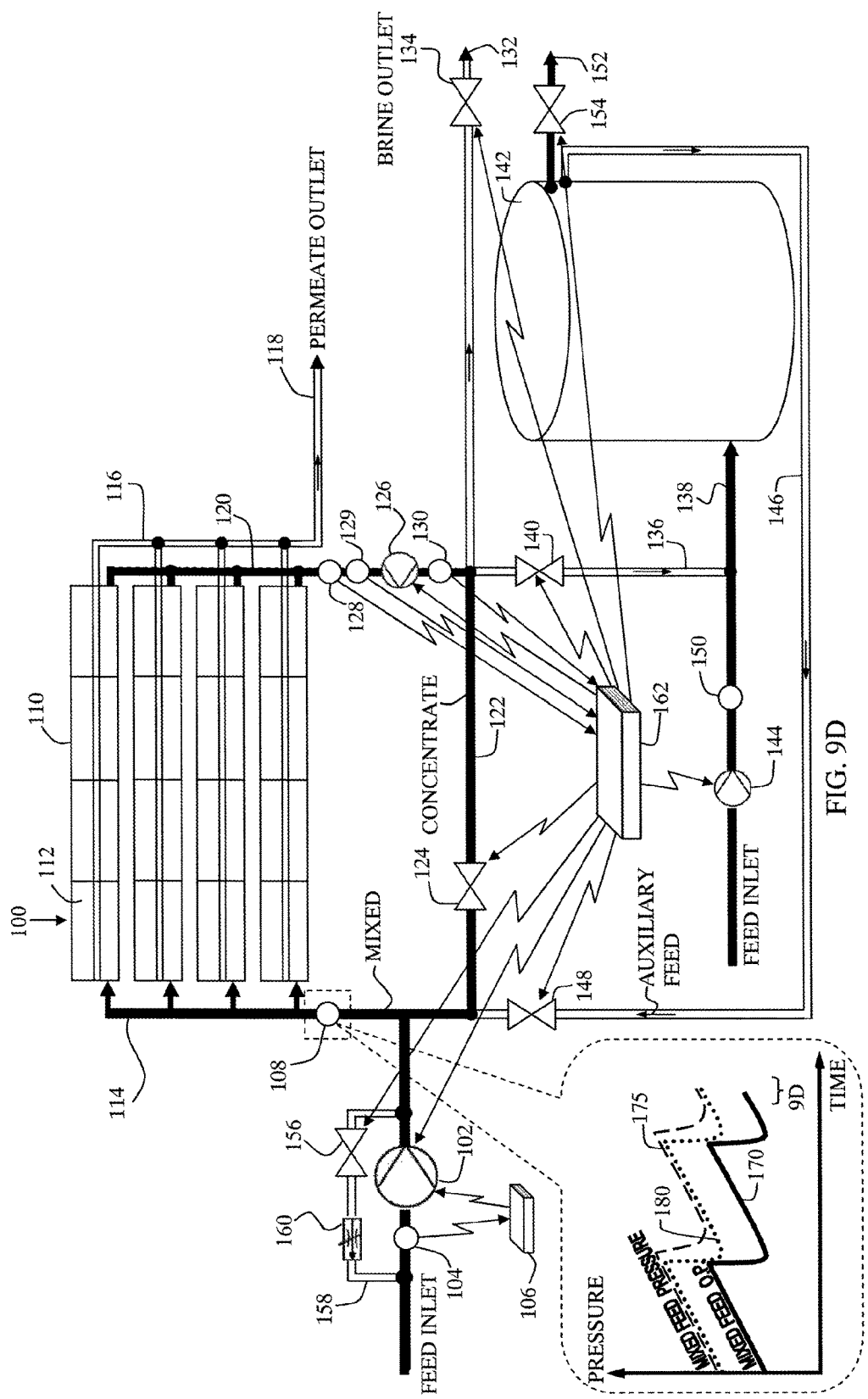

Concentrate flow rate sensor 130 measures the cumulative volume of brine flowing from concentrate manifold 120 and thus measures when the full flushing of the brine from module 100 has been completed. After fully flushing the brine from module 100, FPM controller 162 reopens recirculation control valve 124, and closes brine outlet control valve 134, auxiliary brine replacement control valve 140, auxiliary feed water control valve 148 and recycle conduit control valve 156, providing a liquid flow as shown in FIG. 9C, which may be identical to the liquid flow illustrated in FIG. 9A, in which the operation of high pressure pump 102 and circulation pump 126 supplies mixed feed water to module 100.

Thereafter, the FPM controller 162 periodically activates the auxiliary feed water pump 144 and opens auxiliary brine outlet tank control valve 154 to flush all brine from auxiliary feed water tank 142 through an auxiliary brine outlet 152 to a location outside of the at least one water treatment system, and fill the auxiliary feed tank 142 with feed water for further replacement of the brine in module 100. This flow is shown in solid black lines in FIG. 9D.

Following full replacement of brine with feed water in auxiliary feed water tank 142, as measured by auxiliary flow sensor 150, the FPM controller 162 closes auxiliary brine outlet tank control valve 154 and terminates operation of the auxiliary feed water pump 144.

It is appreciated that in the embodiment shown in FIG. 9B, as described hereinabove, a portion of the brine exits via brine outlet 132 and thus is not replaced with water from auxiliary feed water tank 142. The volume of water in module 100 may be replenished by increasing the flow rate of high pressure pump 102 or by any other suitable method.

Reference is now made to FIGS. 10A-10D, which are simplified illustrations of water flows in still another embodiment of a water treatment system of the type shown in FIG. 1.

Prior to initiation of removal of the concentrate from module 100, brine outlet control valve 134, auxiliary brine replacement control valve 140, auxiliary feed water control valve 148 and recycle conduit control valve 156 are closed and recirculation control valve 124 is open. The concentrate from concentrate manifold 120 is directed back to the input of feed manifold 114 via recirculation conduit 122 and recirculation control valve 124, as shown by an arrow labeled CONCENTRATE (FIG. 1), representing the recirculation flow in the recirculation conduit 122. In feed manifold 114, the concentrate is mixed with feed water, as shown by an arrow labeled MIXED (FIG. 1), representing the mixed flow in the feed conduit 114. Thus, the mixed flow enters pressure vessels 110 for further treatment. The water flow for this stage is shown in a solid black line in FIG. 10A.

The feed pressure thereafter gradually increases as the salinity of the mixed water being supplied to the membrane elements 112 increases, and the above-described recirculation process continues.

Once the concentration of the concentrate reaches a threshold, such as a predetermined salinity level at which continued water treatment is deemed not to be practicable, FPM controller 162 opens auxiliary brine replacement control valve 140, which is approximately at atmospheric pressure, thus reducing the water pressure within module 100 to a pressure between the pressure of the concentrate at module 100 and the pressure of the feed water in the auxiliary feed tank 142.

Immediately thereafter, FPM controller 162 closes recirculation control valve 124 and opens auxiliary feed water control valve 148. Brine from concentrate manifold 120 flows through auxiliary brine replacement conduit 136, auxiliary tank feed conduit 138 and auxiliary brine replacement control valve 140 to auxiliary feed water tank 142. The auxiliary feed water tank 142 is filled with feed water prior to the opening of auxiliary brine replacement control valve 140, as described hereinbelow. The brine entering the auxiliary feed water tank 142 drives feed water in it to feed manifold 114 via auxiliary feed water conduit 146 and auxiliary feed water control valve 148. It is appreciated that water in auxiliary feed water tank 142 may be maintained at a pressure generally the same as the pressure of the brine, such as by maintaining auxiliary brine replacement control valve 140 in an open state as the pressure in the system gradually increases. Alternatively, the water in the auxiliary feed water tank 142 may be maintained at a pressure which is much lower than the pressure of the brine but above the atmospheric pressure by operation of the auxiliary feed water pump 144 as described hereinbelow.

Additionally, in the embodiment of FIGS. 10A-10D, during flushing the FPM controller 162 preferably opens recycle conduit control valve 156, resulting in a water flow from a location downstream of pump 102 to a location upstream of pump 102, preferably thorough a restrictor 160, thus lowering the feed water pressure at manifold 114 to a pressure above atmospheric pressure, which pressure exceeds the osmotic pressure of the feed water at the feed side of module 100.

Concentrate flow rate sensor 130 measures the cumulative volume of brine flowing from concentrate manifold 120 and thus measures the cumulative volume of feed water entering feed manifold 114 via the auxiliary feed water conduit 146 and the auxiliary feed water control valve 148, which replaces the brine in module 100.

Figure 10A:
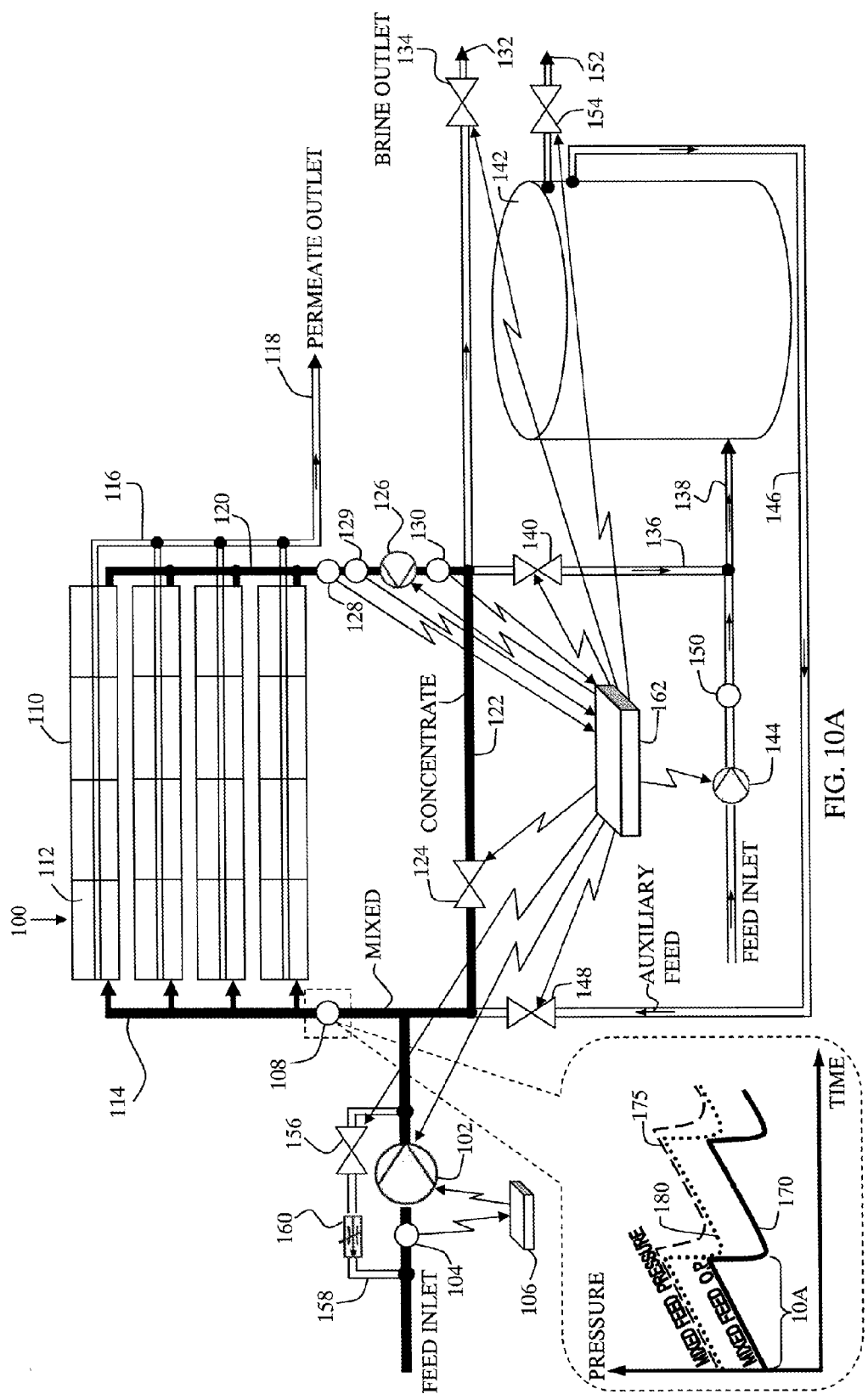
FIGS. 10A, 10B, 10C and 10D are simplified illustrations of liquid flows in the system of FIG. 1 at various stages in the periodic variation in feed water pressure and osmotic pressure shown in FIG. 2A in accordance with an alternative embodiment of the present invention.
Figure 10B:
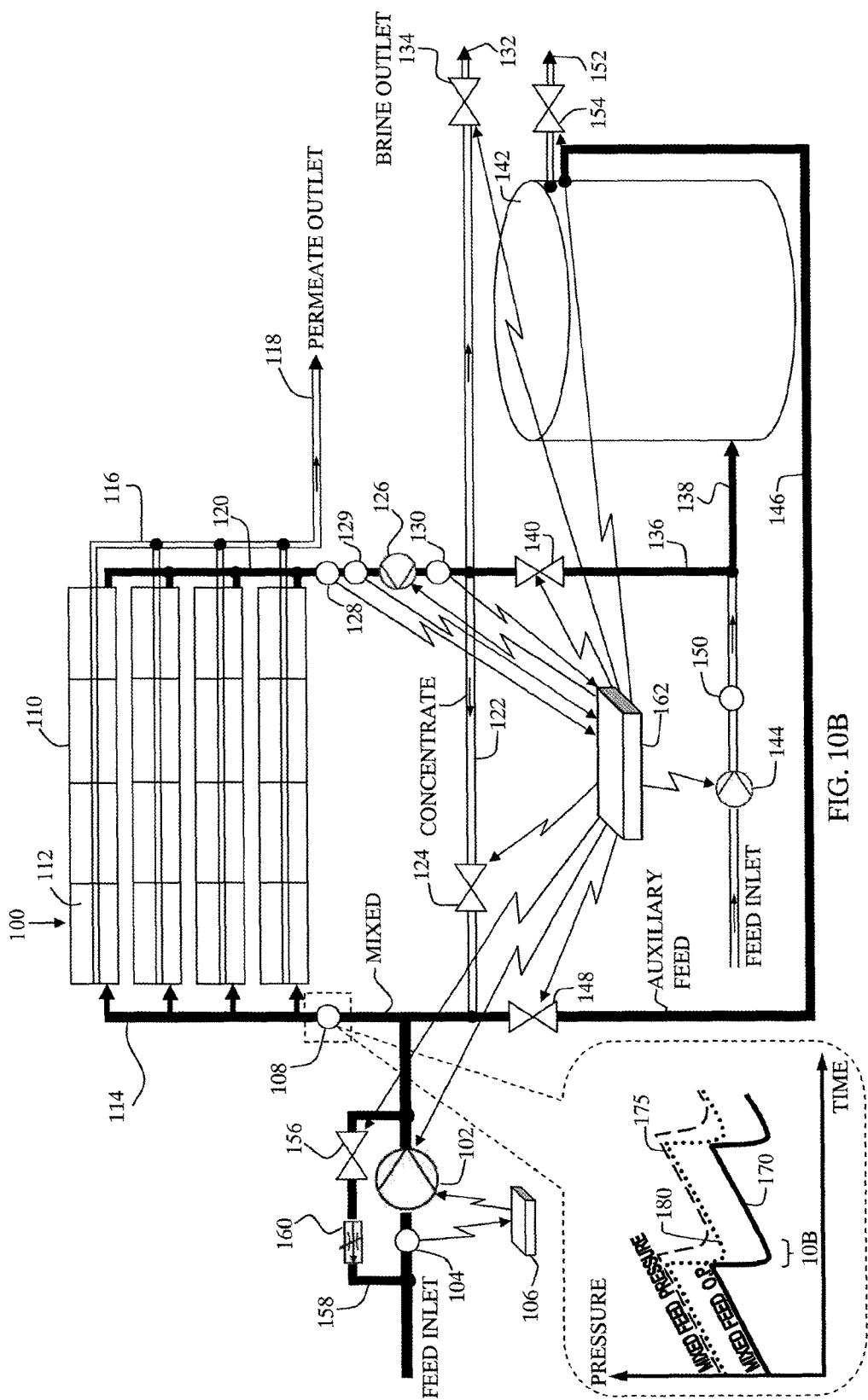
Figure 10C:
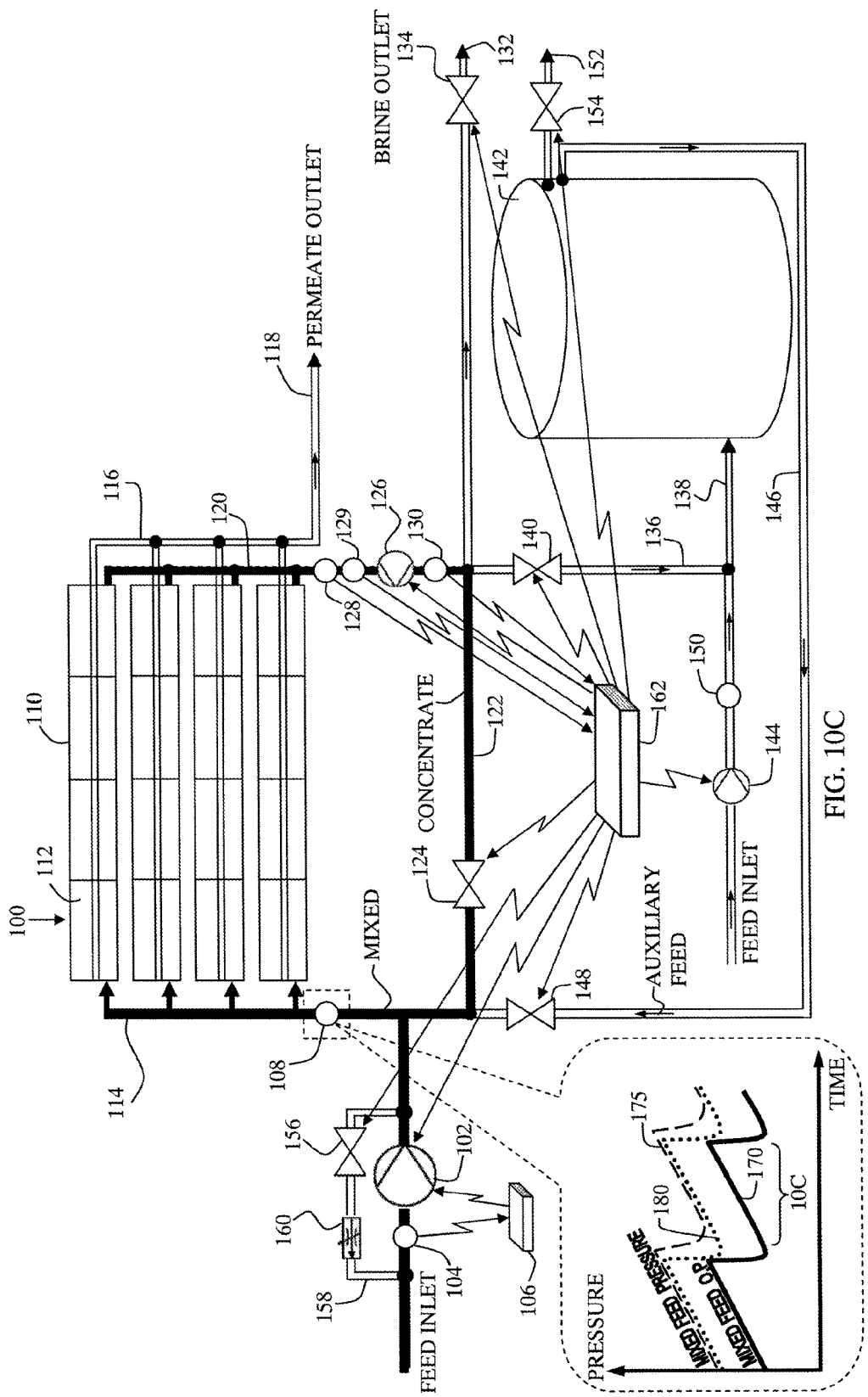
Figure 10D:
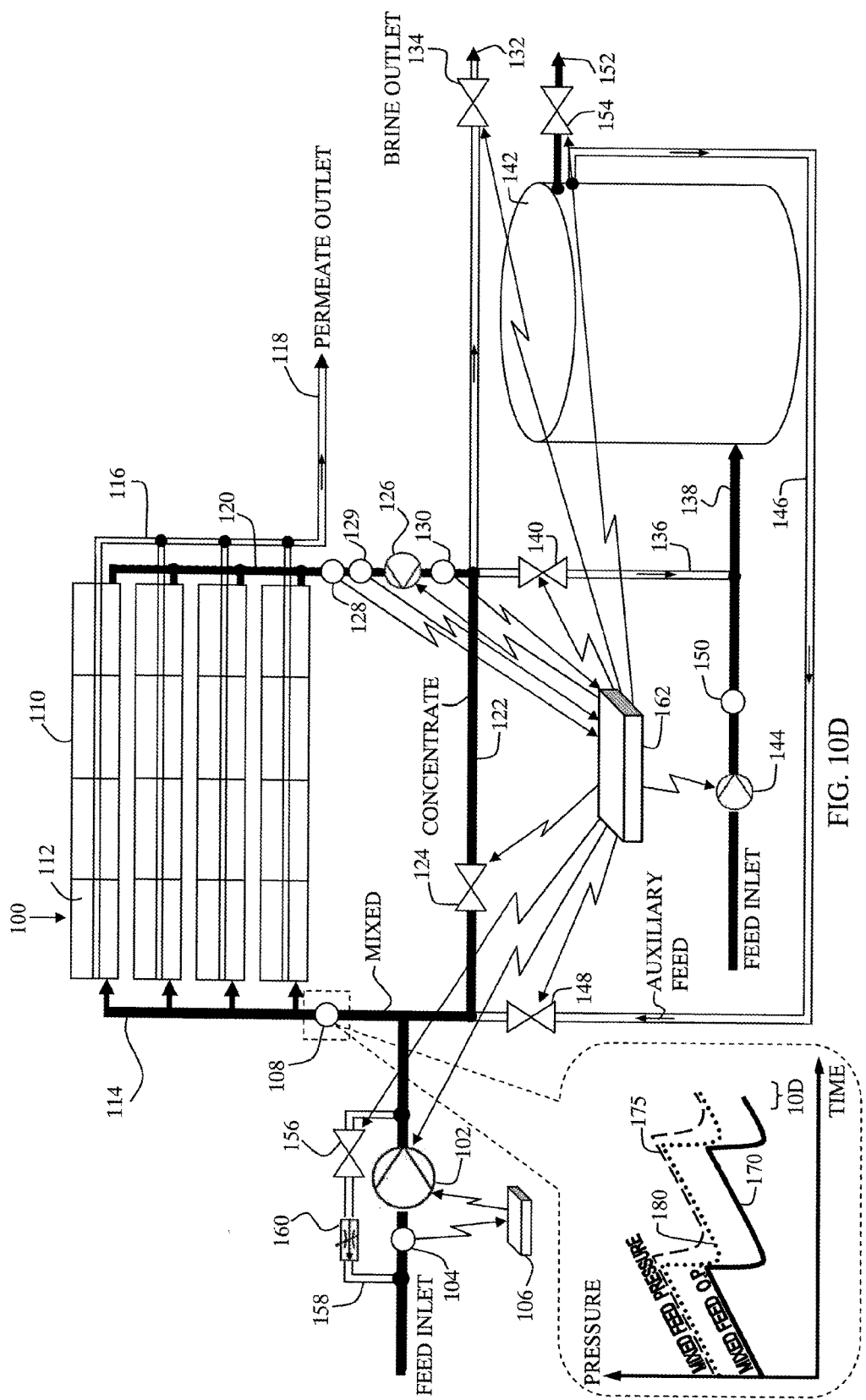

After complete replacement of the brine with feed water in module 100, FPM controller 162 reopens recirculation control valve 124, and closes auxiliary brine replacement control valve 140, auxiliary feed water control valve 148 and recycle conduit control valve 156, providing a liquid flow as shown in FIG. 10C, which may be identical to the liquid flow illustrated in FIG. 10A hereinabove.

Thereafter, the FPM controller 162 periodically activates the auxiliary feed water pump 144 and opens auxiliary brine outlet tank control valve 154 to flush all brine from auxiliary feed water tank 142 through an auxiliary brine outlet 152 to a location outside of the at least one water treatment system, and fill the auxiliary feed tank 142 with feed water for further replacement of the brine in module 100. This flow is shown in solid black lines in FIG. 10D.

Following full replacement of brine with feed water in auxiliary feed water tank 142, as measured by auxiliary flow sensor 150, the FPM controller 162 closes auxiliary brine outlet tank control valve 154 and terminates operation of the auxiliary feed water pump 144.

Reference is now made to FIGS. 11A-11D, which are simplified illustrations of water flows in another water treatment system of the type shown in FIG. 1.

Prior to initiation of removal of the concentrate from module 100, brine outlet control valve 134, auxiliary brine replacement control valve 140, auxiliary feed water control valve 148 and recycle conduit control valve 156 are closed and recirculation control valve 124 is open. The concentrate from concentrate manifold 120 is directed back to the input of feed manifold 114 via recirculation conduit 122 and recirculation control valve 124, as shown by an arrow labeled CONCENTRATE (FIG. 1), representing the recirculation flow in the recirculation conduit 122. In feed manifold 114, the concentrate is mixed with feed water, as shown by an arrow labeled MIXED (FIG. 1), representing the mixed flow in the feed conduit 114. Thus, a mixed flow enters pressure vessels 110 for further treatment. The water flow for this stage is shown in a solid black line in FIG. 11A.

The feed pressure thereafter gradually increases as the salinity of the mixed water being supplied to the membrane elements 112 increases, and the above-described recirculation process continues.

Once the concentration of the concentrate reaches a threshold, such as a predetermined salinity level at which continued water treatment is deemed not to be practicable, FPM controller 162 opens auxiliary brine replacement control valve 140 that is connected to auxiliary feed water tank 142 through auxiliary brine replacement conduit 136 and auxiliary tank feed conduit 138. In this embodiment, the water in auxiliary feed water tank 142 is approximately at atmospheric pressure, thus opening auxiliary brine replacement control valve 140 reduces the water pressure within module 100 to a pressure between the pressure of the concentrate at module 100 and the pressure of the feed water in the auxiliary feed tank 142.

Immediately thereafter, FPM controller 162 closes recirculation control valve 124 and opens auxiliary feed water control valve 148. Brine from concentrate manifold 120 flows through auxiliary brine replacement conduit 136, auxiliary tank feed conduit 138 and auxiliary brine replacement control valve 140 to auxiliary feed water tank 142. The auxiliary feed water tank 142 is filled with feed water prior to the opening of auxiliary brine replacement control valve 140, as described hereinbelow. The brine entering the auxiliary feed water tank 142 drives feed water from auxiliary feed tank 142 via auxiliary feed water conduit 146 and auxiliary feed water control valve 148 to feed manifold 114, thus supplying feed water to module 100 at a pressure above the osmotic pressure of the feed water and not much higher than the pressure required for a reverse osmosis to occur.

In this embodiment, during flushing, the FPM controller 162 preferably also opens recycle conduit control valve 156, resulting in a water flow from a location downstream of pump 102 to a location upstream of pump 102, preferably through a restrictor 160, thus lowering the feed water pressure at manifold 114 to a pressure above atmospheric pressure, which pressure exceeds the osmotic pressure of the feed water at the feed side of module 100. In this embodiment illustrated in FIGS. 11A-11D, FPM controller also increases the flow rate produced by circulation pump 126 during flushing to achieve a faster replacement of the brine from module 100 with feed water from auxiliary feed tank 142, hence, reducing the time required for the brine to be flushed from module 100 and replaced by feed water. A typical graph of flow rate over time, as measured by concentrate flow rate sensor 130, located downstream of circulation pump 126, appears in an enlargement forming part of FIG. 11B, in which line 200 represents the flow rate over time.

Figure 11A:
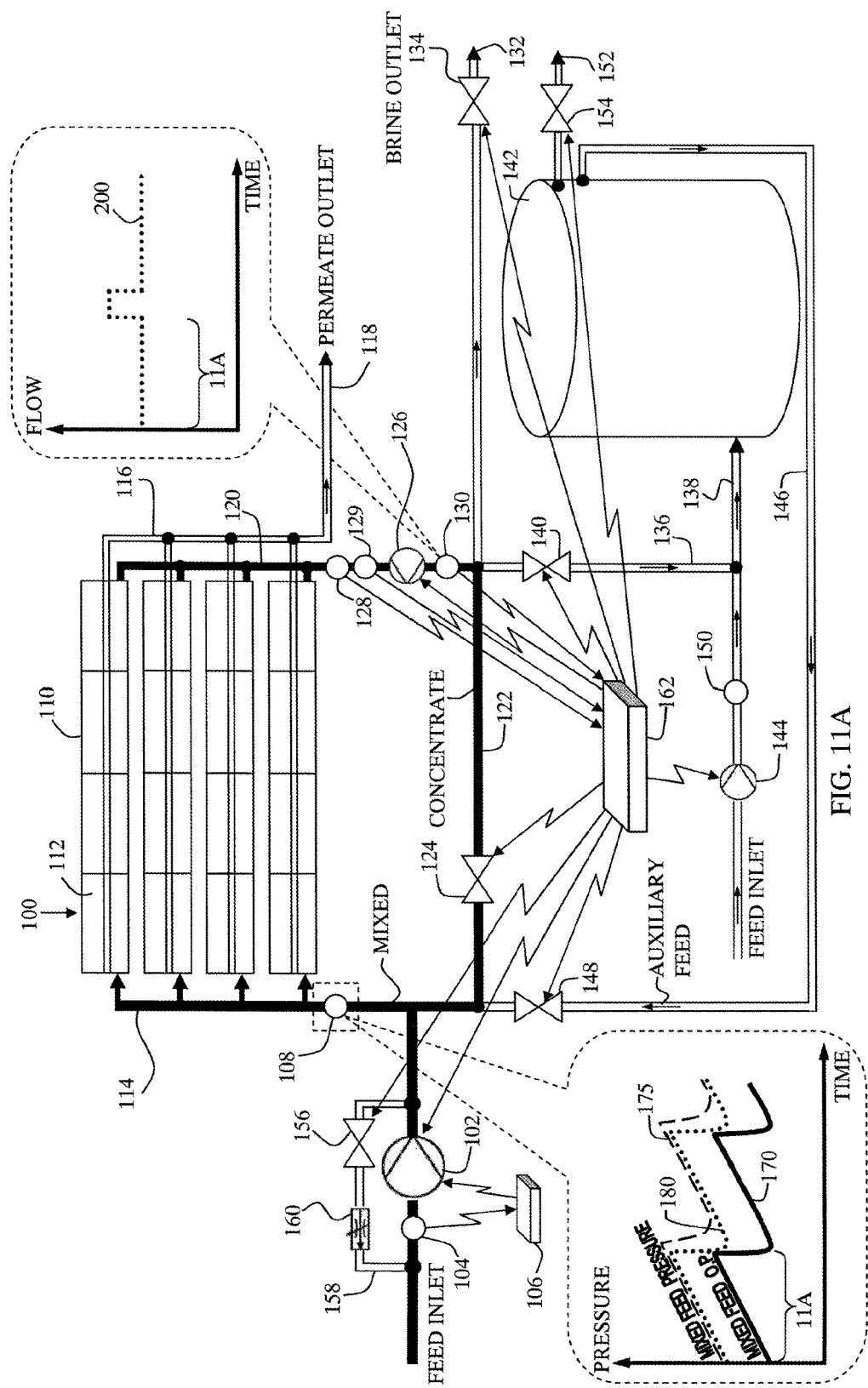
FIGS. 11A, 11B, 11C and 11D are simplified illustrations of liquid flows in the system of FIG. 1 at various stages in the periodic variation in feed water pressure and osmotic pressure shown in FIG. 2B in accordance with a further embodiment of the present invention.
Figure 11B:
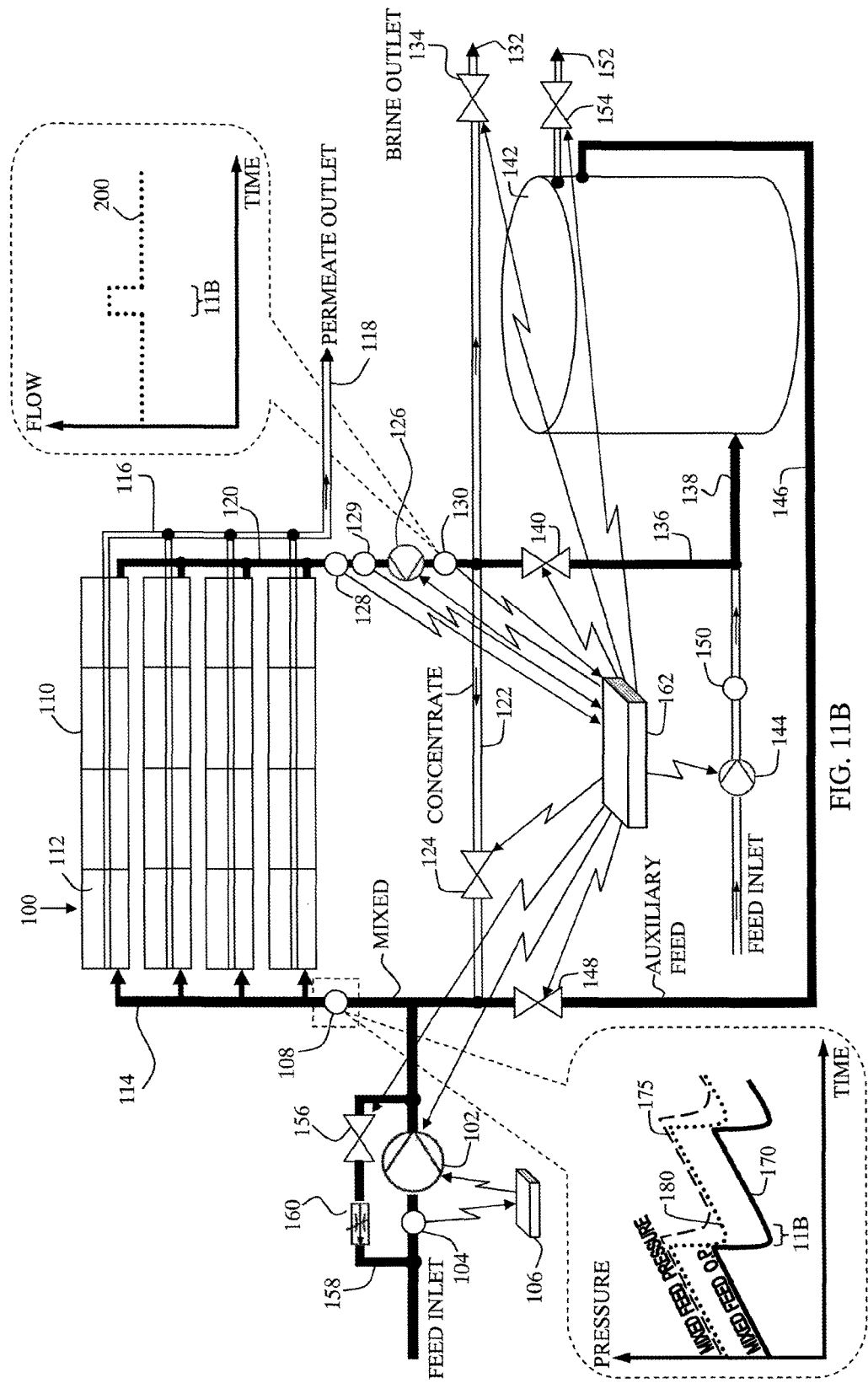

The water flow for this stage is shown in a solid black line in FIG. 11B.

Concentrate flow rate sensor 130 measures the cumulative volume of brine flowing from concentrate manifold 120 and thus measures the cumulative volume of feed water entering feed manifold 114 via the auxiliary feed water conduit 146 and the auxiliary feed water control valve 148, which replaces the brine in module 100.

Figure 11C:
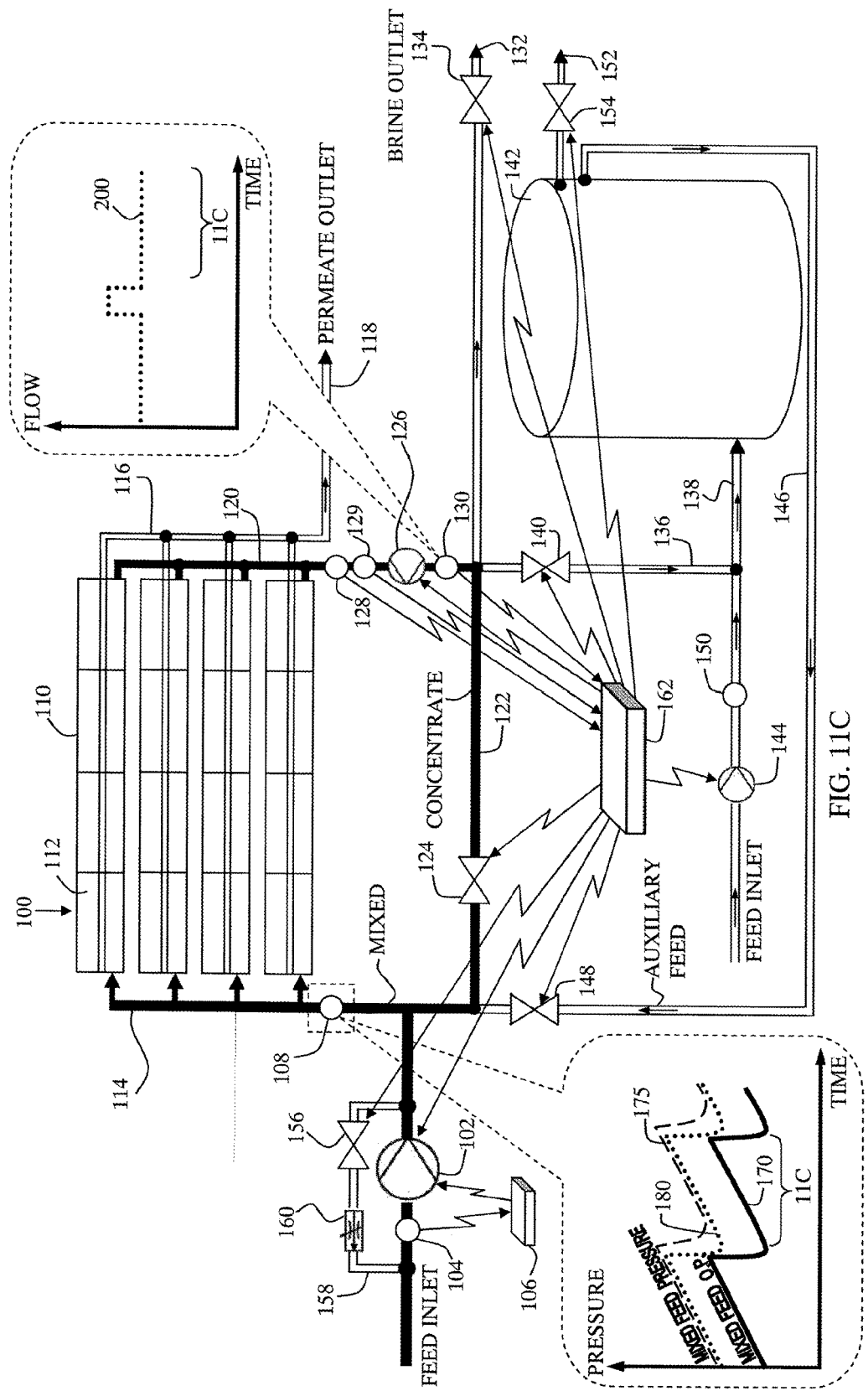
Figure 11D:
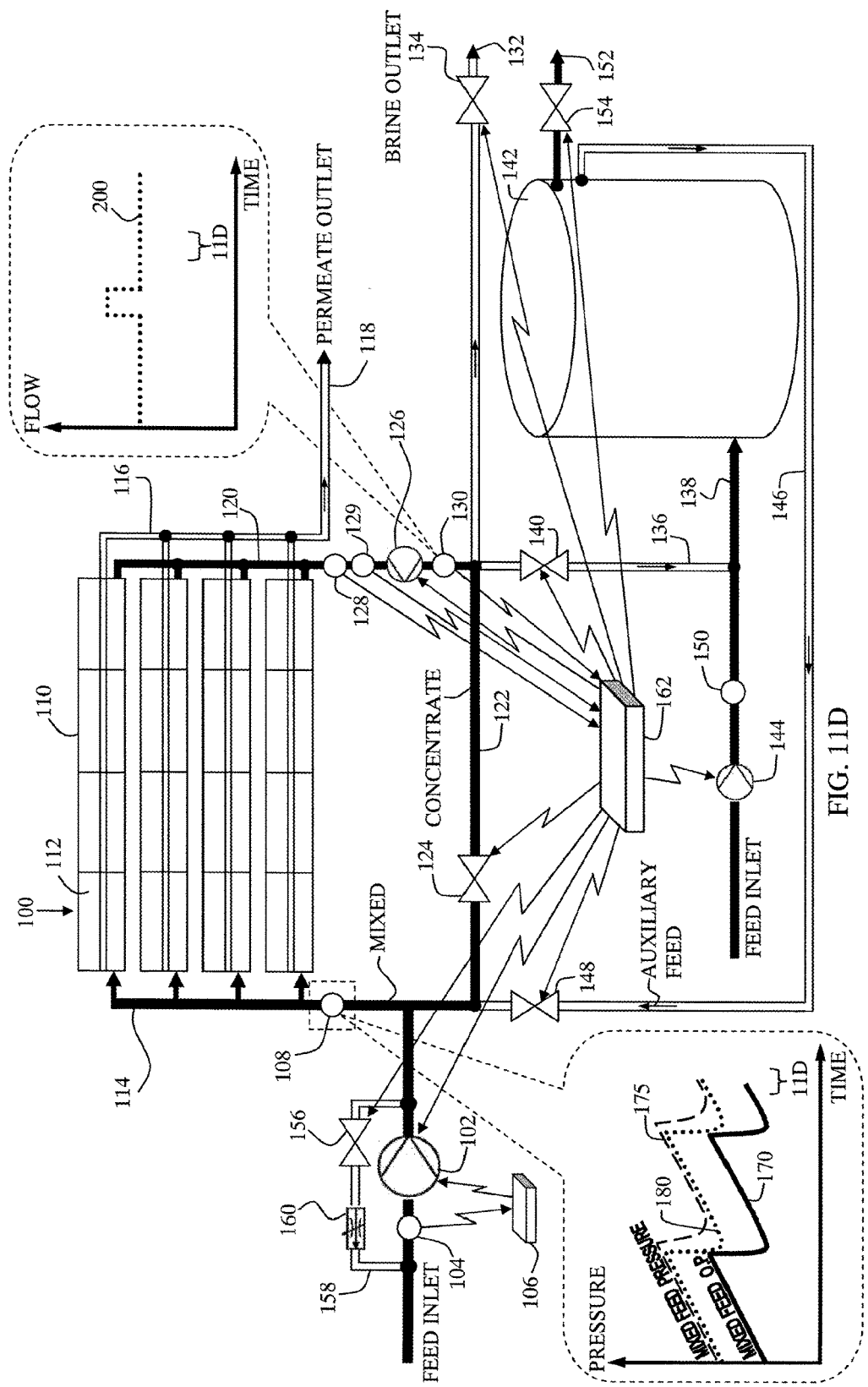

After complete replacement of brine with feed water in module 100, FPM controller 162 reopens recirculation control valve 124, closes auxiliary brine replacement control valve 140, auxiliary feed water control valve 148 and recycle conduit control valve 156, and reduces the flow rate of circulation pump 126 to the flow rate prior to opening recirculation control valve 124, providing a liquid flow as shown in solid black lines in FIG. 11C, which may be identical to the liquid flow illustrates in FIG. 11A, in which the operation of high pressure pump 102 and circulation pump 126 supplies water to module 100.

Thereafter, the FPM controller 162 periodically activates the auxiliary feed water pump 144 and opens auxiliary brine outlet tank control valve 154 to flush all brine from auxiliary feed water tank 142 through an auxiliary brine outlet 152 to a location outside of the at least one water treatment system, and fill the auxiliary feed tank 142 with feed water for further replacement of brine in module 100. This flow is shown in a solid black line in FIG. 11D.

Following full replacement of brine with feed water in auxiliary feed water tank 142, as measured by auxiliary flow sensor 150, the FPM controller 162 closes auxiliary brine outlet tank control valve 154 and terminates operation of the auxiliary feed water pump 144.

It will be appreciated by persons skilled in the art that the present invention is not limited by what has been specifically shown and described hereinabove. Rather the scope of the invention includes both combinations and sub-combinations of features described and shown hereinabove as well as modifications thereof which would occur to persons reading the foregoing description and which are not in the prior art.

The invention claimed is:

1. A method of treatment of feed liquid by a liquid treatment system comprising: at least one liquid treatment module comprising at least one membrane and in communication with a liquid inlet, with a concentrate outlet, and with a permeate outlet; a circulation pump; a high pressure pump which normally maintains a fixed output liquid volume notwithstanding variations in liquid pressure at an outlet of the high pressure pump, the energy consumption of the high pressure pump being a function of the variations in liquid pressure at the outlet of the high pressure pump; and a controller for monitoring the liquid pressure downstream from the high pressure pump and controlling the high pressure pump, the method comprising:
pressurizing the feed liquid by employing said high pressure pump and supplying the pressurized feed liquid to said at least one liquid treatment module via said liquid inlet;
circulating a concentrate from said concentrate outlet to said liquid inlet by employing said circulation pump and mixing the pressurized feed liquid with the concentrate, resulting into a mixed liquid;
supplying the mixed liquid to said at least one liquid treatment module via said liquid inlet;
monitoring the liquid pressure downstream from the high pressure pump;
determining, with the controller, that the liquid pressure downstream from the high pressure pump has reached a predetermined high pressure threshold representing exceedance of salinity threshold of the concentrate; and
immediately after said determination, lowering the liquid pressure downstream from the high pressure pump to a level which exceeds an osmotic pressure of the feed liquid, thereby immediately reducing the energy consumption of the high pressure pump.

2. The method according to claim 1, wherein the liquid pressure downstream from the high pressure pump is lowered to a pressure below osmotic pressure of the mixed liquid at said liquid inlet at the time of the exceedance.

3. The method according to claim 1, wherein the at least one liquid treatment module is in communication with a brine outlet, and wherein said lowering the liquid pressure downstream from the high pressure pump is performed by at least one of the following operations:
opening a liquid pressure reducing valve at the brine outlet, thereby removing said concentrate from said liquid treatment system;
stopping said circulation and increasing a liquid volume output of said circulation pump from volume output of the circulation pump when the circulation pump circulates said concentrate from the at least one liquid treatment module to the liquid inlet at times other than upon and immediately following the exceedance;
equilibrating liquid pressures between a liquid pressure inside the at least one liquid treatment module and inside a liquid feed tank; and
opening a recycle conduit control valve which provides a pressure reducing backflow liquid path from the outlet of the high pressure pump to an inlet of the high pressure pump, the backflow liquid path bypassing the high pressure pump.

4. The method according to claim 1, wherein said lowering the liquid pressure downstream from the high pressure pump is performed by:
removing said concentrate from the liquid treatment system; and
reducing pressure of the mixed liquid in the at least one liquid treatment module by at least one of the following operations:
opening a pressure reducing valve downstream from the high pressure pump;
stopping said circulation and increasing a liquid volume output of the circulation pump from volume output of the circulation pump when the circulation pump circulates said concentrate from the at least one liquid treatment module and to the liquid inlet at times other than upon and immediately following the exceedance; and
passing the pressurized feed liquid from downstream from the high pressure pump to upstream from the high pressure pump.

5. The method according to claim 4, wherein said passing the pressurized feed liquid from downstream from the high pressure pump to upstream from the high pressure pump includes passing the pressurized feed liquid via a flow restrictor arranged in parallel to the high pressure pump.

6. The method according to claim 1, further comprising:
circulating said concentrate from said concentrate outlet to said liquid inlet by said circulation pump and via a recirculation control valve disposed between said concentrate outlet and said liquid inlet; and
immediately after said determination, closing the recirculation control valve.

* * * * *